US008313376B2

(12) United States Patent
Asuke et al.

(10) Patent No.: US 8,313,376 B2
(45) Date of Patent: Nov. 20, 2012

(54) COMPUTER-READABLE STORAGE MEDIUM HAVING GAME PROGRAM STORED THEREIN AND GAME APPARATUS

(75) Inventors: Shigeyuki Asuke, Kyoto (JP); Masataka Takemoto, Kyoto (JP); Makoto Sasaki, Kyoto (JP)

(73) Assignee: Nintendo Co., Ltd., Kyoto-Shi, Kyoto (JP)

( * ) Notice: Subject to any disclaimer, the term of this patent is extended or adjusted under 35 U.S.C. 154(b) by 572 days.

(21) Appl. No.: 12/550,859

(22) Filed: Aug. 31, 2009

(65) Prior Publication Data

US 2010/0304858 A1 Dec. 2, 2010

(30) Foreign Application Priority Data

May 28, 2009 (JP) ................................. 2009-129591

(51) Int. Cl.
  *A63F 13/02* (2006.01)
  *G06F 19/00* (2006.01)
(52) U.S. Cl. .......................................... 463/36; 463/43
(58) Field of Classification Search .................... 463/31, 463/34, 36, 42, 43; 700/90–93
See application file for complete search history.

(56) References Cited

U.S. PATENT DOCUMENTS

| 5,470,080 | A  | * | 11/1995 | Naka et al. ..................... 463/33 |
| 5,848,201 | A  | * | 12/1998 | Kajiwara ....................... 382/296 |
| 6,217,446 | B1 |   | 4/2001  | Sanbongi et al. |
| 6,256,047 | B1 | * | 7/2001  | Isobe et al. .................... 345/473 |
| 6,261,179 | B1 | * | 7/2001  | Miyamoto et al. ............... 463/23 |
| 6,267,676 | B1 | * | 7/2001  | Nagaoka ........................ 463/43 |
| 6,296,570 | B1 | * | 10/2001 | Miyamoto et al. ............... 463/30 |
| 6,375,572 | B1 | * | 4/2002  | Masuyama et al. .............. 463/43 |
| 6,424,353 | B2 | * | 7/2002  | Yamamoto et al. ............. 345/619 |
| 6,527,637 | B2 | * | 3/2003  | Fujioka et al. .................. 463/4 |
| 6,878,058 | B1 | * | 4/2005  | Serizawa et al. ................. 463/8 |
| 7,394,453 | B2 | * | 7/2008  | Woolley et al. ................. 345/157 |
| 7,762,893 | B2 | * | 7/2010  | Kando et al. ................... 463/37 |
| 8,137,196 | B2 | * | 3/2012  | Kando ........................... 463/37 |
| 2001/0006908 | A1 | * | 7/2001  | Fujioka et al. ................... 463/3 |
| 2002/0137557 | A1 | * | 9/2002  | Ishii et al. ....................... 463/8 |
| 2003/0210255 | A1 | * | 11/2003 | Hiraki ........................... 345/684 |
| 2004/0224757 | A1 | * | 11/2004 | Yamamura et al. .............. 463/30 |
| 2006/0217196 | A1 | * | 9/2006  | Kikkawa et al. ................. 463/30 |
| 2007/0060228 | A1 | * | 3/2007  | Akasaka et al. .................. 463/1 |
| 2007/0262986 | A1 | * | 11/2007 | Suzuki et al. .................. 345/421 |
| 2007/0270215 | A1 | * | 11/2007 | Miyamoto et al. .............. 463/32 |
| 2008/0174567 | A1 | * | 7/2008  | Woolley et al. ................. 345/173 |
| 2008/0248848 | A1 | * | 10/2008 | Rippy et al. ..................... 463/9 |
| 2008/0291173 | A1 | * | 11/2008 | Suzuki .......................... 345/173 |
| 2009/0104992 | A1 | * | 4/2009  | Kouno ........................... 463/36 |

FOREIGN PATENT DOCUMENTS

JP        10-165647      6/1998

* cited by examiner

*Primary Examiner* — Dmitry Suhol
*Assistant Examiner* — Jason Skaarup
(74) *Attorney, Agent, or Firm* — Nixon & Vanderhye P.C.

(57) ABSTRACT

Reference point calculation means calculates a reference point with respect to a reference axis direction, the reference point being a center position based on positions of a plurality of objects and the reference axis direction being a predetermined axis direction of a display area. First determination means determines whether or not a position of the reference point is a position within a first distance from an end of the display area with respect to the reference axis direction. When the first determination means determines that the position of the reference point is within the first distance from the end of the display area, screen control means scrolls, along the reference axis direction, a display content of a virtual space displayed in the display area.

30 Claims, 35 Drawing Sheets

F I G. 4
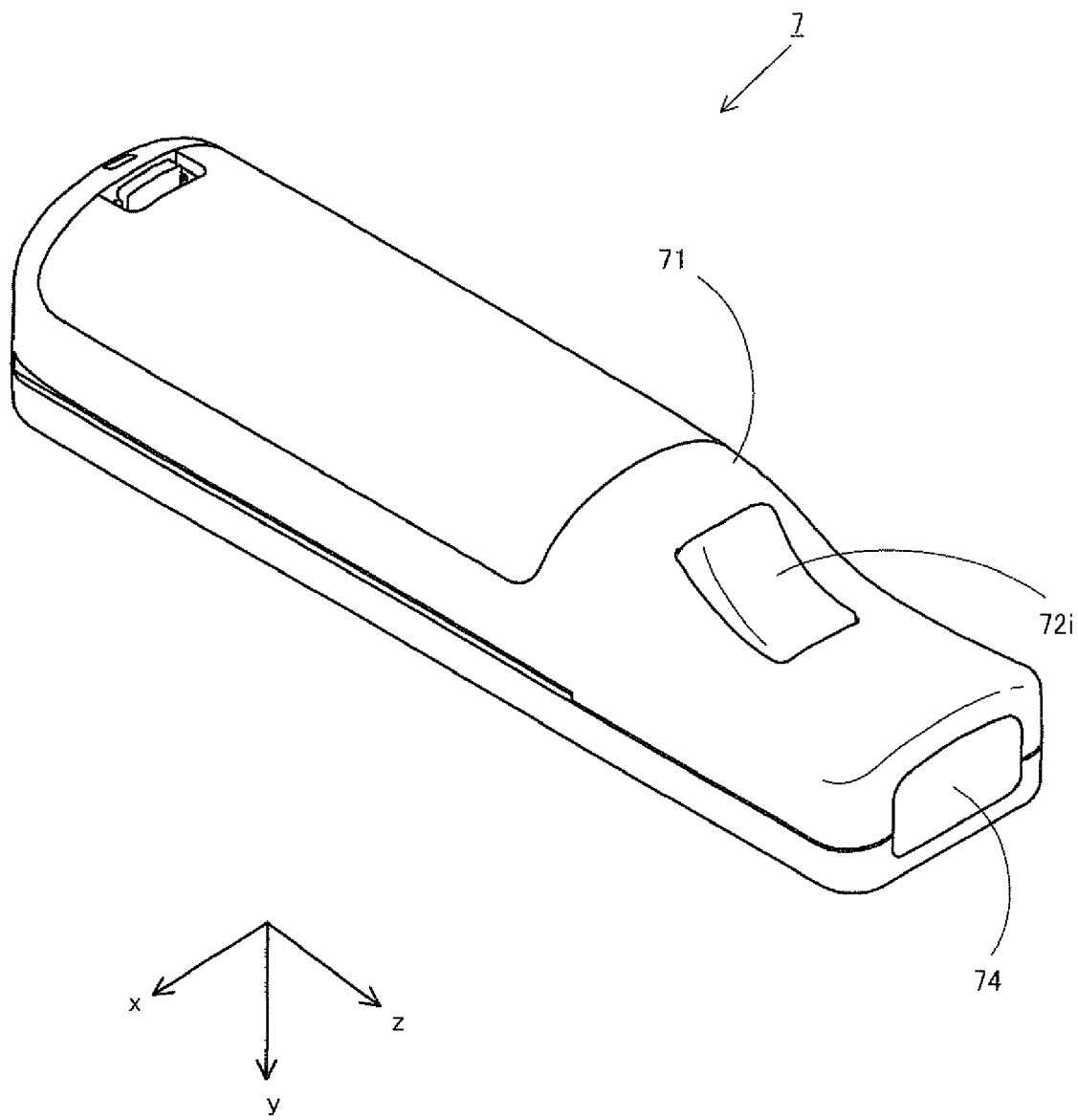

F I G. 8
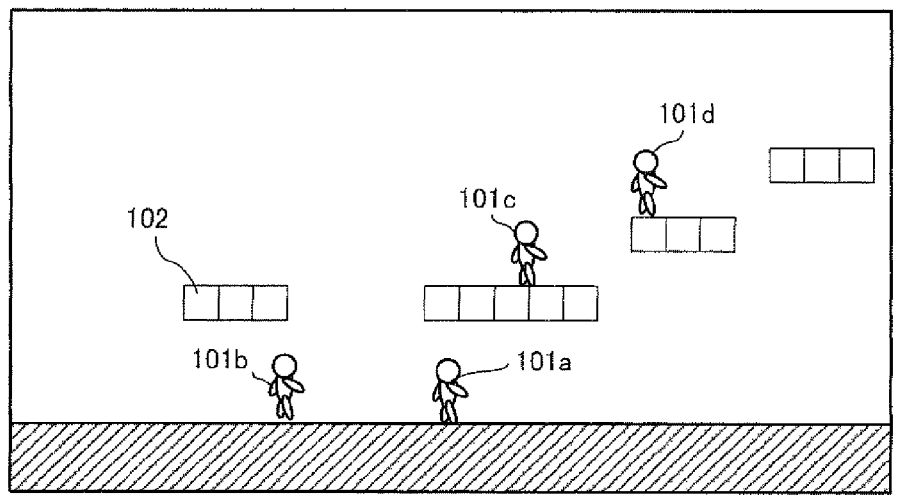
F I G. 9
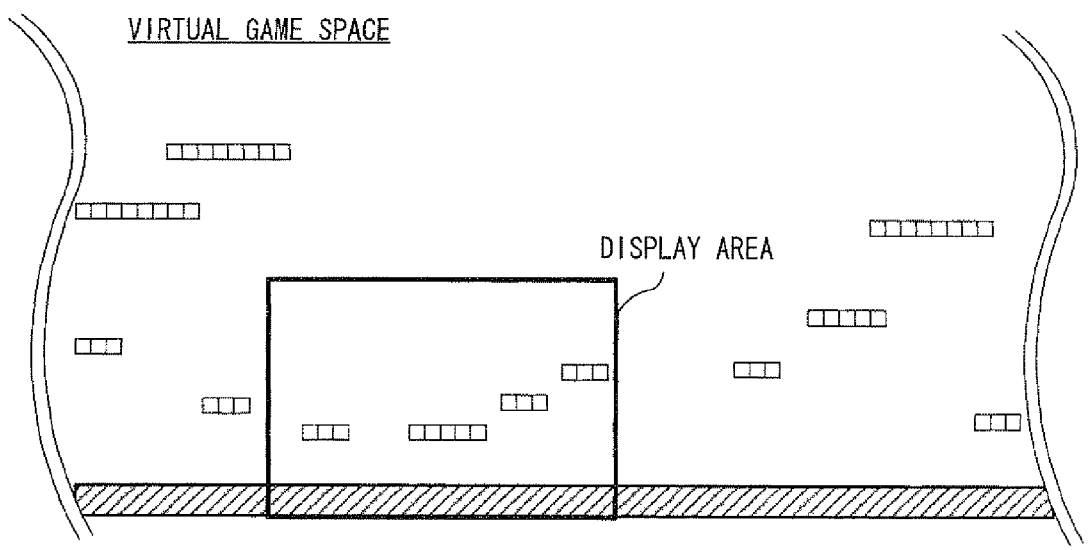

FIG. 10
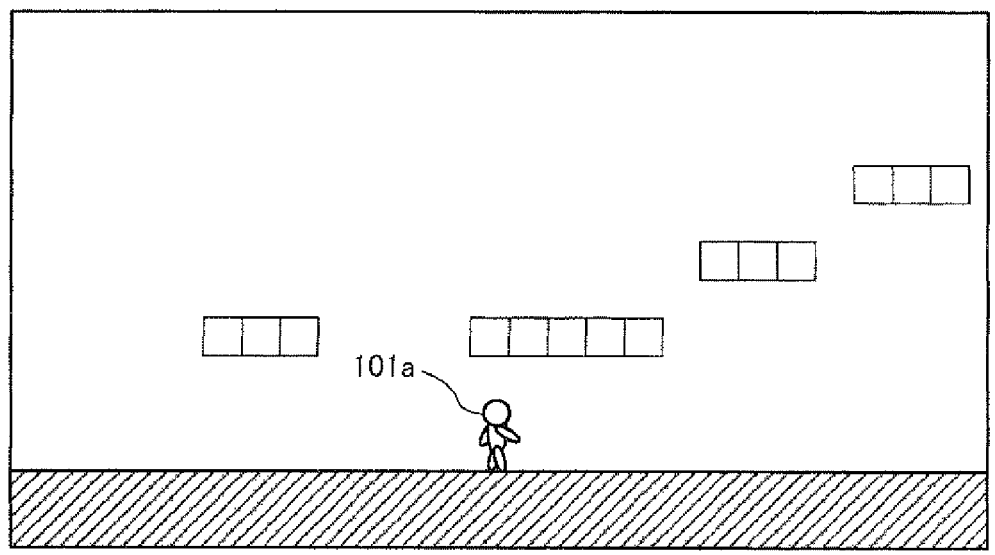
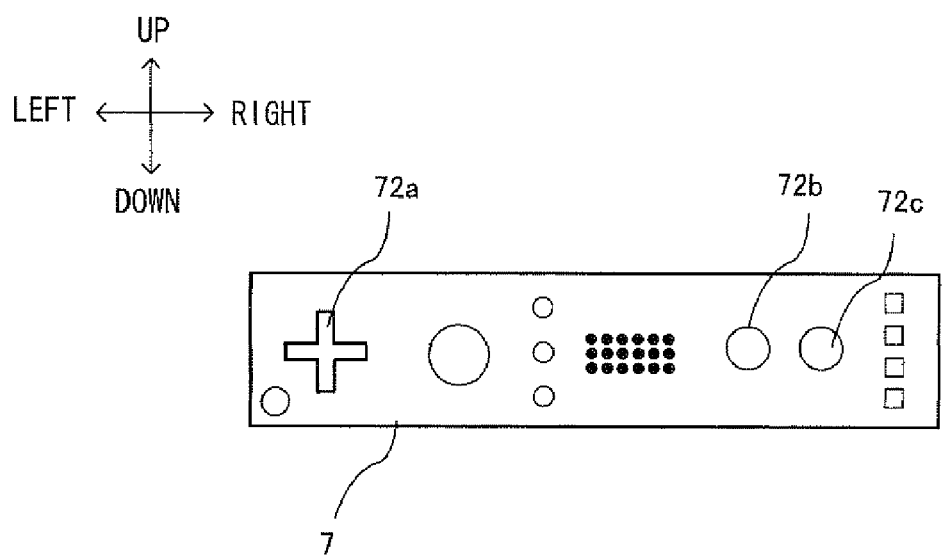

F I G. 1 5
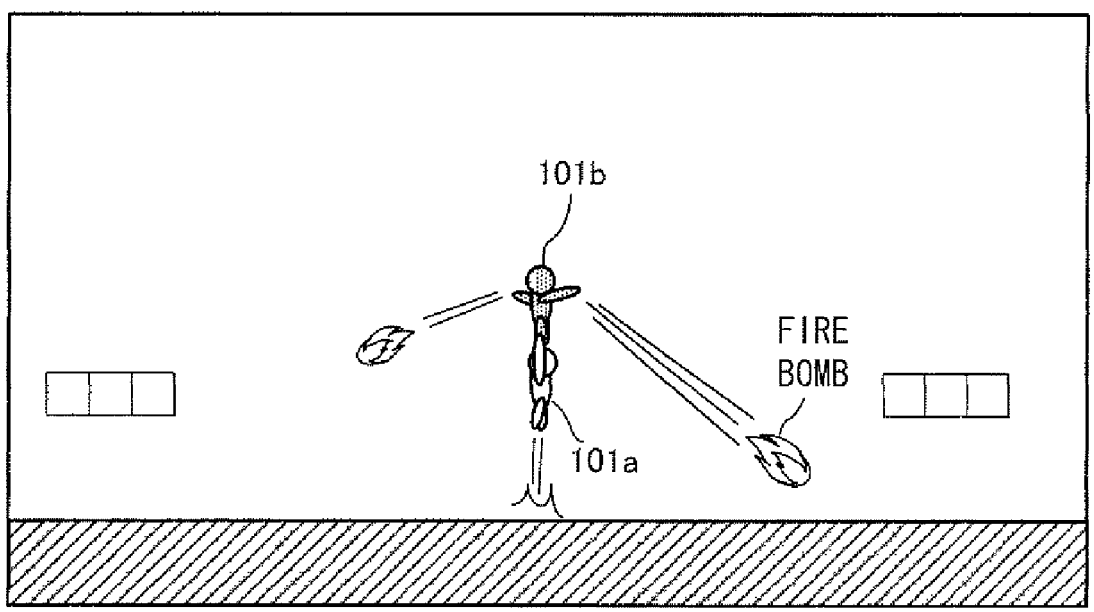

F I G. 2 2
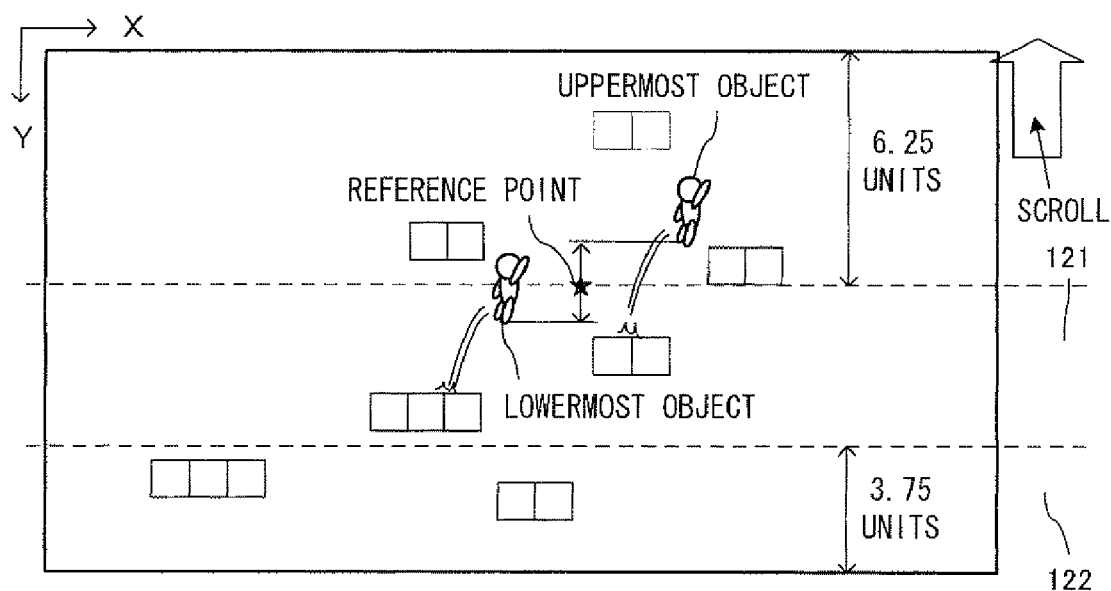

COMPUTER-READABLE STORAGE MEDIUM HAVING GAME PROGRAM STORED THEREIN AND GAME APPARATUS

CROSS REFERENCE TO RELATED APPLICATION

The disclosure of Japanese Patent Application No. 2009-129591, filed on May 28, 2009, is incorporated herein by reference.

BACKGROUND OF THE INVENTION

1. Field of the Invention

The present invention relates to a computer-readable storage medium having stored therein a game program to be executed by a computer of a game apparatus for displaying, in a display device, an object in a virtual space, and particularly relates to a computer-readable storage medium having stored therein a game program for displaying, in a display device, a plurality of objects in a virtual space, and also to a game apparatus.

2. Description of the Background Art

Conventionally, a game apparatus is known that displays a plurality of objects on the screen of a display device (see Japanese Laid-Open Patent Publication No. 10-165647, for example). In such a game apparatus, when two enemy objects present in a virtual game space are displayed on the screen, the display is, for example, performed when the viewing point of a virtual camera has been set at the midpoint between the two enemy objects or set at the position of one of the two enemy objects.

However, such a game apparatus as described above has the following problems. That is, when the viewing point of a virtual camera has been set as described above, if the enemy object to which the viewing point has been set frequently moves, the display is performed on the screen by recalculating the viewing point each time, and therefore the viewing point drastically changes. This makes the screen display extremely difficult for the player to view. Further, when the enemy object moves at a high speed, the viewing point also moves at a high speed in accordance with the movement of the enemy object. This also makes the screen display extremely difficult for the player to view.

SUMMARY OF THE INVENTION

Therefore an object of the present invention is to provide a computer-readable storage medium having stored therein a game program capable of, when a display area in a virtual space is determined based on the positions of a plurality of objects that frequently move and is displayed on a screen, performing screen display that is easily viewable to players, and also to provide a game apparatus.

Another object of the present invention is to provide a computer-readable storage medium having stored therein a game program capable of enhancing the interest of a multi-player game, and also to provide a game apparatus.

The present invention has the following features to attain the above-mentioned objects. Note that in this section, reference numerals, supplemental descriptions, and the like in parentheses merely indicate correspondence with the below-described embodiment so as to assist understanding of the present invention, and do not limit the present invention in any way.

A first aspect is a computer-readable storage medium having stored therein a game program to be executed by a computer of a game apparatus for displaying, in a predetermined display area of a display device, a virtual space in which a plurality of objects are present, and the game program causes the computer to function as reference point calculation means (S121), first determination means (S122, S124), and screen control means (S123, S125, S133, S135). The reference point calculation means calculates a reference point with respect to a reference axis direction, the reference point being a center position based on positions of the plurality of objects and the reference axis direction being a predetermined axis direction of the display area. The first determination means determines whether or not a position of the reference point is a position within a first distance from an end of the display area with respect to the reference axis direction. When the first determination means determines that the position of the reference point is a position within the first distance from an end of the display area, the screen control means scrolls, along the reference axis direction, a display content of the virtual space displayed in the display area. Note that the reference axis direction refers to a direction along which the scroll control is performed. For example, in the case of vertical scroll, the vertical direction (a Y-axis direction) of the screen is the reference axis direction. In the case of horizontal scroll, the horizontal direction (an X-axis direction) is the reference axis direction.

Based on the first aspect, it is possible to perform screen display that is easily viewable to the players.

In a second aspect, based on the first aspect, the reference point calculation means calculates, as the reference point, a midpoint between two objects, among the plurality of objects, that are farthest from each other with respect to the reference axis direction.

Based on the second aspect, it is possible to display all of the plurality of objects on the screen.

In a third aspect, based on the first aspect, when the first determination means determines that the position of the reference point is a position within the first distance from an end of the display area, the screen control means scrolls, along the reference axis direction, the display content of the virtual space so that the position of the reference point is a position the first distance from the end of the display area.

In a fourth aspect, based on the first aspect, when the first determination means determines that the position of the reference point is a position within the first distance from an end of the display area, the screen control means scrolls, along the reference axis direction and toward a side about which the determination is made that the position of the reference point is a position within the first distance from an end of the display area, the display content of the virtual space displayed in the display area.

Based on the fourth and fourth aspects, when an object that is close to an end of the screen is present, the screen scrolls, whereby it is possible to enhance the visibility of the screen.

In a fifth aspect, based on the first aspect, the game program further causes the computer to function as second determination means (S126, S127, S131). The second determination means determines whether or not a position of an object, among the plurality of objects, that is closest to the end of the display area with respect to the reference axis direction is a position within a second distance from the end of the display area, the second distance being smaller than the first distance from the end of the display area. Regardless of the position of the reference point, when the second determination means determines that the object closest to the end of the display area is within the second distance from the end of the display area, the screen control means scrolls the display content of the virtual space so that the object is displayed at a position the second distance from the end of the display area.

Based on the fifth aspect, when an object that is close to an end of the screen is present, it is possible to enhance the visibility of the moving direction of the object.

In a sixth aspect, based on the first aspect, the first determination means determines whether or not the position of the reference point is a position within the first distance from one end of the display area with respect to the reference axis direction and also whether or not the position of the reference point is a position within a third distance from the other end of the display area with respect to the reference axis direction. When the first determination means determines that the position of the reference point is a position within the first distance from the one end of the display area, the screen control means scrolls, along the reference axis direction and toward a side of the one end of the display area, the display content of the virtual space displayed in the display area, and when the first determination means determines that the position of the reference point is a position within the third distance from the other end of the display area, the screen control means scrolls, along the reference axis direction and toward a side of the other end of the display area, the display content of the virtual space displayed in the display area.

Based on the sixth aspect, it is possible to perform screen display that is easily viewable to the players.

In a seventh aspect, based on the sixth aspect, the first distance and the third distance are different in value.

Based on the seventh aspect, it is possible to control the display content of the screen in accordance with the characteristics of the movement of an object, whereby it is possible to perform screen display that is more easily viewable.

In an eighth aspect, based on the seventh aspect, with respect to the reference axis direction, a direction toward the side of the one end of the display area is an antigravity direction in the virtual space, and a direction toward the side of the other end of the display area is a gravity direction in the virtual space, and the first distance is greater than the third distance.

Based on the eighth aspect, it is possible to control the display content of the screen in accordance with the characteristics of the movement of an object, taking into account the influence of the gravity, such as a jump movement, whereby it is possible to perform screen display that is more easily viewable.

In a ninth aspect, based on the sixth aspect, the game program causes the computer to function as second determination means for determining whether or not a position of an object, among the plurality of objects, that is closest to the one end of the display area with respect to the reference axis direction is a position within a second distance from the one end of the display area, the second distance being smaller than the first distance from the one end of the display area, and also determining whether or not a position of another object, among the plurality of objects, that is closest to the other end of the display area with respect to the reference axis direction is a position within a fourth distance from the other end of the display area, the fourth distance being smaller than the third distance from the other end of the display area. Regardless of the position of the reference point, when the second determination means determines that the object closest to the one end of the display area is within the second distance from the one end of the display area, the screen control means scrolls the display content of the virtual space so that the object is displayed at a position the second distance from the one end of the display area, and when the second determination means determines that said another object closest to the other end of the display area is within the fourth distance from the other end of the display area, the screen control means scrolls the display content of the virtual space so that said another object is displayed at a position the fourth distance from the other end of the display area.

Based on the ninth aspect, when an object that is close to an end of the screen is present, the screen scrolls, whereby it is possible to enhance the visibility of the vicinity of the object in the virtual space.

In a tenth aspect, based on the ninth aspect, the second distance and the fourth distance are different in values.

Based on the tenth aspect, it is possible to control the display content of the screen in accordance with the characteristics of the movement of an object, whereby it is possible to perform screen display that is more easily viewable.

In an eleventh aspect, based on the ninth aspect, with respect to the reference axis direction, one of the sides of the one end and the other end of the display area is set as a priority side. When the object closest to the one end of display area is within the second distance from the one end of the display area and said another object closest to the other end of the display area is within the fourth distance from the other end of the display area, the screen control means scrolls the display content of the virtual space toward the side set as the priority side.

Based on the eleventh aspect, when objects that are approaching both ends of the screen are present, it is possible to enhance the visibility on the priority side.

In a twelfth aspect, based on the first aspect, the game program further causes the computer to function as inter-object distance calculation means (S74) and zoom-out determination means (S75). The inter-object distance calculation means calculates, in the virtual space, a distance between two objects, among the plurality of objects, that are farthest from each other with respect to the reference axis direction. The zoom-out determination means determines whether or not the distance calculated by the inter-object distance calculation means is greater than a predetermined zoom-out threshold. The screen control means includes zoom-out means (S81, S82, S80) for, when the zoom-out determination means determines that the distance calculated by the inter-object distance calculation means is greater than the zoom-out threshold, zooming out from an image of the virtual space at a predetermined magnification.

In a thirteenth aspect, based on the twelfth aspect, the zoom-out means gradually zooms out from, with a passage of time, the image of the virtual space until the image is displayed at the predetermined magnification.

In a fourteenth aspect, based on the thirteenth aspect, when it is determined that the distance calculated by the inter-object distance calculation means falls below the zoom-out threshold while the zoom-out means controls the gradual zooming out from the image of the virtual space, the zoom-out means cancels the control of the zooming out.

Based on the twelfth and fourteenth aspects, it is possible to perform screen display that makes objects easily recognizable to the players.

In a fifteenth aspect, based on the first aspect, the game program further causes the computer to function as inter-object distance calculation means (S74) and zoom-in determination means (S76). The inter-object distance calculation means calculates, in the virtual space, a distance between two objects, among the plurality of objects, that are farthest from each other with respect to the reference axis direction. The zoom-in determination means determines whether or not the distance calculated by the inter-object distance calculation means is smaller than a predetermined zoom-in threshold.

The screen control means includes zoom-in mean (S77, S78, S80) for, when the zoom-in determination means determines that the distance calculated by the inter-object distance calculation means is smaller than the zoom-in threshold, zooming in on an image of the virtual space at a predetermined magnification.

In a sixteenth aspect, based on the fifteenth aspect, the zoom-in means gradually zooms in on, with a passage of time, the image of the virtual space until the image is displayed at the predetermined magnification.

In a seventeenth aspect, based on the sixteenth aspect, when it is determined that the distance calculated by the inter-object distance calculation means exceeds the zoom-in threshold while the zoom-in means controls the gradual zooming in on the image of the virtual space, the zoom-in means cancels the control of the zooming in.

Based on the fifteenth and seventeenth aspects, it is possible to perform screen display that makes objects easily recognizable to the players.

In an eighteenth aspect, based on the first aspect, the game program further causes the computer to function as orthogonal axis direction midpoint calculation means (S101) for calculating an orthogonal axis direction midpoint with respect to an orthogonal axis direction, the orthogonal axis direction midpoint being a center, position based on the positions of the plurality of objects in the virtual space and the orthogonal axis direction being orthogonal to the reference axis direction. The screen control means scrolls, along the orthogonal axis direction, the display content of the virtual space so that a position of the orthogonal axis direction midpoint is a center position of the display area with respect to the orthogonal axis direction.

Based on the eighteenth aspect, it is possible, in accordance with the characteristics of the movement of an object, to perform screen display that is easily viewable to the players.

In a nineteenth aspect, based on the eighteenth aspect, with respect to the orthogonal axis direction, one of sides of one end and the other end of the display area is set as a priority side. The game program further causes the computer to function as third determination means (S103) for determining whether or not a position of one of the plurality of objects is a position within a fifth distance from the end corresponding to the priority side with respect to the orthogonal axis direction. When it is determined that the position of one of the plurality of objects is a position within the fifth distance from the end corresponding to the priority side, the screen control means scrolls the display content of the virtual space so that the one object is displayed at a position the fifth distance from the end corresponding to the priority side.

Based on the nineteenth aspect, when an object that is approaching an end of the screen with respect to the direction orthogonal to a predetermined axis direction, it is possible to enhance the visibility of the moving direction of the object.

In a twentieth aspect, based on the eighteenth aspect, the game program further causes the computer to function as first inter-object distance calculation means (S73), second inter-object distance calculation means (S72), and zoom-out determination means (S74, S75). The first inter-object distance calculation means calculates, in the virtual space, a distance between two objects, among the plurality of objects, that are farthest from each other with respect to the reference axis direction. The second inter-object distance calculation means calculates, in the virtual space, a distance between two objects, among the plurality of objects, that are farthest from each other with respect to the orthogonal axis direction. The zoom-out determination means determines whether or not one of the distances calculated in the first inter-object distance calculation means and the second inter-object distance calculation means is greater than a predetermined zoom-out threshold. The screen control means includes zoom-out means for, when the zoom-out determination means determines that one of the calculated distances is greater than the zoom-out threshold, zooming out from an image of the virtual space at a predetermined magnification.

Based on the twentieth aspect, When the distances between a plurality of objects increases, zooming out is performed on the screen, whereby it is possible to perform screen display that makes the visibility of the vicinity of the objects easily recognizable to the players.

In a twenty-first aspect, based on the eighteenth aspect, the game program further causes the computer to function as first inter-object distance calculation means, second inter-object distance calculation means, and zoom-in determination means. The first inter-object distance calculation means calculates, in the virtual space, a distance between two objects, among the plurality of objects, that are farthest from each other with respect to the reference axis direction. The second inter-object distance calculation means calculates, in the virtual space, a distance between two objects, among the plurality of objects, that are farthest from each other with respect to the orthogonal axis direction. The zoom-in determination means determines whether or not one of the distances calculated by the first inter-object distance calculation means and the second inter-object distance calculation means is smaller than a predetermined zoom-in threshold. The screen control means includes zoom-in means for, when the zoom-in determination means determines that one of the calculated distances is smaller than the zoom-in threshold, zooming in on an image of the virtual space at a predetermined magnification.

Based on the twenty-first aspect, when the distances between a plurality of objects decreases, zooming in is performed on the screen, whereby it is possible to perform screen display that makes the visibility of the vicinity of the objects easily recognizable.

In a twenty-second aspect, based on the first aspect, the plurality of objects are player objects that are capable of operated by a plurality of players using predetermined operation devices, respectively.

Based on the twenty-second aspect, in a multi-player simultaneous game, it is possible to perform screen display that is easily viewable to the players.

In a twenty-third aspect, based on the first aspect, the game program further causes the computer to function as change occurrence determination means (S5) for determining whether or not the number of the plurality of objects displayed on a game screen has changed. The screen control means includes switch control means (S6, S7) for, when the change occurrence determination means determines that the change has occurred, controlling the display content of the display area so that a display content of a display area controlled based on the objects before the change gradually approaches a display content of a display area controlled based on the objects after the change.

In a twenty-fourth aspect, based on the twenty-second aspect, the game program further causes the computer to function as change occurrence determination means (S5) for determining whether or not the number of the plurality of objects displayed on a game screen has changed. The screen control means includes switch control means (S6, S7) for, when the change occurrence determination means determines that the change has occurred, controlling the display content of the display area so that a display content of a display area controlled based on the objects before the change gradually approaches a display content of a display area controlled by the objects after the change.

Based on the twenty-third and twenty-fourth aspects, it is possible to perform screen display that makes objects easily recognizable to the players.

In a twenty-fifth aspect, based on the twenty-second aspect, the game program further causes the computer to function as operation input determination means (S162), proximal player object presence determination means (S163), and operation combination means (S164). The operation input determination means determines whether or not a predetermined operation has been input from one of the predetermined operation devices. When the operation input determination means determines that the predetermined operation has been input, the proximal player object presence determination means determines whether or not, among the player objects, within a predetermined range from a player object corresponding to the operation device subjected to the predetermined operation, another player object is present. When the proximal player object presence determination means determines that another player object is present within the predetermined range, the operation combination means allows said another player object and the player object corresponding to the operation device subjected to the predetermined operation to be operated in a combined manner.

Based on the twenty-fifth aspect, it is possible to enhance the interest of a multiplayer game, particularly a cooperative game, and therefore enhance the interest of the game.

In a twenty-sixth aspect, based on the twenty-fifth aspect, the predetermined operation devices each include an acceleration sensor. The operation input determination means determines whether or not an acceleration that is greater than a predetermined value has been detected with a predetermined button of the predetermined operation device pressed down.

Based on the twenty-sixth aspect, it is possible to provide a variety of operation contents with simple operations, and it is also possible to prevent an erroneous operation from being performed.

In a twenty-seventh aspect, based on the twenty-fifth aspect, while said another player object and the player object corresponding to the operation device subjected to the predetermined operation are capable of being operated in a combined manner, the player object corresponding to the operation device subjected to the predetermined operation is capable of using a predetermined action characteristic that is set in said another player object.

Based on the twenty-seventh aspect, it is possible to enhance the interest of a multiplayer game.

A twenty-eighth aspect is a game apparatus for displaying, in a predetermined display area of a display device, a virtual space in which a plurality of objects are present, and the game apparatus includes reference point calculation means (10), first determination means (10), and screen control means (10). The reference point calculation means calculates a reference point with respect to a reference axis direction, the reference point being a center position based on positions of the plurality of objects and the reference axis direction being a predetermined axis direction of the display area. The first determination means determines whether or not a position of the reference point is a position within a first distance from an end of the display area with respect to the reference axis direction. When the first determination means determines that the position of the reference point is a position within the first distance from the end of the display area, the screen control means scrolls, along the reference axis direction, a display content of the virtual space displayed in the display area.

Based on the twenty-eighth aspect, it is possible to obtain a similar effect to that of the first aspect.

Based on the present invention, even when a plurality of objects that rapidly move are displayed on the screen, it is possible to perform screen display that is easily viewable to the players.

These and other objects, features, aspects and advantages of the present invention will become more apparent from the following detailed description of the present invention when taken in conjunction with the accompanying drawings.

BRIEF DESCRIPTION OF THE DRAWINGS

FIG. 4 is a perspective view showing the controller 7 from the bottom front side thereof;

FIG. 8 is an example of the screen of a game assumed in the present embodiment;

FIG. 9 is a diagram illustrating the concept of a display area in the present embodiment;

FIG. 10 is a diagram illustrating an operation method of the game in the present embodiment;

FIG. 15 is a diagram illustrating the uplift operation;

FIG. 22 is a diagram illustrating an overview of the multiplayer vertical scroll;

FIG. 25 is a diagram showing an example of zooming in;

DESCRIPTION OF THE PREFERRED EMBODIMENTS

An embodiment of the present invention will be described below with reference to the drawings. Note that this embodiment does not limit the scope of the present invention in any way.

(Overall Structure of Game System)

Figure 1:
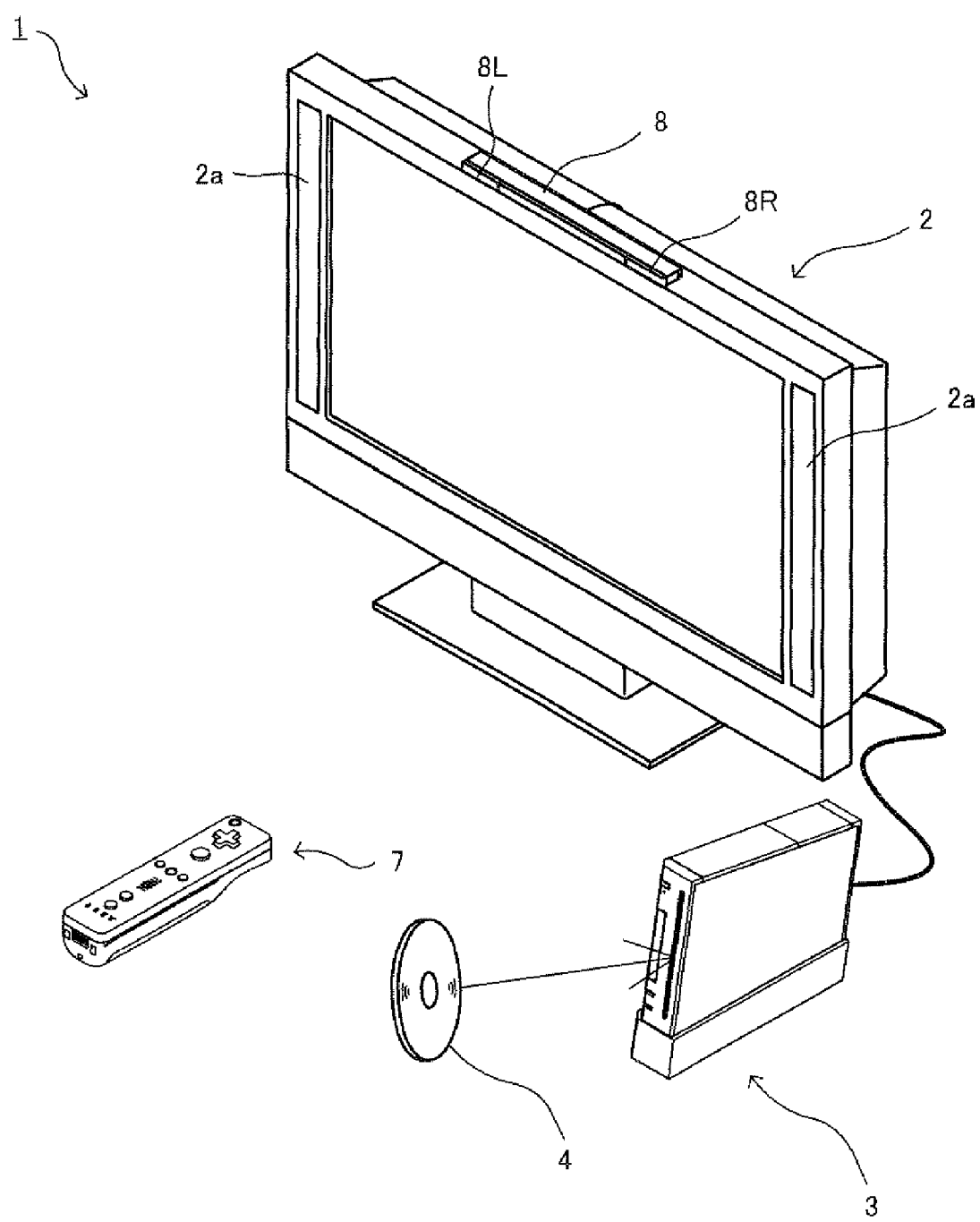
FIG. 1 is an external view illustrating a game system 1 according to an embodiment of the present invention.

A game system 1 including a game apparatus according to an embodiment of the present invention will be described with reference to FIG. 1. FIG. 1 is an external view of the game system 1. A game apparatus and a game program according to the present embodiment will be described below, taking a stationary game apparatus as an example. Referring to FIG. 1, the game system 1 includes a TV receiver (hereinafter referred to simply as a "TV") 2, a game apparatus 3, an optical disk 4, a controller 7, and a marker section 8. In the game system 1 game processing is executed by the game apparatus 3 based on a game operation performed with the use of the controller 7.

In the game apparatus 3 the optical disk 4, which is an example of an information storage medium exchangeably used for the game apparatus 3, is detachably mounted. The optical disk 4 has stored therein a game program to be executed by the game apparatus 3. The game apparatus 3 has an opening on the front surface thereof for mounting the optical disk 4. The game apparatus 3 reads and executes the game program stored in the optical disk 4 inserted into the opening, and thereby executes game processing.

The game apparatus 3 is connected to the TV 2, which is an example of a display device, via a connection cord. The TV 2 displays a game image obtained as a result of the game processing executed by the game apparatus 3. In the adjacent area of the display screen of the TV 2 (above the display screen in FIG. 1) the marker section 8 is provided. The marker section 8 includes at two ends thereof two markers 8R and 8L, respectively. Specifically, the marker 8R (also the marker BL) includes one or more infrared LEDs, and outputs infrared light forward from the TV 2. The marker section 8 is connected to the game apparatus 3, so that the game apparatus 3 can control each of the infrared LEDs included in the marker section 8 to be lit on or off.

The controller 7 is an input device for providing the game apparatus 3 with operation data representing the particulars of the operation performed thereon. The controller 7 and the game apparatus 3 are connected to each other via wireless communication. In the present embodiment the controller 7 and the game apparatus 3 wirelessly communicate with each other using, for example, the Bluetooth (registered trademark) technology. Note that in another embodiment the controller 7 and the game apparatus 3 may be connected to each other in a wired manner.

(Internal Structure of Game Apparatus 3)

Figure 2:
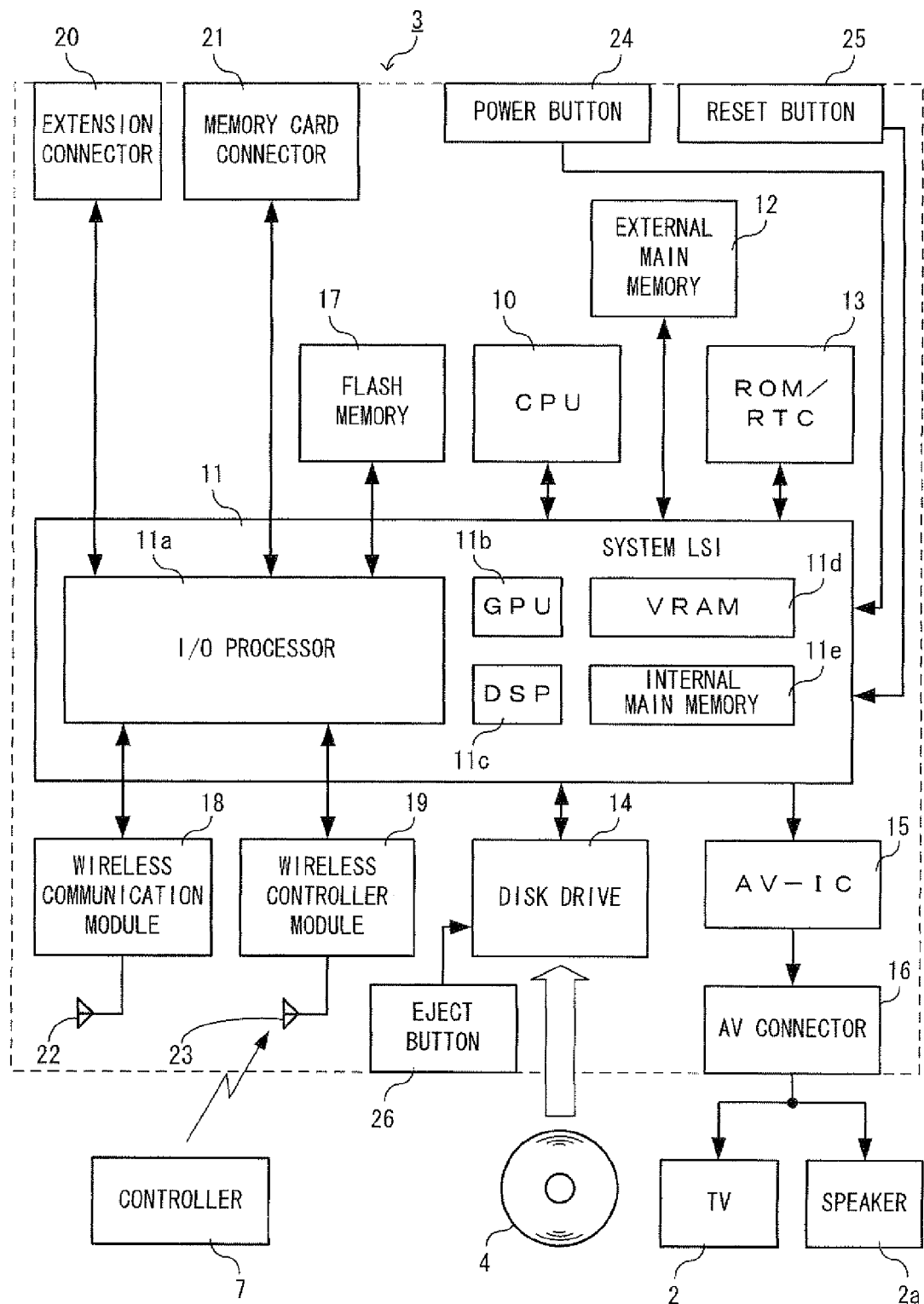
FIG. 2 is a functional block diagram of a game apparatus 3.

The internal structure of the game apparatus 3 will be described with reference to FIG. 2. FIG. 2 is a block diagram showing the structure of the game apparatus 3. The game apparatus 3 includes a CPU 10, a system LSI 11, an external main memory 12, a ROM/RTC 13, a disk drive 19, an AV-IC 15, and the like.

The CPU 10, which performs game processing by executing the game program stored in the optical disk 4, functions as a game processor. The CPU 10 is connected to the system LSI 11. The system LSI 11 is connected to the CPU 10 and also to the external main memory 12, the ROM/RTC 13, the disk drive 14, and the AV-IC 15. The system LSI 11, for example, controls data transfer between the elements connected thereto, generates images to be displayed, and obtains data from external devices. The internal structure of the system LSI 11 will be described below. The external main memory 12, which is of a volatile type, stores therein programs including the game program read from the optical disk 4, the game program read from a flash memory 17, or various other data. The external main memory 12 is used as a work area or a buffer area of the CPU 10. The ROM/RTC 13 includes a ROM (a so-called boot ROM) having incorporated therein a program for starting the game apparatus 3 and also includes a clock circuit (RTC: Real Time Clock) for counting time. The disk drive 14 reads program data, texture data, or the like from the optical disk 4, and writes the read data into an internal main memory 11e described below or the external main memory 12.

The system LSI 11 includes an input/output processor (I/O processor) 11a, a GPU (Graphics Processor Unit) 11b, a DSP (Digital Signal Processor) 11c, a VRAM 11d, and an internal main memory 11e. Although not shown, these elements 11a through 11e are connected to each other via an internal bus.

The GPU 11b, which forms a part of drawing means, generates an image in accordance with a graphics command (a command to draw an image) from the CPU 10. More specifically, the GPU 11b generates game image data by performing, in accordance with the graphics command, a calculation process that is necessary for displaying 3D graphics, such as coordinate transformation from 3D coordinates to 2D coordinates, which is a preprocessing step of rendering, and the application of a texture, which is a final process of rendering. Here, the CPU 10 provides the GPU 11b with an image generation program that is necessary for generating the game image data, as well as the graphics command. The VRAM 11d stores therein data (polygon data, texture data, etc.) that is necessary for the GPU 11b to execute the graphics command. The GPU 11b uses the data stored in the VRAM 11d to generate image data.

The DSP 11c functions as an audio processor and generates audio data by using sound data, acoustic waveform (timbre) data, and the like that are stored in the internal main memory 11e or the external main memory 12. Similarly to the external main memory 12, the internal main memory 11e stores a program or various other data, and is used as a work area or a buffer area of the CPU 10.

The image data and the audio data that have been generated as described above are read by the AV-IC 15. The AV-IC 15 outputs the read image data to the TV 2 via an AV connector 16, and also outputs the read audio data to a speaker 2a built in the TV 2. Thus an image is displayed on the TV 2 and also a sound is output from the speaker 2a.

The input/output processor 11a transmits or receives data to or from the elements connected thereto, or downloads data from external devices. The input/output processor 11a is connected to the flash memory 17, a wireless communication module 18, a wireless controller module 19, an extension connector 20, and a memory card connector 21. The wireless communication module 18 is connected to an antenna 22. The wireless controller module 19 is connected to an antenna 23.

The input/output processor 11a is connected to a network via the wireless communication module 18 and the antenna 22, and therefore can communicate with other game apparatuses or various servers that are also connected to the network. The input/output processor 11a periodically accesses the flash memory 17 and detects the presence or absence of data required to be transmitted to the network. When the data is present, the input/output processor 11a transmits the data to the network via the wireless communication module 18 and the antenna 22. The input/output processor 11a also receives data transmitted from other game apparatuses or data downloaded from a download server, via the network, the antenna 22, and the wireless communication module 18, and stores the received data in the flash memory 17. The CPU 10 executes the game program, and thereby reads the data stored in the flash memory 17 and uses the read data for the game program. The flash memory 17 may have stored therein data (data stored after or during the game) saved as a result of playing the game with use of the game apparatus 3, as well as data to be transmitted to, or data received from, other game apparatuses or various servers.

The input/output processor 11a also receives operation data transmitted from the controller 7 via the antenna 23 and the wireless controller module 19, and stores (temporarily stores) the operation data in a buffer area of the internal main memory 11e or the external main memory 12.

The input/output processor 11a is connected to the extension connector 20 and the memory card connector 21. The extension connector 20, which is a connector for an interface such as USB or SCSI, can be connected to a medium such as an external storage medium, can be connected to a peripheral device such as another controller, or can be connected to a wired communication connector and thereby communicate with the network instead of the wireless communication module 18. The memory card connector 21 is a connector for connecting an external storage medium such as a memory card. For example, the input/output processor 11a can access an external storage medium via the extension connector 20 or the memory card connector 21, and therefore can store or read data.

The game apparatus 3 has a power button 24, a reset button 25, and an eject button 26. The power button 24 and the reset button 25 are connected to the system LSI 11. When the power button 24 is turned on, all the elements of the game apparatus 3 are supplied with power via an AC adaptor (not shown). When the power button 29 is pressed in the state where power is on, the mode switches to a low-power standby mode. Since a current is being applied to the game apparatus 3 even in this state, it is possible to constantly keep the game apparatus 3 connected to a network such as the Internet. Note that when it is desired to turn off power in the state where power is on, it is possible to turn off power by pressing the power button 24 long for more than a predetermined period of time. When the reset button 25 is pressed, the system LSI 11 restarts a starting program of the game apparatus 3. The eject button 26 is connected to the disk drive 14. When the eject button 26 is pressed, the optical disk 4 is ejected from the disk drive 19.

Figure 3:
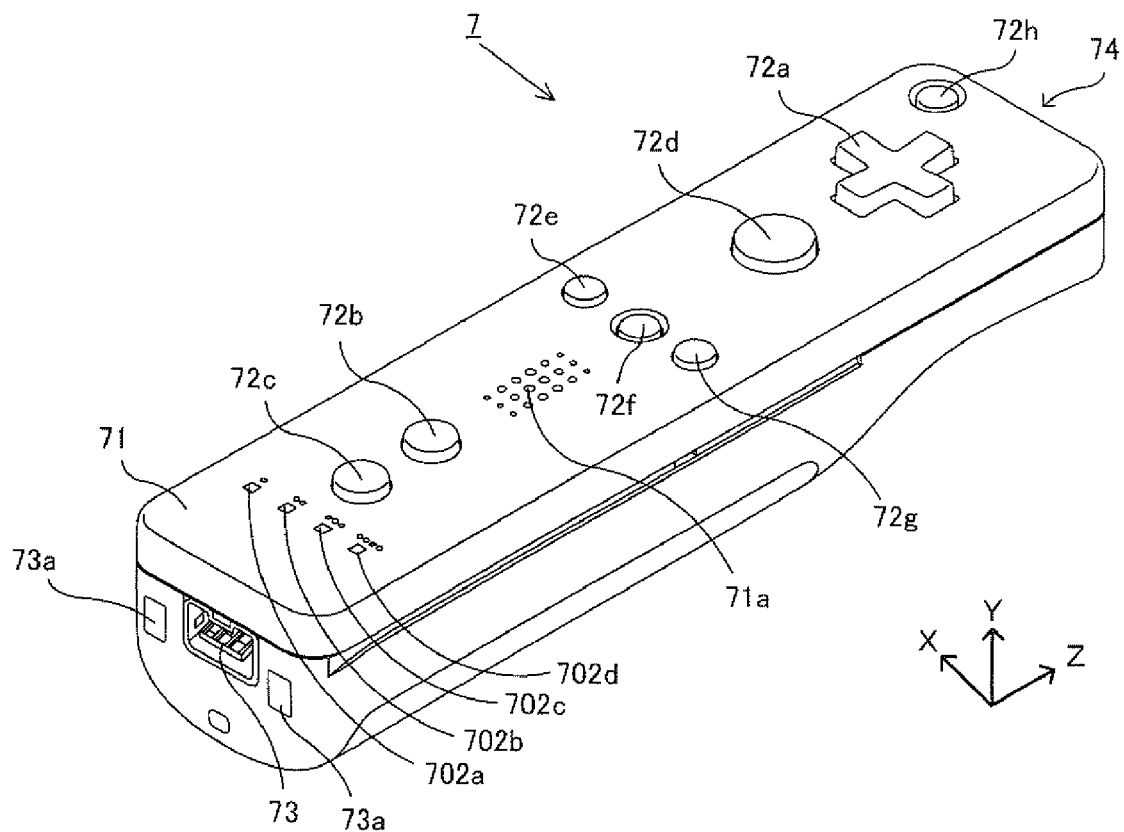
FIG. 3 is a perspective view showing a controller 7 from the top rear side thereof.

The controller 7 will be described with reference to FIGS. 3 and 4. Note that FIG. 3 is a perspective view showing the controller 7 from the top rear side thereof. FIG. 4 is a perspective view showing the controller 7 from the bottom front side thereof.

Referring to FIGS. 3 and 4, the controller 7 includes a housing 71 and an operation section 72 having a plurality of operation buttons provided on the surfaces of the housing 71. The housing 71 has a generally parallelepiped shape extending in the longitudinal direction from front to rear. The whole housing 71 can be held with one hand by an adult or even a child. The housing 71 is formed by, for example, plastic molding.

At the center of the anterior part of the top surface of the housing 71a cross key 72a is provided. The cross key 72a is a cross-shaped four-direction push switch. The cross key 72a includes operation portions corresponding to four directions (front, rear, right, and left), which are respectively placed on the projecting portions, arranged at 90 degree intervals, of the cross shape. The player selects one of the front, rear, right, and left directions by pressing one of the operation portions of the cross key 72a. For example, through an operation on the cross key 72a, the player can instruct a player character or the like that appears in a virtual game world to move in the indicated direction, or select one of a plurality of options.

Note that the cross key 72a is an operation section for outputting an operation signal in accordance with the player's direction input operation described above; however, such an operation section may be provided in another form. For example, the cross key 72a may be replaced by an operation section that has four separate push switches extending in four directions corresponding to a cross, and may output an operation signal in accordance with one of the four push switches pressed by the player. Alternatively, an operation section may be provided that has a center switch, at the position at which the four directions meet, as well as and in combination with the above four push switches. Yet alternatively, the cross key 72a may be replaced by an operation section that includes an inclinable stick (a so-called joystick) projecting from the top surface of the housing 71 and outputs an operation signal in accordance with the inclining direction of the stick. Yet alternatively, the cross key 72a may be replaced by an operation section that includes a disk-shaped member horizontally slidable and outputs an operation signal in accordance with the sliding direction of the disk-shaped member. Yet alternatively, the cross key 72a may be replaced by a touch pad.

Posterior to the cross key 72a on the top surface of the housing 71, a plurality of operation buttons 72b, 72c, 72d, 72e, 72f, and 72g are provided. The operation buttons 72b, 72c, 72d, 72e, 72f, and 72g are operation sections for outputting, when the player presses the heads of the buttons, operation signals assigned to the operation buttons 72b, 72c, 72d, 72e, 72f, and 72g, respectively. For example, the operation buttons 72b, 72c, and 72d are assigned functions of a first button, a second button, and an A-button, respectively. Further, for example, the operation buttons 72e, 72f, and 72g are assigned functions of a minus button, a home button, and a plus button, respectively. The operation buttons 72a, 72b, 72c, 72d, 72e, 72f, and 72g are assigned various operation functions in accordance with the game program to be executed by the game apparatus 3. Note that referring to an example arrangement shown in FIG. 3, the operation buttons 72*b*, 72*c*, and 72*d* are arranged in a line in the front/rear direction in the center on the top surface of the housing 71. The operation buttons 72*e*, 72*f*, and 72*g* are arranged in a line in the left/right direction between the operation buttons 72*b* and 72*d* on the top surface of the housing 71. The operation button 72*f* has the top surface thereof buried in the top surface of the housing 71, so as not to be inadvertently pressed by the player.

Anterior to the cross key 72*a* on the top surface of the housing 71, an operation button 72*h* is provided. The operation button 72*h* is a power switch for remotely turning on/off power to the game apparatus 3. The operation button 72*h* also has the top surface thereof buried in the top surface of the housing 71, so as not to be inadvertently pressed by the player.

Posterior to the operation button 72*c* on the top surface of the housing 71, a plurality of LEDs 702 are provided. The controller 7 is assigned a controller type (number) so as to be distinguishable from other controllers 7. For example, the LEDs 702 may be used to inform the player of the controller type currently set for the controller 7 that he/she is using. Specifically, when transmission data is transmitted from the controller 7 to the game apparatus 3, one of the plurality of LEDs 702 that corresponds to the controller type is lit on.

Between the operation button 72*b* and the operation buttons 72*e*, 72*f* and 72*g* on the top surface of the housing 71, a sound hole is provided for outputting to the outside a sound from a speaker (a speaker 706 shown in FIG. 5) described below.

On the other hand, on the bottom surface of the housing 71*a* recessed portion is formed. The recessed portion is formed at the position at which an index finger or a middle finger of the player is to be placed when the player holds the controller 7 with one hand while orienting the front surface of the controller 7 toward the markers 8L and 8R. On a slope surface (on the rear surface side) of the recessed portion an operation button 72*i* is provided. The operation button 72*i* is an operation section that functions as, for example, a B-button.

On the front surface of the housing 71 an image pickup device 743 included in an imaging information calculation section 74 is provided. The imaging information calculation section 74 is a system for analyzing image data captured by the controller 7, determining an area having a high brightness in the image data, and therefore detecting the center of gravity, the size, and the like of the determined area. The imaging information calculation section 74 has a maximum sampling period of, for example, about 200 frames/sec., and therefore can trace and analyze even a relatively fast motion of the controller 7. The imaging information calculation section 74 will be described in detail below. On the rear surface of the housing 71*a* connector 73 is provided. The connector 73 may be, for example, an edge connector, and is used to engage and connect with, for example, a connecting cable.

Here, in order to make the following description specific, a coordinate system to be set for the controller 7 is defined. As shown in FIGS. 3 and 4, an X-axis, a Y-axis, and a Z-axis, which are orthogonal to each other, are defined for the controller 7. Specifically, the longitudinal direction of the housing 71 corresponding to the front/rear direction of the controller 7 is defined as a Z-axis direction, and the direction toward the front surface (the surface on which the imaging information calculation section 74 is provided) of the controller 7 is defined as a Z-axis positive direction. The up/down direction of the controller 7 is defined as a Y-axis direction, and a direction toward the bottom surface (the surface on which the operation button 72*a* and the like are provided) of the housing 71 is defined as a Y-axis positive direction. The left/right direction of the controller 7 is defined as an X-axis direction, and the direction toward the left side surface (a side surface not shown in FIG. 3 but shown in FIG. 4) of the housing 71 is defined as an X-axis positive direction.

Figure 5:
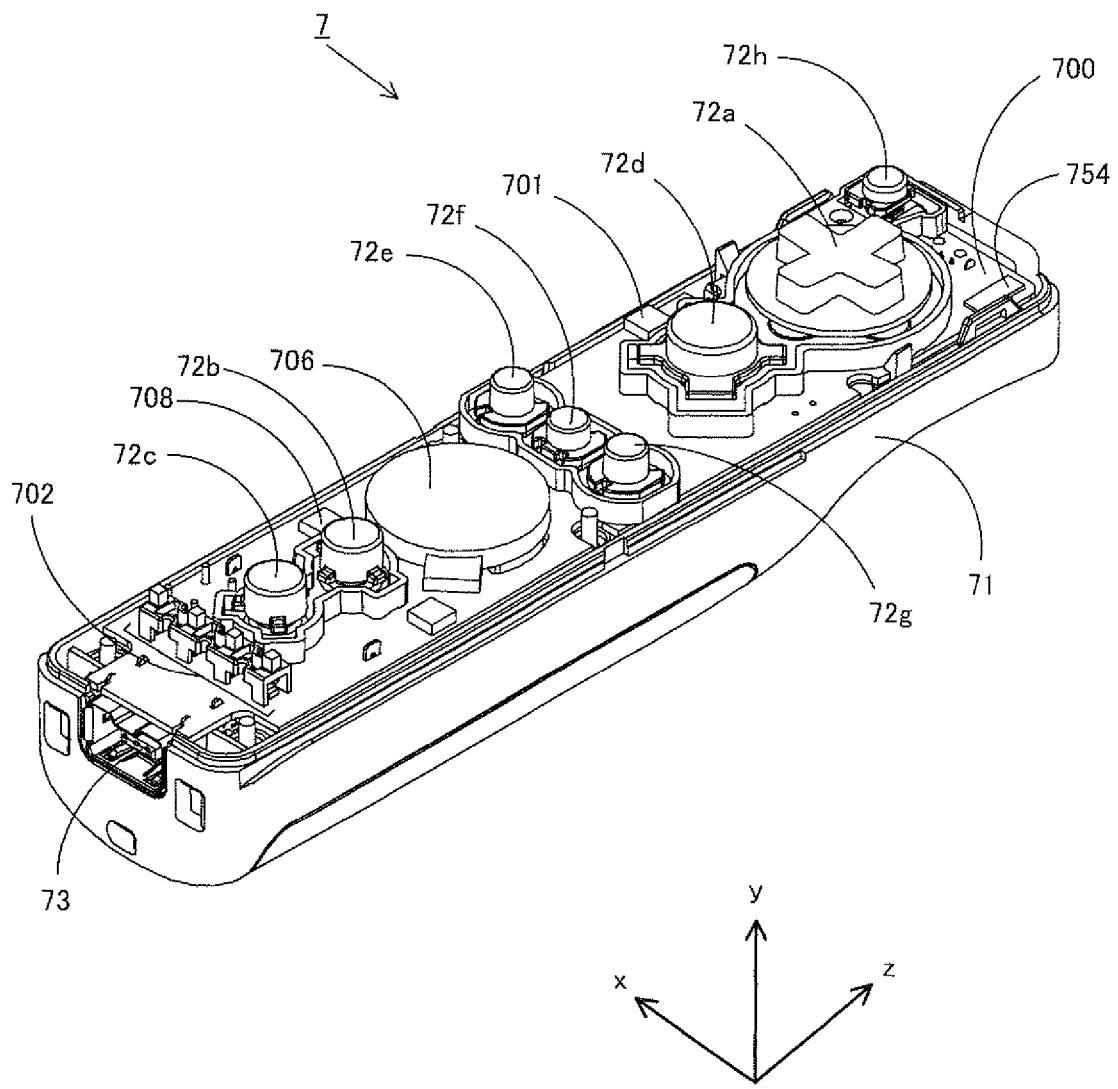
FIG. 5 is a perspective view showing the controller 7 with an upper casing thereof removed.
Figure 6:
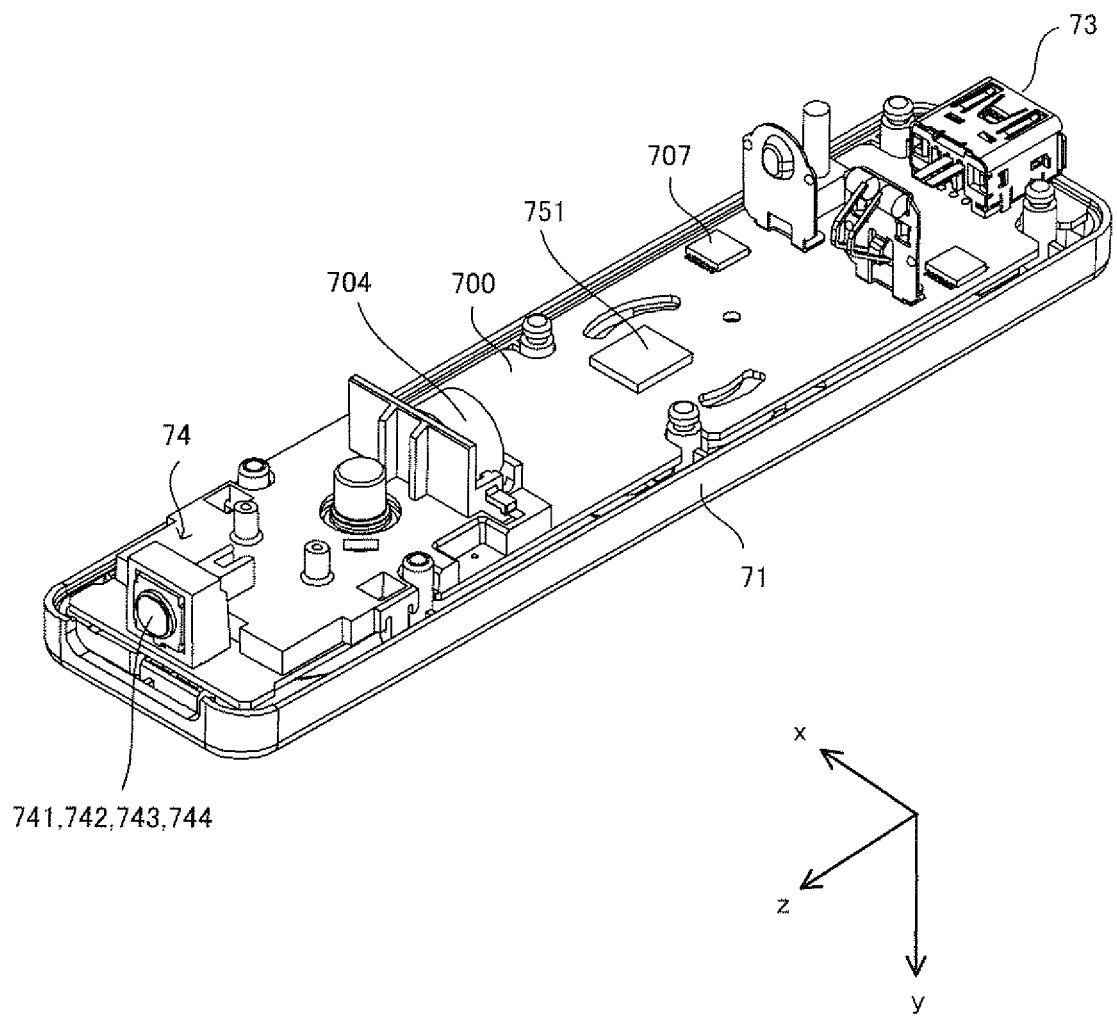
FIG. 6 is a perspective view showing the controller 7 with a lower casing thereof removed.

The internal structure of the controller 7 will be described with reference to FIGS. 5 and 6. Note that FIG. 5 is a perspective view, from the top rear surface of the controller 7, showing a state where an upper casing (a part of the housing 71) of the controller 7 is removed. FIG. 6 is a perspective view, from the bottom front surface of the controller 7, showing a state where a lower casing (a part of the housing 71) of the controller 7 is removed. FIG. 6 is a perspective view showing the reverse side of a substrate 700 shown in FIG. 5.

Referring to FIG. 5, the substrate 700 is fixed within the housing 71. On the top main surface of the substrate 700 the operation buttons 72*a*, 72*b*, 72*c*, 72*d*, 72*e*, 72*f*, 72*g* and 72*h*, an acceleration sensor 701, the LEDs 702, an antenna 754, and the like are provided. These elements are connected to a microcomputer 751 (see FIGS. 6 and 7) and the like via wires (not shown) formed on the substrate 700 and the like. The microcomputer 751 functions to generate operation button data corresponding to the type of operation button, such as the operation button 72*a*. This structure, which is a known technique, is implemented, for example, where the microcomputer 751 detects that a switch mechanism such as a tactile switch provided under a key top connects/disconnects wires. More specifically, when an operation button is pressed, wires contact each other and a current is applied thereto. Then the microcomputer 751 detects which operation button is connected to the wires having caused the application of the current, and generates a signal corresponding to the type of operation button.

A wireless module 753 (see FIG. 7) and the antenna 754 allow the controller 7 to function as a wireless controller. Note that a quartz oscillator (not shown), which is provided within the housing 71, generates a reference clock of the microcomputer 751 described below. On the top main surface of the substrate 700 the speaker 706 and an amplifier 708 are provided. The acceleration sensor 701 is provided on the substrate 700 to the left of the operation button 72*d* (i.e., provided not in the center portion but in the peripheral portion of the substrate 700). Accordingly, in accordance with the rotation of the controller 7 about the axis of the longitudinal direction thereof, the acceleration sensor 701 can detect an acceleration containing a centrifugal force component, as well as a directional change of a gravity acceleration. Thus, by a predetermined calculation, the game apparatus 3 and the like can determine the rotation of the controller 7 based on the detected acceleration data with excellent sensitivity.

On the other hand, referring to FIG. 6, at the front edge of the bottom main surface of the substrate 700 the imaging information calculation section 74 is provided. The imaging information calculation section 74 includes an infrared filter 741, a lens 742, the image pickup device 743, and an image processing circuit 744 that are placed in order starting from the front surface of the controller 7 and attached on the bottom main surface of the substrate 700. At the rear edge of the bottom main surface of the substrate 700 the connector 73 is attached. On the bottom main surface of the substrate 700 a sound IC 707 and the microcomputer 751 are provided. The sound IC 707, connected to the microcomputer 751 and the amplifier 708 via the wires formed on the substrate 700 and the like, outputs an audio signal to the speaker 706 via the amplifier 708 in accordance with the sound data transmitted from the game apparatus 3.

On the bottom main surface of the substrate 700 a vibrator 704 is attached. The vibrator 704 may be, for example, a vibration motor or a solenoid. The vibrator 704, connected to the microcomputer 751 via the wires formed on the substrate 700 and the like, is powered on/off in accordance with vibration data transmitted from the game apparatus 3. The controller 7 is vibrated by the actuation of the vibrator 704, and the vibration is conveyed to the player's hand holding the controller 7. Thus a so-called vibration-feedback game can be realized. Since the vibrator 704 is placed slightly anterior to the center of the housing 71, a large vibration of the housing 71 allows the player holding the controller 7 to easily feel the vibration.

The internal structure of the controller 7 will be described with reference to FIG. 7. Note that FIG. 7 is a block diagram showing the structure of the controller 7.

Figure 7:
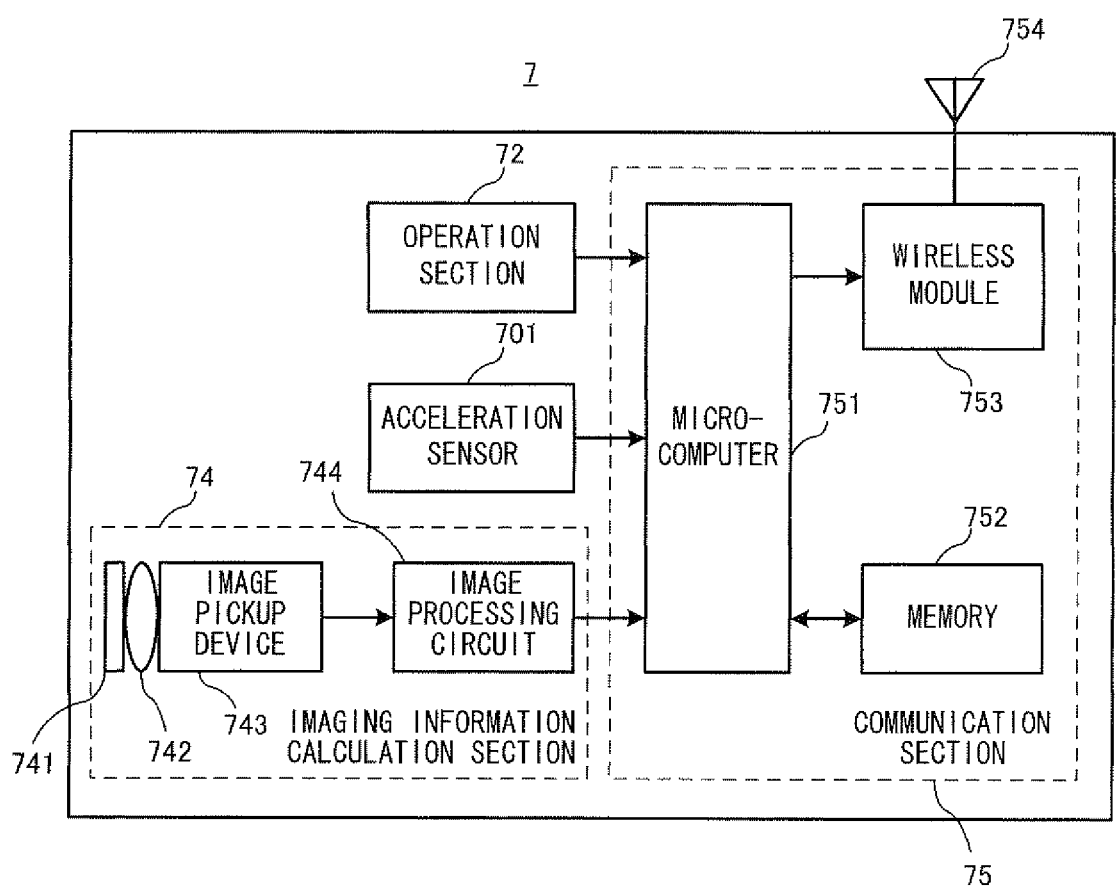
FIG. 7 is a block diagram showing the structure of the controller 7.

Referring to FIG. 7, the controller 7 includes a communication section 75, as well as the operation section 72, the imaging information calculation section 74, the acceleration sensor 701, the vibrator 704, the speaker 706, the sound IC 707, and the amplifier 708 that are described above.

The imaging information calculation section 74 includes the infrared filter 741, the lens 742, the image pickup device 743, and the image processing circuit 744. The infrared filter 741 passes only infrared light, among the light incident on the front surface of the controller 7. The lens 742 collects the infrared light having passed through the infrared filter 741, and emits the infrared light to the image pickup device 743. The image pickup device 743, which is a solid-state image pickup device such as a CMOS sensor or a CCD, captures the infrared light collected by the lens 742. Accordingly, the image pickup device 743 captures only the infrared light having passed through the infrared filter 741, and thereby generates image data. The image data generated by the image pickup device 743 is processed by the image processing circuit 744. Specifically, the image processing circuit 744 processes the image data obtained by the image pickup device 743, senses an area having a high brightness in the image data, and outputs to the communication section 75 the process result data representing the result of the detected position coordinates and the detected size of the area. Note that the imaging information calculation section 74 is fixed to the housing 71 of the controller 7, so that the capturing direction of the imaging information calculation section 74 can be changed by the change of the direction of the housing 71 per se. Based on the process result data output from the imaging information calculation section 74, it is possible to obtain signals corresponding to the position and the motion of the controller 7.

It is preferable that the controller 7 includes a three-axis (X-axis, Y-axis, and Z-axis) acceleration sensor 701. The three-axis acceleration sensor 701 senses linear accelerations in three directions, i.e., the up/down, left/right, and front/rear directions. In another embodiment, two-axis acceleration detection means for sensing linear accelerations along only the up/down and left/right directions (or another pair of directions) may be used depending on the types of control signals used for game processing. For example, this three-axis or two-axis acceleration sensor 701 may be of the type available from Analog Devices, Inc. or STMicroelectronics N.V. The acceleration sensor 701 may also be an electrostatic capacitance (capacitance-coupling) type that is based on silicon micro-machined MEMS (Micro Electro Mechanical Systems) technology. However, the existing technology (e.g., piezoelectric type or piezoresistance type) of acceleration detection means or any other suitable technology developed in the future may be used to provide the three-axis or two-axis acceleration sensor 701.

As known to those skilled in the art, such acceleration detection means as used in the acceleration sensor 701 is capable of sensing only an acceleration (a linear acceleration) along a straight line corresponding to each axis of the acceleration sensor 701. In other words, direct output from the acceleration sensor 701 is a signal representing the linear acceleration (static or dynamic) along each of the two axes or three axes of the acceleration sensor 701. As a result, the acceleration sensor 701 cannot directly sense physical characteristics such as a motion along a non-linear (e.g., arcuate) path, a rotation, a rotational motion, an angular displacement, a tilt, a position, and an orientation.

Note that as those skilled in the art will readily understand from the description herein, a computer such as a processor (e.g., the CPU 10) of the game apparatus 3 or a processor (e.g., the microcomputer 751) of the controller 7 may perform a process based on acceleration signals output from the acceleration sensor 701, whereby it is possible to estimate or calculate (determine) further information about the controller 7. For example, in the case where the computer performs a process on the assumption that the controller 7 having the acceleration sensor 701 is in a static state (i.e., on the assumption that the acceleration detected by the acceleration sensor 701 is limited to a gravitational acceleration), if in actuality the controller 7 is in a static state, it is possible to determine, based on the detected acceleration, whether or not the controller 7 is tilted in the direction of gravity, and also to determine to what degree the controller 7 is tilted. Specifically, with reference to the state where the detection axis of the acceleration sensor 701 is directed in a vertically downward direction, it is possible to determine, based only on whether or not 1G (a gravitational acceleration) is applied to the acceleration sensor 701, whether or not the controller 7 is tilted, and it is also possible to determine, based on the magnitude of the gravitational acceleration, to what degree the controller 7 is tilted. Alternatively, in the case of using a multi-axis acceleration sensor, the computer may perform a process on the acceleration signal of each axis, whereby it is possible to determine in more detail to what degree the controller 7 is tilted. In this case, the processor may calculate data of the tilt angle of the controller 7 based on the output from the acceleration sensor 701, or the processor may estimate an approximate degree of the tilt of the controller 7 based on the output from the acceleration sensor 701, without calculating data of the tilt angle. Thus the acceleration sensor 701 may be used in combination with a processor, whereby it is possible to determine the tilt, the orientation, or the position of the controller 7. On the other hand, in the case where the computer performs a process on the assumption that the controller 7 having the acceleration sensor 701 is in a dynamic state, an acceleration corresponding to the motion of the acceleration sensor 701, as well as a component of the gravitational acceleration, is detected, and therefore it is possible to determine the motion direction and the like of the controller 7 by removing the component of the gravitational acceleration through a predetermined process. Specifically, when the controller 7 having the acceleration sensor 701 is moved by being dynamically accelerated with the player's hand, it is possible to calculate various motions and/or positions of the controller 7 by performing processes on the acceleration signals generated by the acceleration sensor 701. Note that even in the case where the computer performs a process on the assumption that the controller 7 having the acceleration sensor 701 is in a dynamic state, it is possible to determine the tilt of the controller 7 in the direction of gravity by removing the acceleration corresponding to the motion of the acceleration sensor 701 through a predetermined process. In another embodiment, the acceleration sensor 701 may include an embedded signal processor or another type of dedicated processor for performing any desired process on the acceleration signals output from built-in acceleration detection means prior to outputting a signal to the microcomputer 751. For example, when the acceleration sensor 701 is intended to detect a static acceleration (e.g., a gravitational acceleration), the embedded signal processor or said another type of dedicated processor may convert a sensed acceleration signal into a corresponding tilt angle (or another preferable parameters).

In another embodiment, as a motion sensor for detecting the motion of the controller 7, a gyro sensor may be used that has built therein a rotation element, a vibration element, or the like. An example of an MEMS gyro sensor used in the present embodiment is available from Analog Devices, Inc. Unlike the acceleration sensor 701, a gyro sensor can directly sense a rotation (or an angular velocity) about an axis of at least one gyro element built therein. Thus, since a gyro sensor and an acceleration sensor are basically different from each other, it is necessary to appropriately change processes performed on output signals from these devices, depending on which one of the devices is selected for each purpose.

Specifically, when a tilt or an orientation is calculated using a gyro sensor instead of an acceleration sensor, a significant change is required. That is, when a gyro sensor is used, the value of the tilt is initialized at the start of detection. Then, angular acceleration data output from the gyro sensor is integrated. Next, the amount of change in tilt is calculated from the initialized tilt value. In this case, the calculated tilt has a value corresponding to an angle. On the other hand, when a tilt is calculated using an acceleration sensor, the tilt is calculated by comparing to a predetermined reference the value of a component of a gravitational acceleration with respect to each axis. Therefore the calculated tilt can be represented by a vector, and an absolute direction can be detected by acceleration detection means without initialization. Note that the value of the calculated tilt is an angle when the gyro sensor is used, while it is a vector when the acceleration sensor is used. Therefore, when the gyro sensor is used instead of the acceleration sensor, the tilt data is required to be subjected to predetermined conversion, with the difference between the two devices taken into account. As well as the basic difference between acceleration detection means and a gyro sensor, the characteristics of a gyro sensor is well known to those skilled in the art, and therefore will not be described in further detail herein. A gyro sensor has the advantage of directly sensing a rotation, while an acceleration sensor generally has the advantage of being more cost-effective than a gyro sensor when applied to such a controller as used in the present embodiment.

The communication section 75 includes the microcomputer 751, a memory 752, the wireless module 753, and the antenna 754. With the use of the memory 752 as a storage area during the process, the microcomputer 751 controls the wireless module 753 that wirelessly transmits transmission data. The microcomputer 751 controls the operations of the sound IC 707 and the vibrator 704, based on data received by the wireless module 753 from the game apparatus 3 via the antenna 754. The sound IC 707 processes sound data and the like transmitted from the game apparatus 3 via the communication section 75. The microcomputer 751 also actuates the vibrator 704 based on, for example, vibration data (e.g., a signal for powering the vibrator 704 on or off) transmitted from the game apparatus 3 via the communication section 75.

Data from the controller 7 including operation signals (key data) from the operation section 72, acceleration signals (X-axis, Y-axis and Z-axis direction acceleration data; hereinafter referred to simply as "acceleration data") from the acceleration sensor 701, and the process result data from the imaging information calculation section 74 is output to the microcomputer 751. The microcomputer 751 temporarily stores in the memory 752 the received data (the key data, the acceleration data, and the process result data) as transmission data to be transmitted to the wireless controller module 19. The wireless transmission from the communication section 75 to the wireless controller module 19 is performed periodically at predetermined time intervals. Since game processing is generally executed in a cycle of 1/60 sec., the wireless transmission is required to be performed in a shorter cycle time. Specifically, the unit of game processing is 16.7 ms (1/60 sec.), and the transmission interval of the communication section 75 configured using the Bluetooth (registered trademark) technology is 5 ms. At the time of performing transmission to the wireless controller module 19, the microcomputer 751 outputs to the wireless module 753 the transmission data stored in the memory 752, as a series of operation information. With the use of, for example, the Bluetooth (registered trademark) technology, the wireless module 753 modulates the operation information using a carrier wave of a predetermined frequency, and radiates an electric wave signal of the operation information from the antenna 754. That is, the data from the controller 7 including the key data from the operation section 72, the acceleration data from the acceleration sensor 701, and the process result data from the imaging information calculation section 74 is modulated into an electric wave signal by the wireless module 753, and is transmitted from the controller 7. The wireless controller module 19 of the game apparatus 3 receives the electric wave signal, and the game apparatus 3 demodulates and decodes the electric wave signal, and thereby obtains the series of operation information (the key data, the acceleration data, and the process result data). Based on the obtained operation information and the game program, the CPU 10 of the game apparatus 3 performs game processing. Note that when configured using the Bluetooth (registered trademark) technology, the communication section 75 can also have a function of receiving transmission data wirelessly transmitted from other devices.

Next, an overview of a game assumed in the present embodiment will be described with reference to FIGS. 8 through 22. The game assumed in the present embodiment is a platform game that enables single-player to up to four-player simultaneous games. FIG. 8 is an example of the screen of the game assumed in the present embodiment. Referring to FIG. 8, four player objects 101a, 101b, 101c, and 101d (hereinafter also collectively referred to simply as "player objects 101") are displayed on one screen. This screen represents the screen where a four-player simultaneous game is being played. In addition, several platforms for the player objects 101, which are formed of sets of a plurality of blocks 102, are also displayed. Each player can cause the corresponding player object 101 to jump onto these platforms, by performing a jump operation using his/her controller 7. This screen is a screen that captures a virtual game space (which may be a two-dimensional space or a three-dimensional space, and is a three-dimensional space in the present embodiment). The virtual game space is a zone of a certain size so that, among this zone, an area including the positions of the player objects 101 is displayed on the TV 2 as a display area (an area captured by a virtual camera) as shown in FIG. 9. This game is a game where a starting point and a goal point are provided in the virtual game space so that the player objects 101 are advanced from the starting point to the goal point. In the virtual game space, basically, the player objects 101 are advanced along a route (course) formed by appropriately arranging the blocks 102 and terrain objects so as to connect the starting point to the goal point.

Here, in the descriptions given of the present embodiment a "unit" may be used, for ease of description, as a unit to represent a distance in the virtual game space and a distance on the screen. In the present embodiment it is assumed that the size of 1 unit is the size of one block 102 shown in FIG. 8 in the virtual game space. In the present embodiment a zoom process is appropriately performed on the screen as described below, such that one screen is 19 vertical×25.5 horizontal units in size at 1.0-fold magnification (one screen is 28 vertical×51 horizontal units in size at 0.5-fold magnification; one screen is 7 vertical×12.75 horizontal units in size at 2.0-fold magnification). Note that the descriptions will be given below on the assumption that the horizontal direction of the screen is an X-axis direction and the vertical direction of the screen is a Y-axis direction.

To describe an operation performed in the present embodiment, a player performs the operation holding the controller 7 in a horizontal manner, with the cross key 72a positioned on the left. FIG. 10 shows the correspondence between the state of the controller 7 and the game screen. In the present embodiment it is possible to cause the player object 101 to move in the up/down and left/right directions using the cross key 72a and to cause the player object 101 to jump using the button 72c. It is also possible to cause the player object 101 to dash by, with the button 72b pressed down, causing the player object 101 to move. It is also possible to cause the player object 101 to jump while spinning, which is called a "spin jump", by performing an operation of swinging the controller 7. Note that if the controller 7 is swung when the player object 101 is close to another player object 101, it is possible to perform an "uplift" operation described below.

Figure 11:
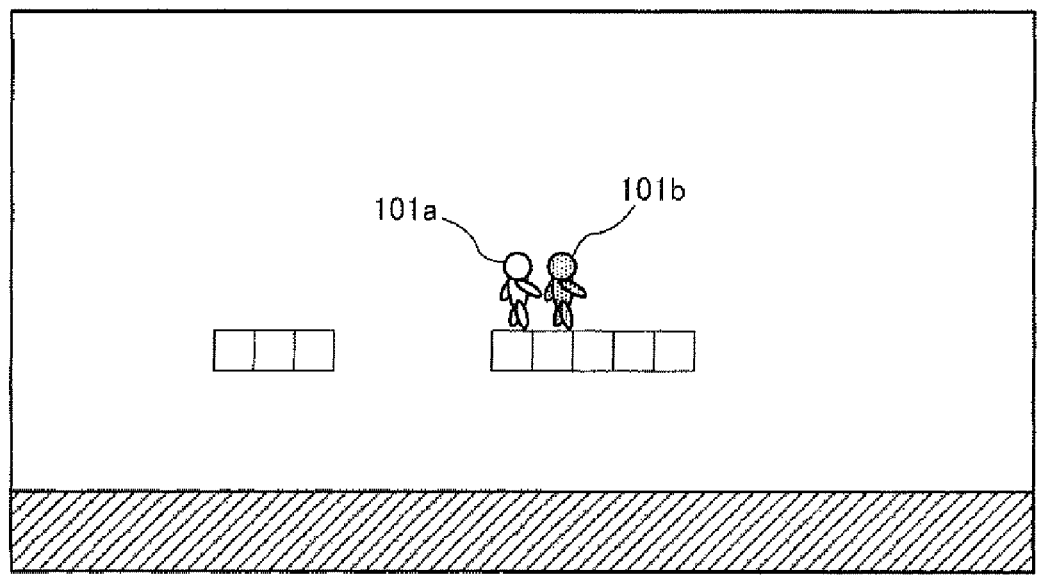
FIG. 11 is a diagram illustrating an uplift operation.
Figure 12:
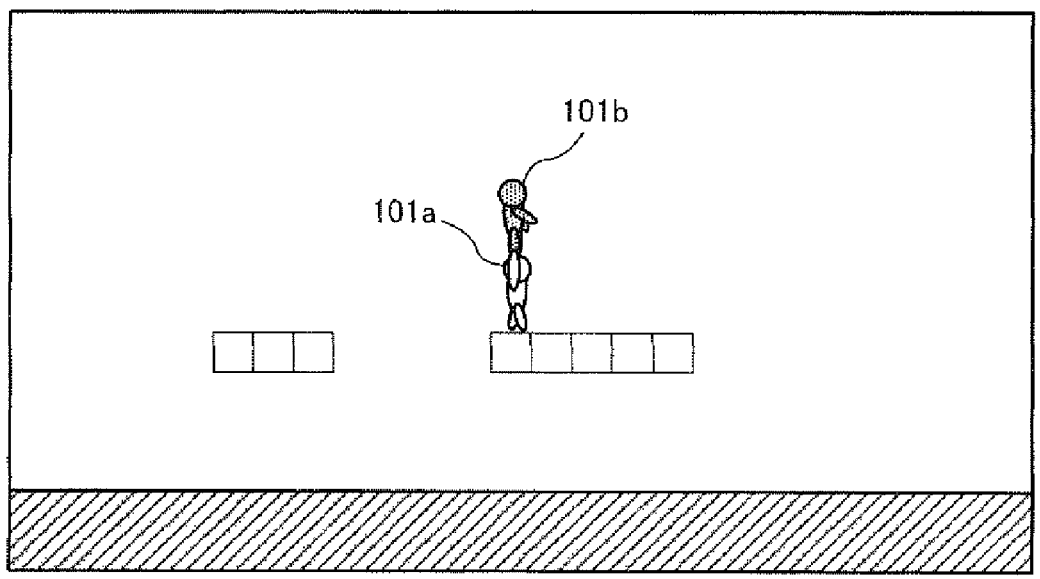
FIG. 12 is a diagram illustrating the uplift operation.
Figure 13:
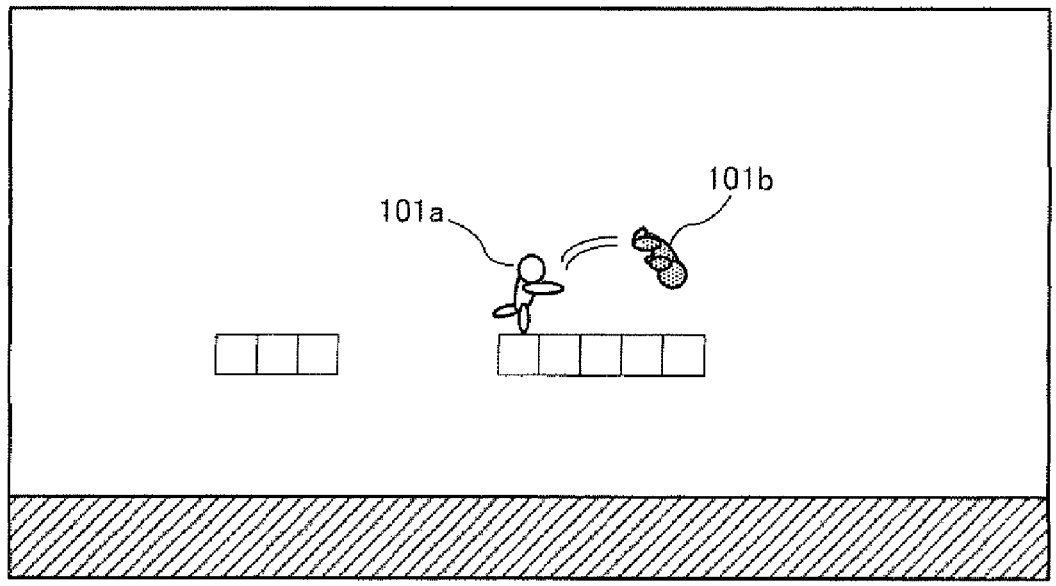
FIG. 13 is a diagram illustrating the uplift operation.

To describe the "uplift" operation, a multiplayer game, e.g., a two-player simultaneous game, is assumed. The player object operated by one (hereinafter referred to as a "1P player") of the players will be referred to as a "1P object", and the player object operated by the other player (hereinafter referred to as a "2P player") will be referred to as a "2P object". The 1P player performs an operation of swinging his/her controller 7 with the button 72b pressed down in the state where, as shown in FIG. 11, a 1P object 101a is close to a 2P object 101b. As a result, as shown in FIG. 12, the 1P object 101a can lift up the 2P object 101b. This uplift state continues while the 1P player is pressing down the button 72b. Then, when the 1P player releases the button 72b in the state where the 1P object 101a is lifting up the 2P object 101b, the 1P object 101a becomes able to, as shown in FIG. 13, throw the 2P object 101b. As to the operation for the 2P object 101b that is being lifted up, when the 2P player swings his/her controller 7, it is possible to release the uplift state.

Figure 14:
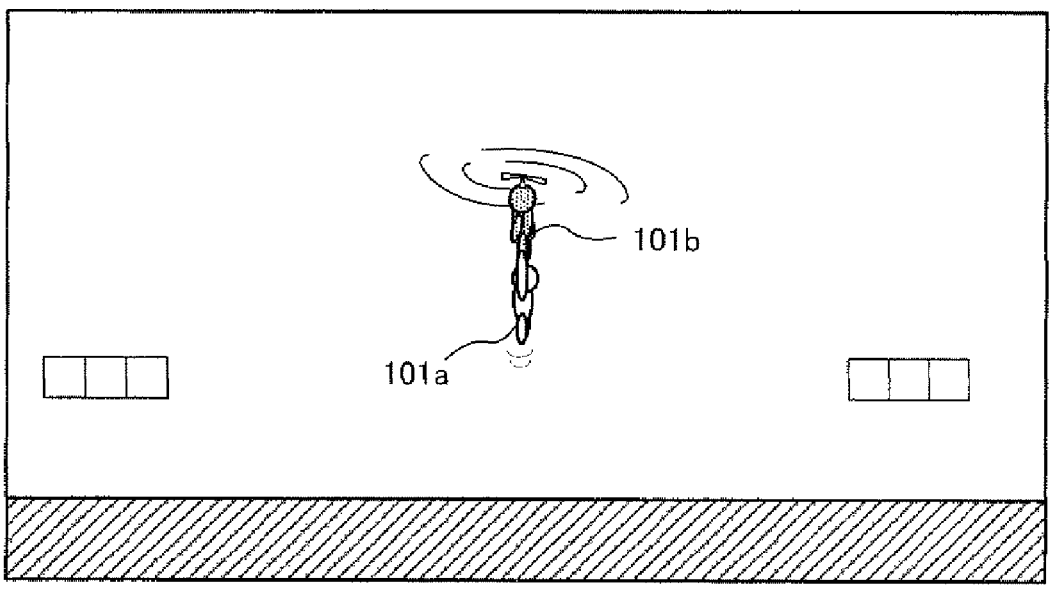
FIG. 14 is a diagram illustrating the uplift operation.

Also in this game, by obtaining a predetermined item, a player object 101 can be transformed into a character having a predetermined "ability" set in advance. For example, by obtaining an item "fire flower", a player object 101 can be transformed into a character (hereinafter referred to as a "fire character") having the ability to "throw a firebomb". By obtaining an item "propeller", a player object 101 can be transformed into a character (hereinafter referred to as a "propeller character") having the ability to "float in the air for a given time". For example, it is assumed that in the state of FIG. 11 the 2P object 101b has been transformed into a "propeller character". In this case, when the 1P player swings his/her controller 7 with the above operation in the state where the 1P object 101a is lifting up the 2P object 101b, the 1P object 101a becomes able to use the "ability" of the 2P object 101b. That is, as shown in FIG. 14, the 1P object 101a, which is not a "propeller character", becomes able to float in the air for a given time, using the ability of the 2P object 101b to float. Similarly, in the case where the 2P object 101b has been transformed into a "fire character", when the 1P player swings his/her controller 7 in the state where the 1P object 101a is lifting up the 2P object 101b, the 1P player becomes able to cause the 2P object 101b that is being lifted up by the 1P object 101a to, as shown in FIG. 15, project a fire bomb. Note that the types of characters into which a player object 101 can be transformed may include a type of character that does not have such an "ability" as described above. In this case, when the 1P player swings his/her controller 7 in the state where the 1P object 101a is lifting up the 2P object 101b, the "spin jump" described above is performed while the 1P object 101a remains lifting up the 2P object 101b. As to the operation for the 2P object 101b that is being lifted up, when the 2P player performs a predetermined operation on his/her controller 7, the 2P object 101b can use the "abilities" described above, such as throwing a "fire bomb".

The present invention relates to a scroll control and a zoom control on the screen that result from the movements of the player objects 101, and also relates to the uplift operation described above.

Specifically, a scroll control process on the screen according to the present embodiment is broadly divided into the following four types:

(1) Horizontal scroll control for a single-player game (hereinafter referred to as "single-player horizontal scroll")

(2) Vertical scroll control for a single-player game (hereinafter referred to as "single-player vertical scroll")

(3) Horizontal scroll control for a multiplayer game (hereinafter referred to as "multiplayer horizontal scroll")

(4) Vertical scroll control for a multiplayer game (hereinafter referred to as "multiplayer vertical scroll")

An overview of each type of scroll control process will be described below. Note that each type of scroll control will be described on the assumption that the zoom magnification of the screen is 1.0-fold. In addition, in the following descriptions, various processes are performed based on the positions of the player objects 101, and therefore it is assumed in the present embodiment that "base points" are set for the feet of the player objects 101 so that the various processes are performed based on the "base points", i.e., using the "base points" as the positions of the player objects 101. Thus, although "the positions of the player objects 101" may simply be described below, this also refers to the positions of the "base points".

[Single-player Horizontal Scroll]

Figure 16:
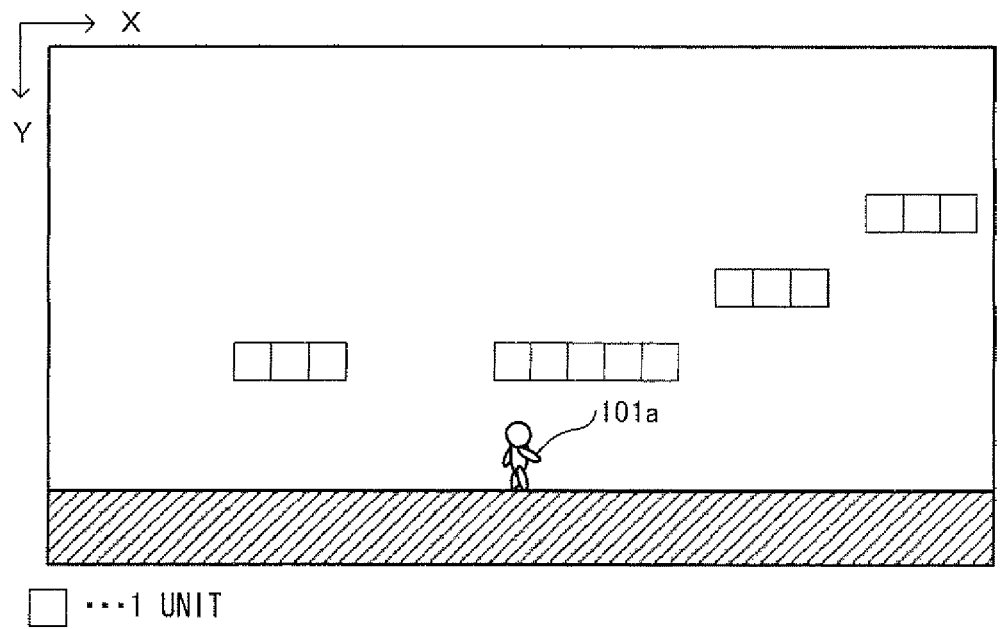
FIG. 16 is a diagram illustrating an overview of single-player horizontal scroll.

First, a horizontal scroll control process (hereinafter referred to as a "single-player horizontal scroll process") performed when only one player plays a game (hereinafter referred to as a "single-player game") will be described. In a single-player game, as shown in FIG. 16, only one player object 101 is displayed on the screen. In this case, a scroll control is performed on the screen so that the player object 101 is constantly displayed at the position that is the center of the screen with respect to the X-axis direction of the screen coordinate system in principle. That is, when the player causes the player object 101 to move in the right direction in the state shown in FIG. 16, the screen also scrolls right (scrolling in the right direction of the screen). When the player causes the player object 101 to move in the left direction, the screen also scrolls left (scrolling in the left direction of the screen).

[Single-player Vertical Scroll]

Figure 17:
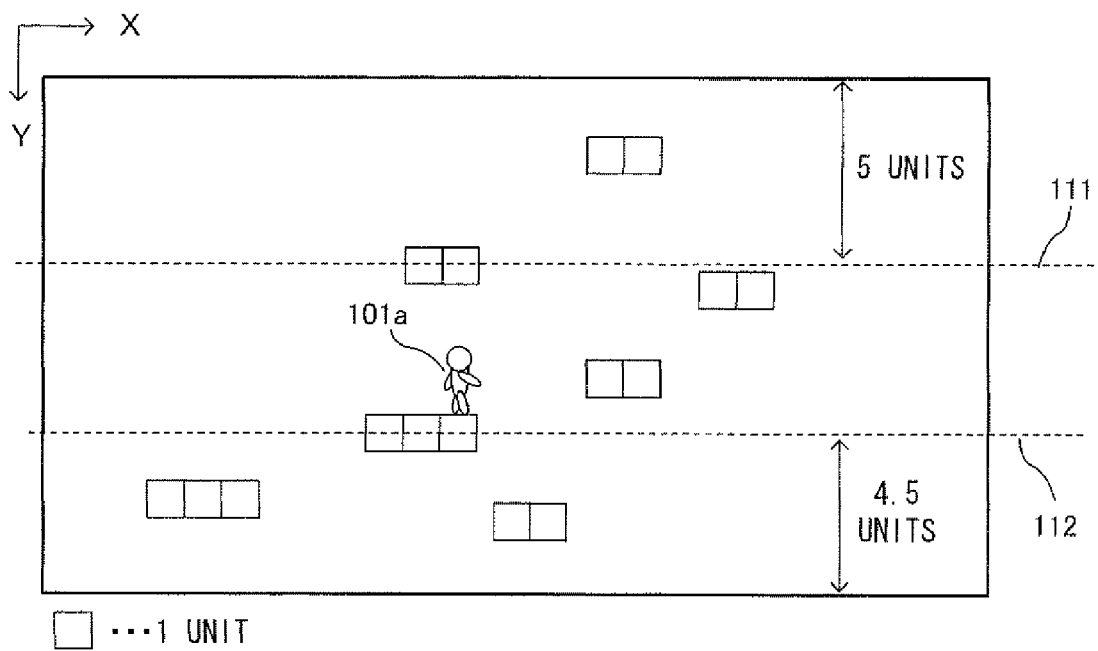
FIG. 17 is a diagram illustrating an overview of single-player vertical scroll.

Next, a vertical scroll control process (hereinafter referred to as a "single-player vertical scroll process") performed in a single-player game will be described. FIG. 17 is a diagram illustrating an overview of the single-player vertical scroll process. In the case of the single-player vertical scroll, when the display position (i.e., the position in the screen coordinate system) of (the feet of) a player object 101 on the screen is to be within 5 units from the upper end of the screen as a result of a player's operation, the screen scrolls up (scrolling in the up direction of the screen). Referring to FIG. 17, the scrolling up is performed when the player object 101 is to be displayed at a higher position than a scrolling-up starting line 111, as a result of causing the player object 101 to move by reflecting a player's operation. On the other hand, when the display position of the player object 101 is to be within 4.5 units from the lower end of the screen, the screen scrolls down (scrolling in the down direction of the screen). Referring to FIG. 17, the scrolling down is performed when the player object 101 is to move to a lower position than a scrolling-down starting line 112. In other words, a control is performed so that when displayed on the screen, the player object 101 is constantly displayed between the scrolling-up starting line 111 and the scrolling-down starting line 112 in principle.

Note that the reason that it is set so that the area for the determination of scrolling up has a larger number of units (i.e., scrolling up is started earlier) than the area for the determination of scrolling down is that the concept of a "priority direction" of scrolling is applied. This game is such a so-called platform game as described above, where the concept of the gravity is applied in the virtual space. Therefore, in a scene where vertical scroll is mainly performed, in order to enhance the visibility of the direction (i.e., the direction of the antigravity; typically the up direction) in which to jump, the direction of the antigravity is set as the "priority direction" so that scrolling up is started earlier. As to horizontal scroll, this game is, as described above, a game where the player objects advance toward the goal point. In response, in each scene (area) of the game, the direction in which to approach the goal point is set as the priority direction so that the screen starts to scroll earlier in the priority direction, whereby the visibility of the direction in which to advance is enhanced. Note that priority directions are set individually in the up/down direction and the left/right direction (hereinafter referred to as a "vertical priority direction" and a "horizontal priority direction", respectively). As to vertical scroll (in the vertical priority direction), the antigravity direction may be set as the vertical priority direction, or the direction in which to approach the goal point may be set as the vertical priority direction, appropriately, in accordance with the scene of the game.

[Multiplayer Horizontal Scroll]

Figure 18:
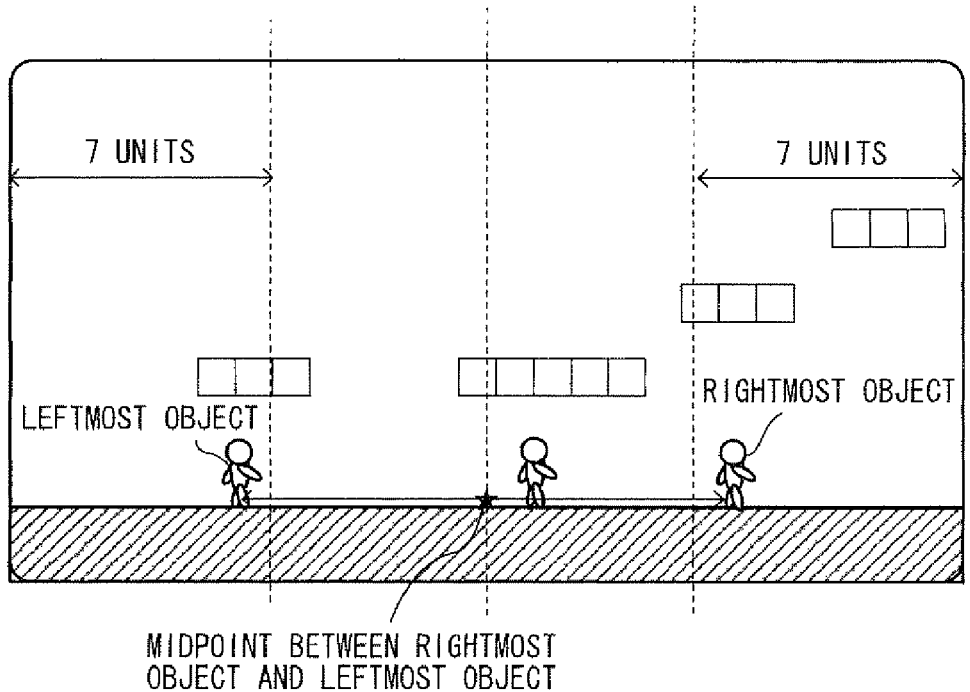
FIG. 18 is a diagram illustrating an overview of multiplayer horizontal scroll.
Figure 19:
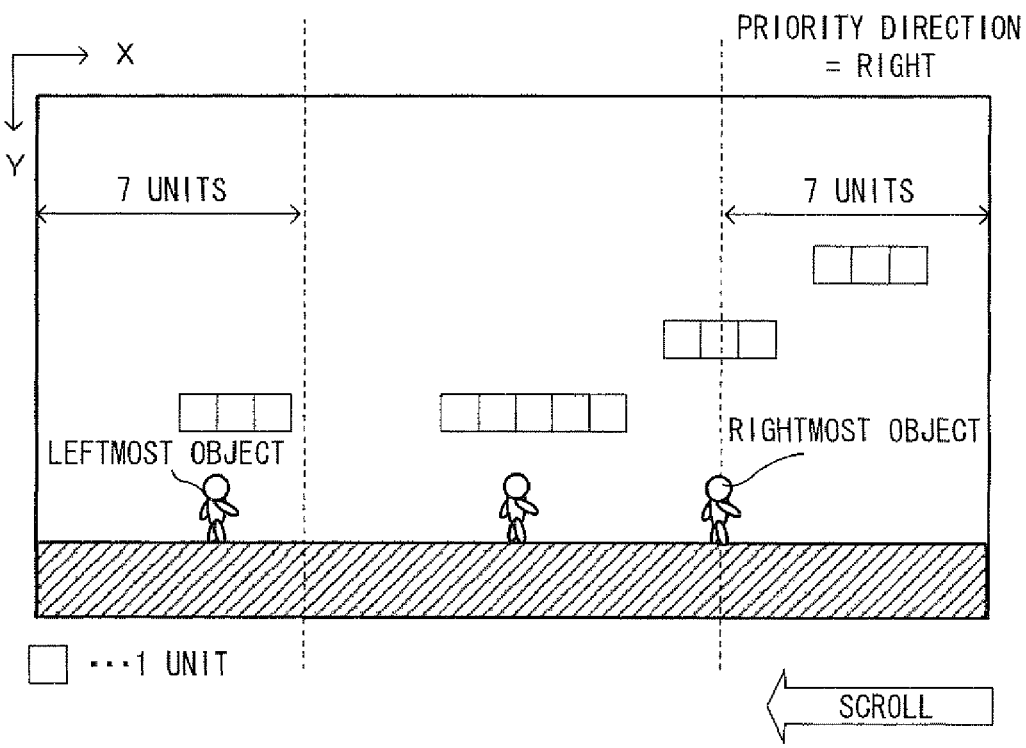
FIG. 19 is a diagram illustrating an overview of the multiplayer horizontal scroll.
Figure 20:
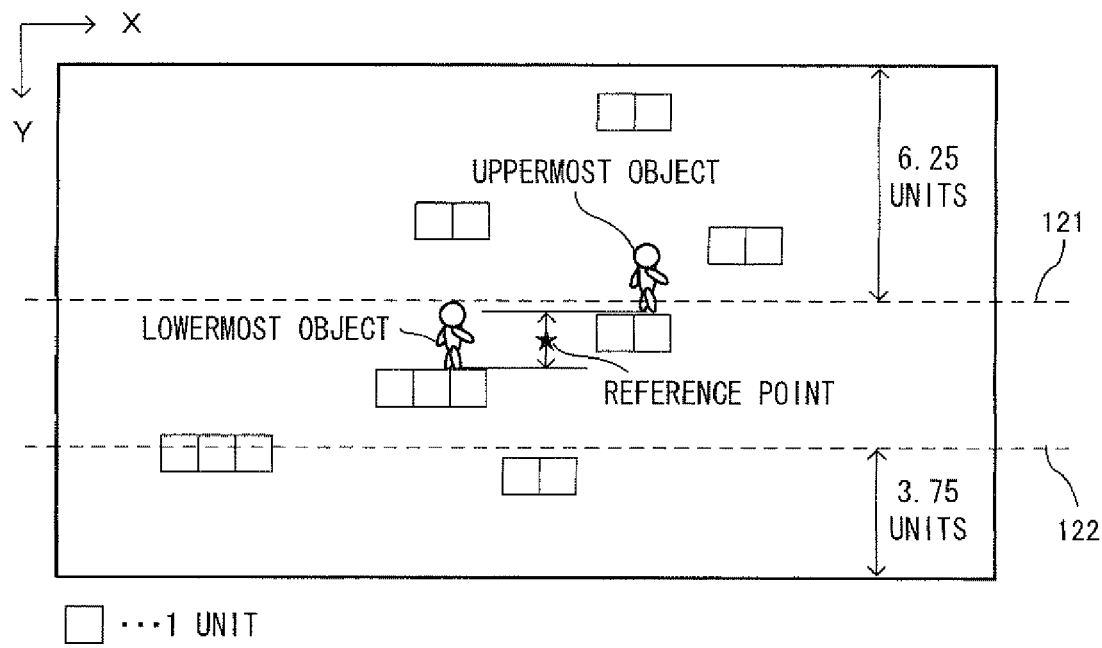
FIG. 20 is a diagram illustrating an overview of multiplayer vertical scroll.

Next, a horizontal scroll control process (hereinafter referred to as a "multiplayer horizontal scroll process") performed when two to four players play a simultaneous game (hereinafter referred to as a "multiplayer game") will be described. In a multiplayer game, a plurality of player objects 101 are displayed on the screen. In the multiplayer horizontal scroll process, a scroll control is basically performed so that, among the player objects 101 displayed on the screen, the midpoint, with respect to the X-axis direction, between the player object (hereinafter referred to as a "rightmost object") displayed at the rightmost position and the player object (hereinafter referred to as a "leftmost object") displayed at the leftmost position is the center of the screen with respect to the X-axis direction. When such a screen is considered where the position of the midpoint between the rightmost object and the leftmost object is the center of the screen, the following control is also performed depending on the relation between the horizontal priority direction and the positions of the player objects displayed at the farthest ends. First, when the horizontal priority direction is the right direction, if, as a result of calculating the screen described above, the position of the rightmost object is, as shown in FIG. 18, to be within 7 units from the right end of the screen (i.e., the right end of the display area), a scroll control is performed so that, as shown in FIG. 19, the rightmost object is displayed at a position 7 units from the right end of the screen. When the horizontal priority direction is the left direction, if the leftmost object is to be displayed within 7 units from the left end of the screen (i.e., the left end of the display area) with respect to the X-axis direction, a scroll control is performed so that the leftmost object is displayed at a position 7 units from the left end of the screen.

[Multiplayer Vertical Scroll]

Figure 21:
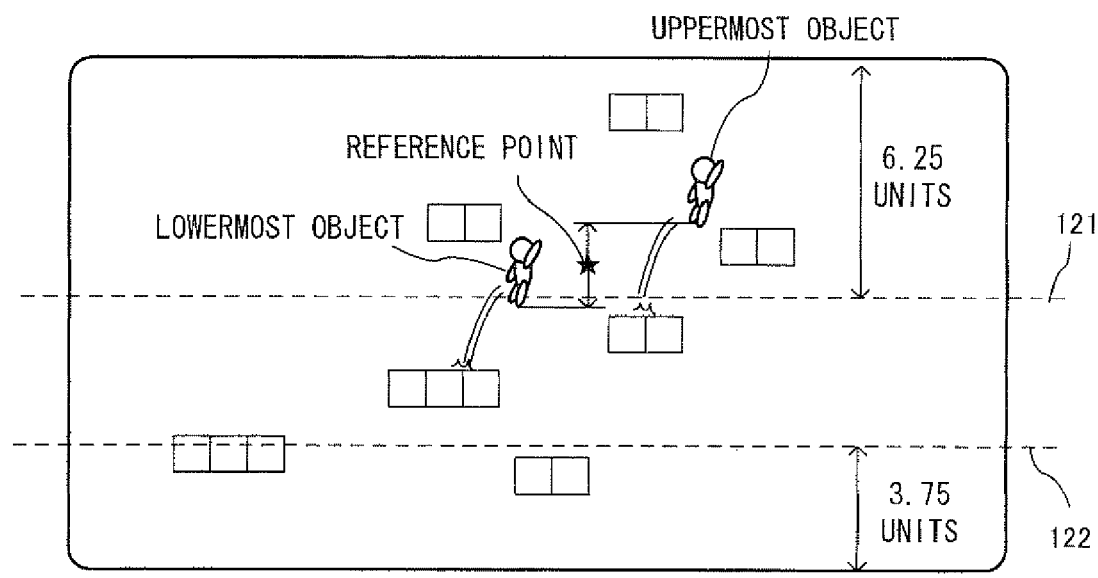
FIG. 21 is a diagram illustrating an overview of the multiplayer vertical scroll.
Figure 23:
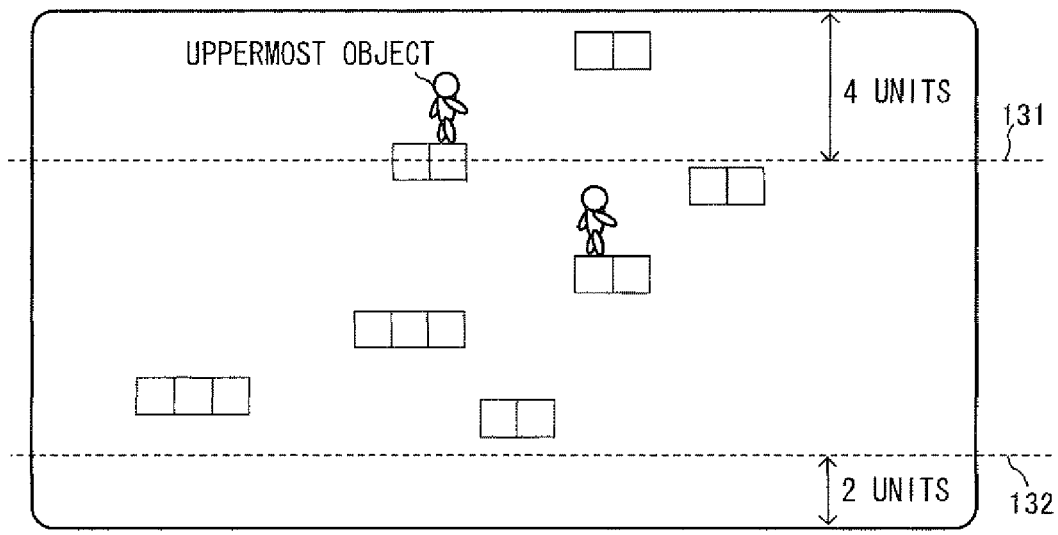
FIG. 23 is a diagram illustrating an overview of multiplayer vertical scroll.

Next, a vertical scroll control process (hereinafter referred to as a "multiplayer vertical scroll process") performed in a multiplayer game will be described. FIGS. 20 through 24 are diagrams illustrating the concept of the multiplayer vertical scroll process. In the multiplayer vertical scroll process, a scroll control is basically performed as follows. First, among a plurality of player objects 101 present in the virtual game space, the midpoint (hereinafter referred to as a "reference point"), with respect to the Y-axis direction, between the player object (hereinafter referred to as an "uppermost object") displayed at the uppermost position and the player object (hereinafter referred to as a "lowermost object") displayed at the lowermost position, on the game screen, is assumed in the coordinate system of the virtual game space (the position of the reference point is calculated based also on the "base points" provided at the feet of the player objects 101). Then a scrolling-up or scrolling-down control is performed based on which position in the screen coordinate system corresponds to the reference point. Specifically, consider the case where the players perform operations of causing the uppermost object and the lowermost object to jump to the upper right, respectively, in the state shown in FIG. 20 (where the position of the reference point is approximately at the center of the screen). In this case, when the position of the reference point is, as shown in FIG. 21, to be within 6.25 units from the upper end of the screen (i.e., the upper end of the display area) with respect to the Y-axis direction (at a higher position than a scrolling-up starting line 121 in FIG. 21) as a result of causing the player objects 101 to move by reflecting players' operations, a scrolling-up control is performed so that, as shown in FIG. 22, the screen is displayed so that the position of the reference point is a position 6.25 units from the upper end of the screen. On the other hand, when the position of the reference point is to be within 3.75 units from the lower end of the screen (i.e., the lower end of the display area) with respect to the Y-axis direction (at a lower position than a scrolling-down starting line 122 in FIG. 21), a scrolling-down control is performed so that the position of the reference point is a position 3.75 units from the lower end of the screen. Although described in detail below, the values such as "6.25 units from the upper end of the screen" and "3.75 units from the lower end of the screen" are appropriately changed in accordance with the zoom magnification.

Figure 24:
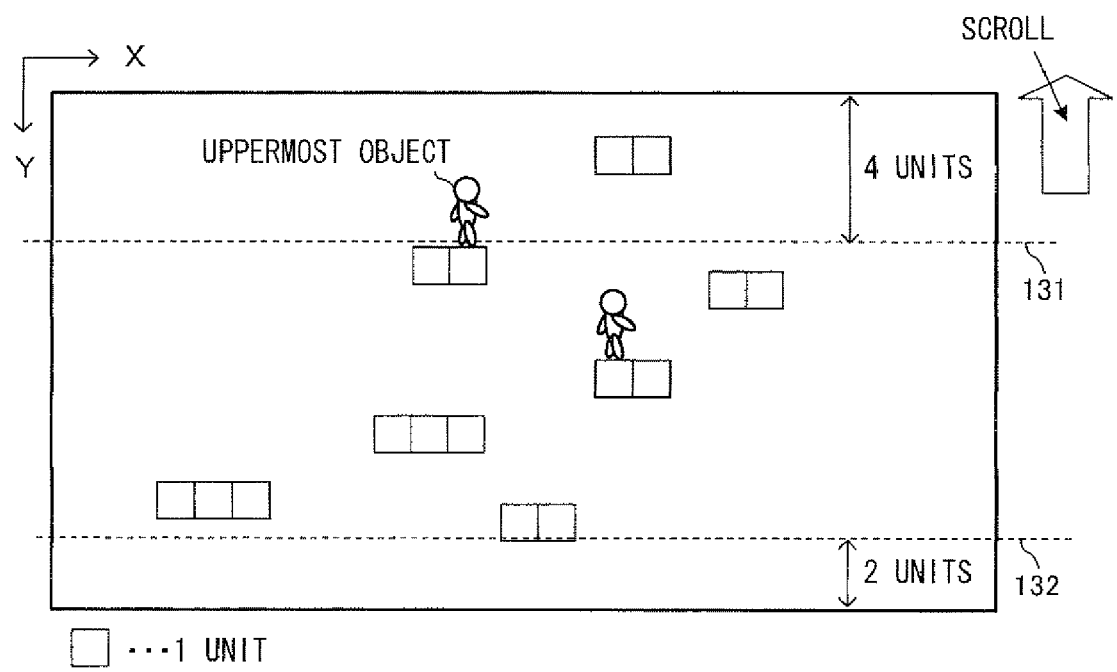
FIG. 24 is a diagram illustrating an overview of the multiplayer vertical scroll.

In the case of assuming the screen described above, when, as shown in FIG. 23, the feet (i.e., the "base point") of the uppermost object are to be displayed within 4 units from the upper end of the screen (at a higher position than a dotted line 131 in FIG. 23), a scroll control is performed so that, as shown in FIG. 24, the feet of the uppermost object are placed at a position 4 units from the upper end of the screen. When the feet of the lowermost object are to be displayed within 2 units from the lower end of the screen (at a lower position than a dotted line 132 in FIG. 23), a scroll control is performed so that the feet of the lowermost object are placed at a position 2 units from the lower end of the screen. When the feet of the uppermost object are to be displayed within 4 units from the upper end of the screen and also the feet of the lowermost object are to be displayed within 2 units from the lower end of the screen, the process for the direction set as the vertical priority direction is prioritized.

Thus, in the present embodiment, different scroll controls are performed between a single-player game and a multiplayer game. In addition, different controls are performed between vertical scroll and horizontal scroll.

Figure 25:
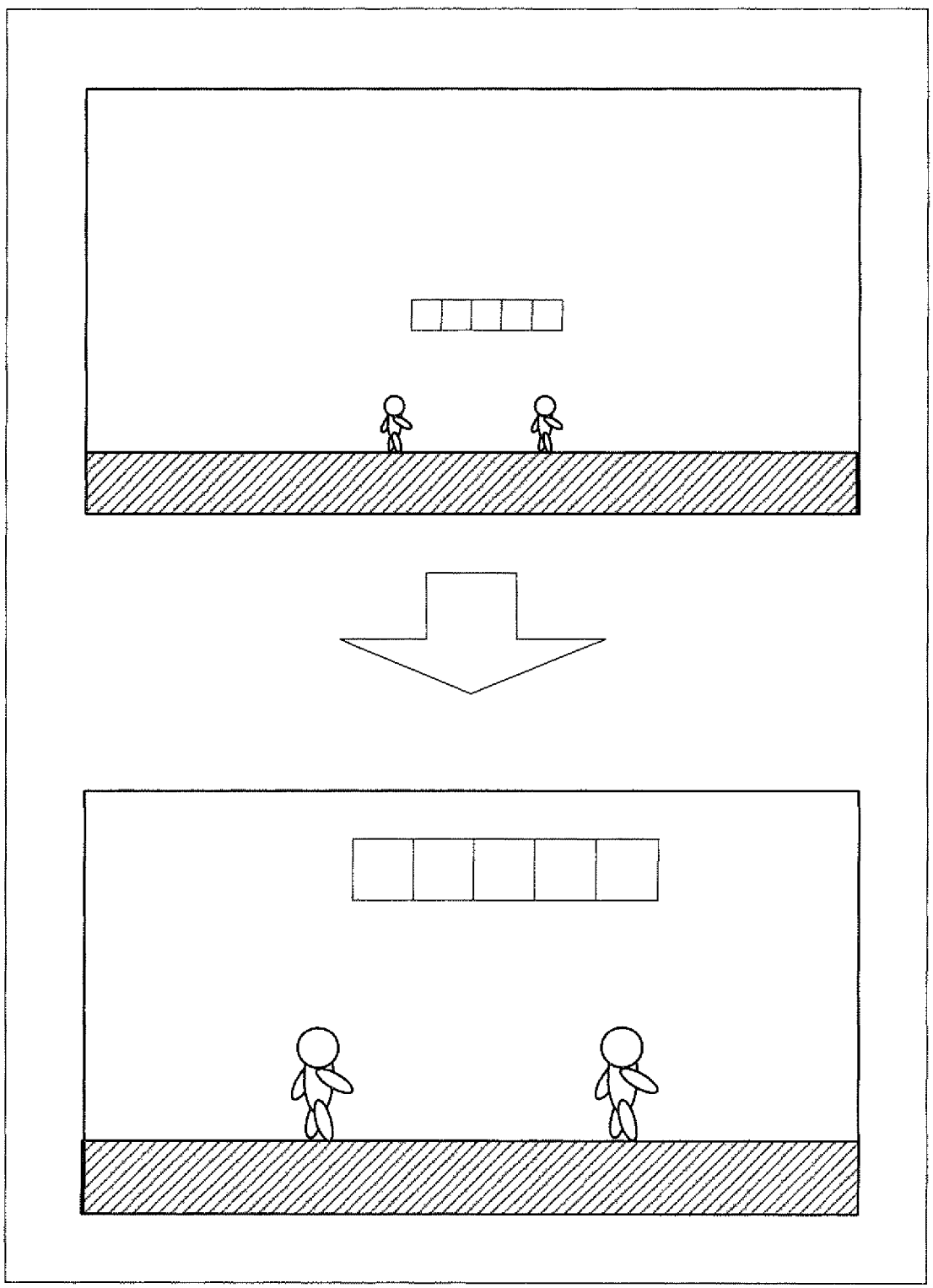
Figure 26:
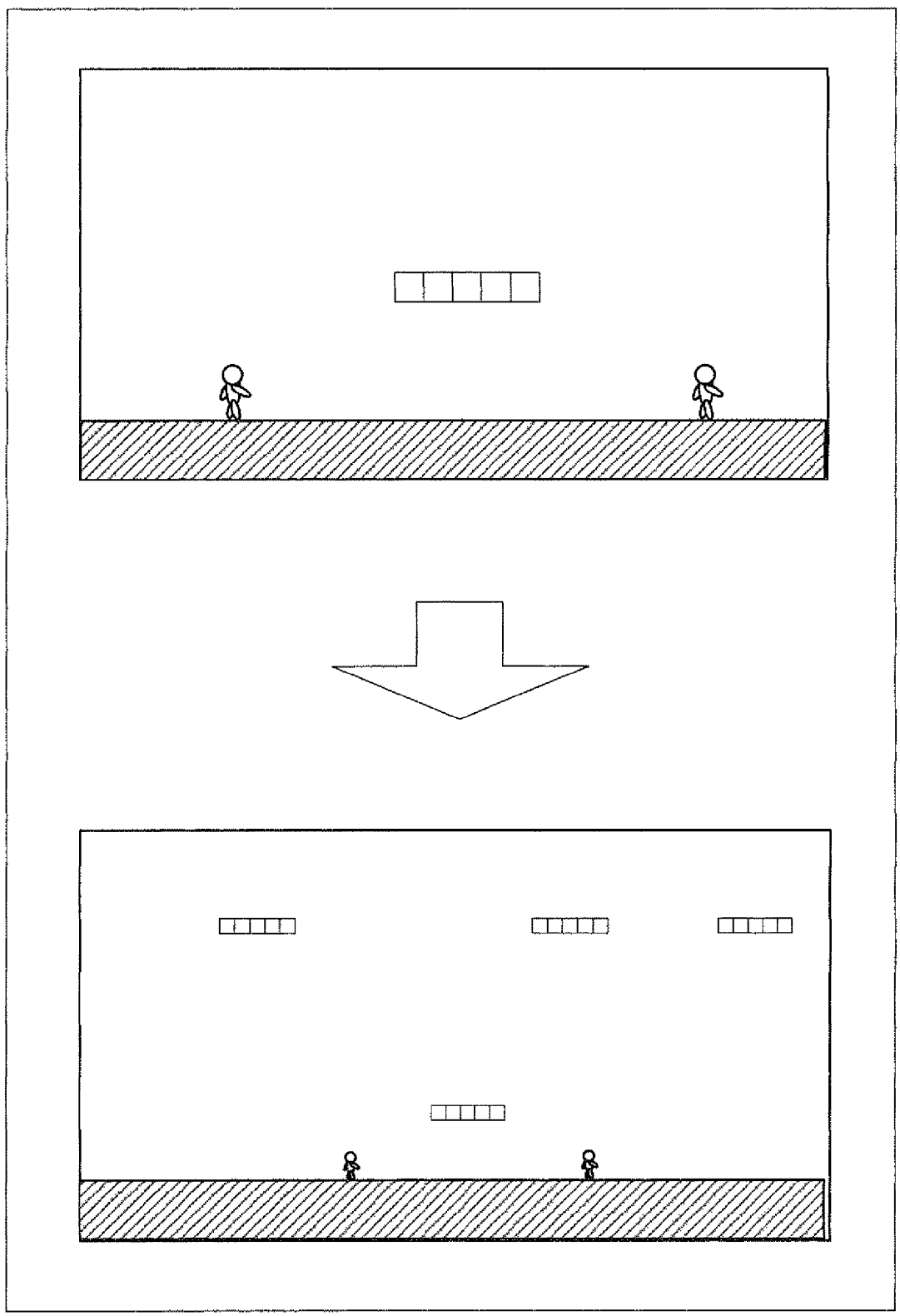
FIG. 26 is a diagram showing an example of zooming out.

In the present embodiment, in order to make the game screen more easily viewable to the players (in a multiplayer game, in particular), the following zoom control is also performed on the screen. First, in the present embodiment, in a single-player game, display is basically performed at a fixed magnification of 1.0-fold (although a magnification set in advance may be appropriately used in a predetermined scene in accordance with the progression of the game). On the other hand, in a multiplayer game, the zoom magnification is determined based on the distances between the player objects 101. That is, when the distances between the player objects 101 are small, zooming in is performed (see FIG. 25). When the distances between the player objects 101 are great, zooming out is performed (see FIG. 26). Specifically, a zoom control is performed with the following process.

First, a distance Dist_X between the farthest-end player objects with respect to the horizontal direction in the virtual space is calculated. That is, the distance between the rightmost object and the leftmost object is calculated. Then a distance Dist_Y between the farthest-end player objects with respect to the vertical direction in the virtual space is calculated. That is, the distance between the uppermost object and the lowermost object is calculated. Then, the greater value of the distances Dist_X and Dist_Y is selected to be a distance Dist_XY. When the value of the distance Dist_XX has exceeded a first threshold (hereinafter referred to as a "zoom-out threshold") set in advance (i.e., when the farthest-end player objects have become separated by some distance from each other), a process is performed of slowly zooming out until a first zoom magnification (hereinafter referred to as a "zoom-out target zoom magnification") set in association with the zoom-out threshold is reached. When the value of the distance Dist_XY has fallen below the zoom-out threshold during the zooming out, the process of zooming out is canceled in the middle thereof.

On the other hand, when the value of the distance Dist_XY has fallen below a second threshold (hereinafter referred to as a "zoom-in threshold") set in advance (i.e., when the farthest-end player objects have come close to each other to some degree), a process is performed of slowly zooming in until a second zoom magnification (hereinafter referred to as a "zoom-in target zoom magnification") set in association with the zoom-in threshold is reached. When the value of the distance Dist_XY has exceeded the zoom-in threshold during the zooming in, the process of zooming in is canceled in the middle thereof. Thus, in the present embodiment, a process is performed of gradually zooming in or gradually zooming out in accordance with whether or not the distance between the farthest-end player objects has fallen below or exceeded the corresponding predetermined threshold.

Figure 27:
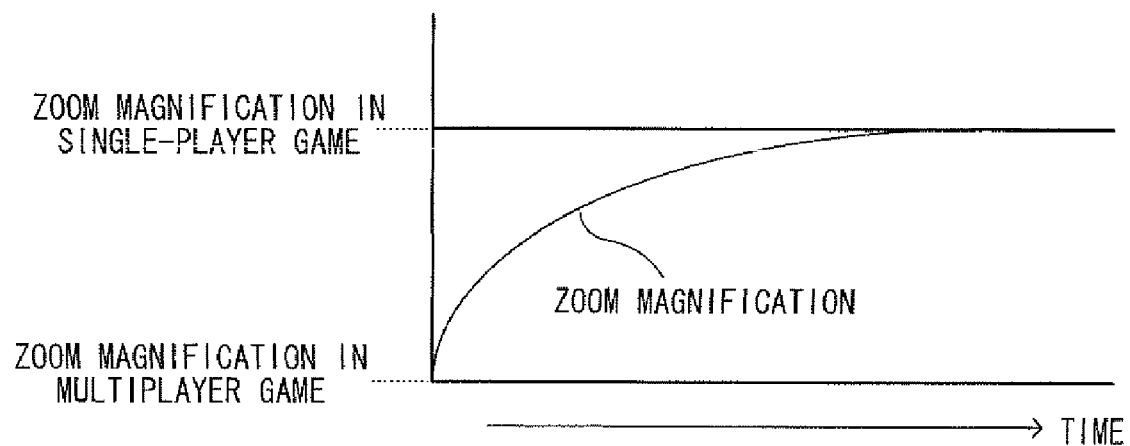
FIG. 27 is a diagram illustrating a switch process.

In the present embodiment, in order to smoothly switch a single-player game screen control and a multiplayer game screen control when the number of player objects 101 in a game has changed, the following process is performed. For example, it is assumed that when a two-player simultaneous game has been played and the game is over for one of the players, the two-player simultaneous game switches to a single-player game. In this case, it is assumed that, for example, the screen has been displayed at a zoom magnification of 0.25-fold when the two-player game has been played (when the game has been over). Then an attempt is made to display the screen at a zoom magnification of 1.0-fold since the two-player game switches to the single-player game. At this time, in order to prevent the screen display from abruptly switching from the display at 0.25-fold magnification to the display at 1.0-fold magnification as soon as the single-player game starts, in the present embodiment a process is performed of changing the zoom magnification by 12.5% each time from 0.25-fold to 1.0-fold (see the graph of FIG. 27). The same is also true of scroll controls on the screen. For example, in order to prevent a player object 101, displayed on the right of the screen in a two-player game, from being suddenly displayed in the center portion of the screen as soon as a single-player game starts, a scroll control is performed so that the player object 101 is gradually placed in the center portion of the screen. That is, a process is performed of gradually changing the control parameters for the screen in the two-player game to the control parameters for the screen in the single-player game.

Thus, in the present embodiment, a scroll control and a zoom control are performed on the screen based on the positions and the like of the player objects that are displayed at the farthest ends in a multiplayer game. This makes it possible to perform screen display that is more easily viewable to the players.

Figure 28:
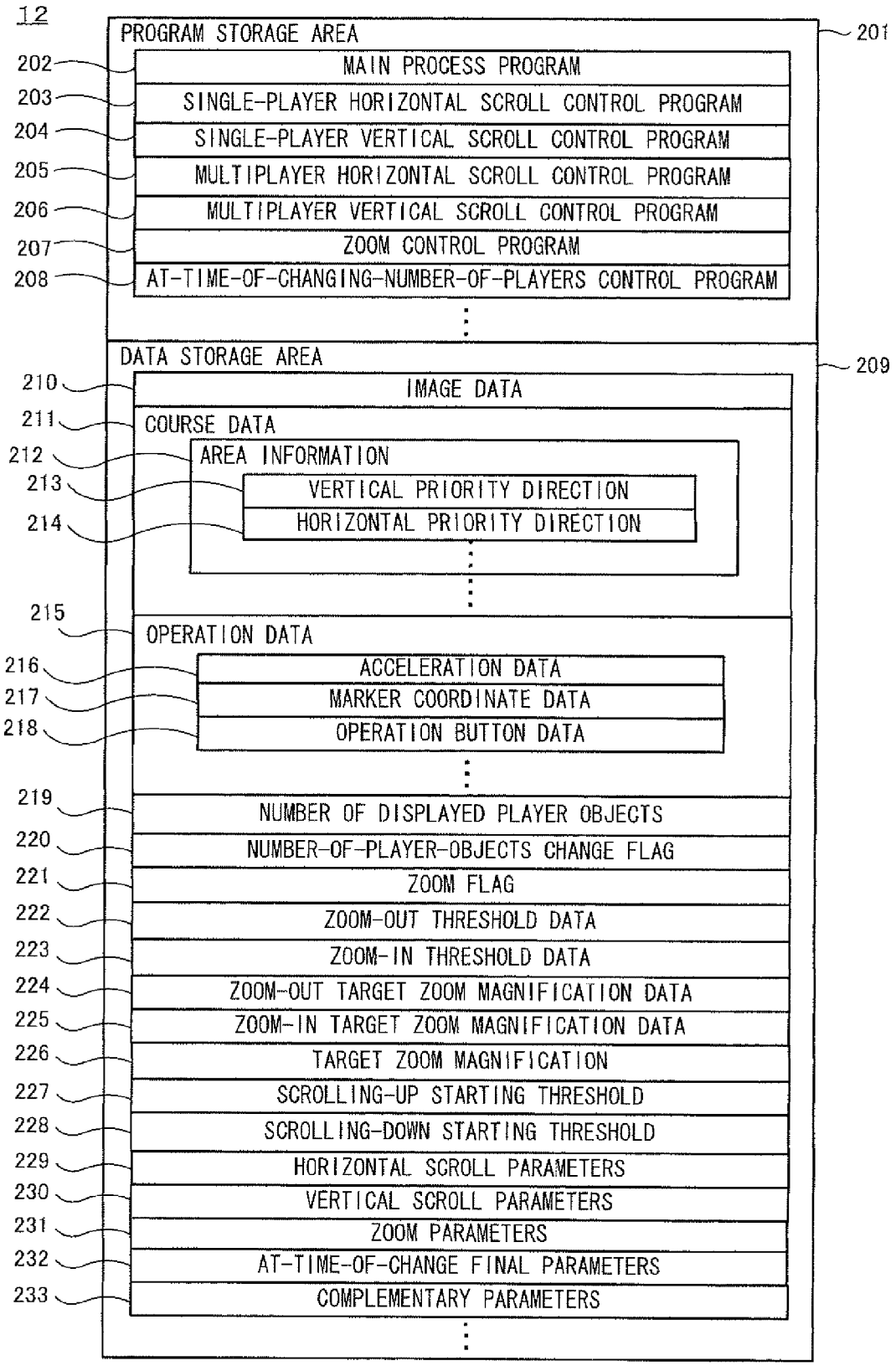
FIG. 28 is a diagram showing a memory map of an external main memory 12 of the game apparatus 3.

Next, details of the game processing performed by the game apparatus 3 will be described. First, the data to be stored in the external main memory 12 in the game processing will be described. FIG. 28 is a diagram showing a memory map of the external main memory 12 of the game apparatus 3. Referring to FIG. 28, the external main memory 12 includes a program storage area 201 and a data storage area 209. The data of the program storage area 201 and a part of the data of the data storage area 209 are stored in the optical disk 4, and are transmitted to and stored in the external main memory 12 when the game program is executed.

The program storage area 201 stores therein the game program to be executed by the CPU 10. The game program includes a main process program 202, a single-player horizontal scroll control program 203, a single-player vertical scroll control program 204, a multiplayer horizontal scroll control program 205, a multiplayer vertical scroll control program 206, a zoom control program 207, an at-time-of-changing-number-of-players control program 208, and the like.

Figure 29:
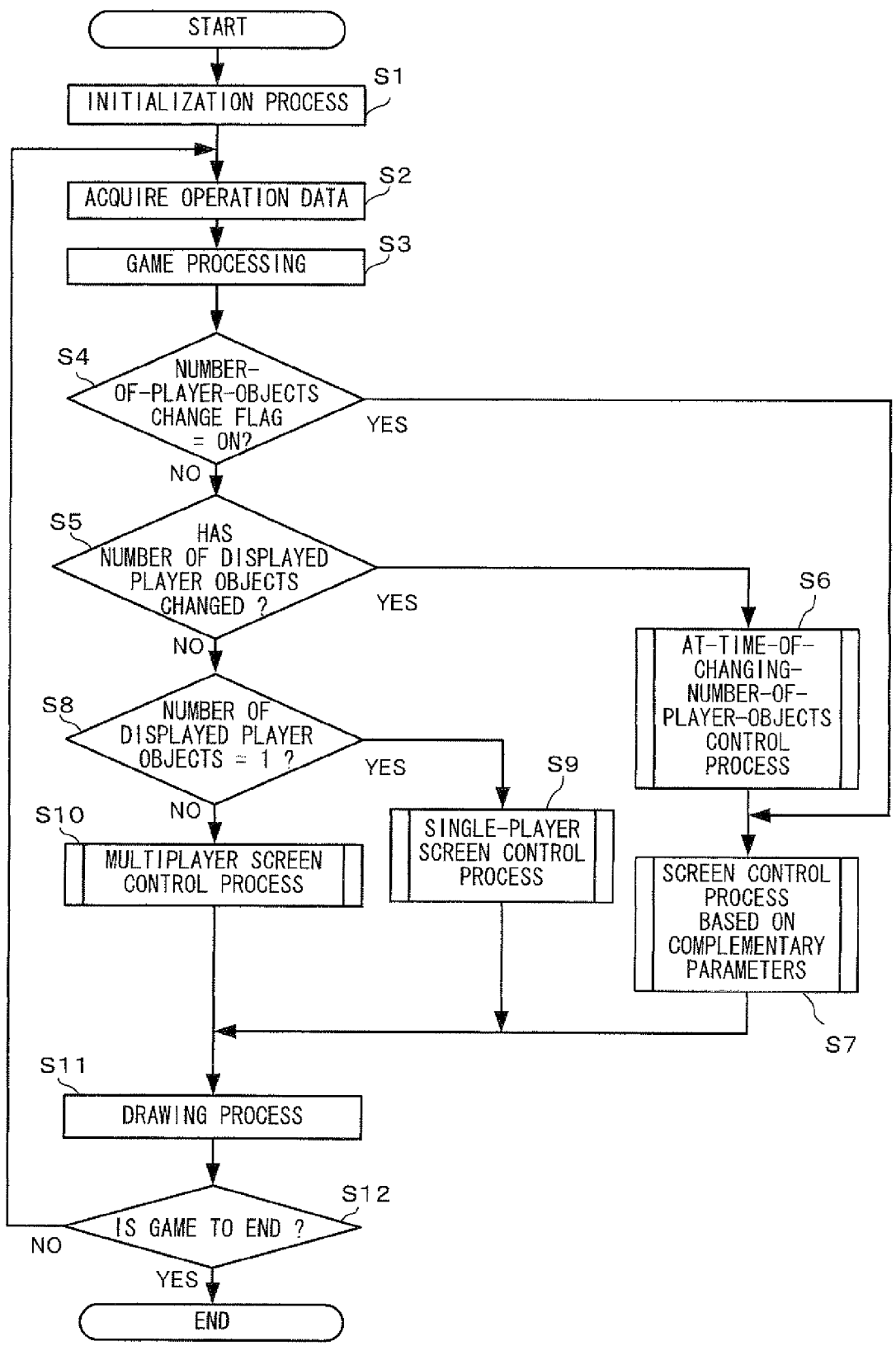
FIG. 29 is a flow chart showing game processing according to the present invention.

The main process program 202 is a program that corresponds to the process of the flow chart of FIG. 29 described below. The single-player horizontal scroll control program 203, the single-player vertical scroll control program 204, the multiplayer horizontal scroll control program 205, and the multiplayer vertical scroll control program 206 are programs for causing the CPU 10 to perform the respective scroll control processes on the screen. The zoom control program 207 is a program for causing the CPU 10 to perform a zoom control process. The at-time-of-changing-number-of-players control program 208 is a program for causing the CPU 10 to perform the above-described process of switching the single-player game screen control and the multiplayer game screen control.

The data storage area 209 has stored therein data such as image data 210, course data 211, operation data 215, the number of displayed player objects 219, a number-of-player-objects change flag 220, a zoom flag 221, zoom-out threshold data 222, zoom-in threshold data 223, zoom-out target zoom magnification data 224, zoom-in target zoom magnification data 225, a target zoom magnification 226, a scrolling-up starting threshold 227, a scrolling-down starting threshold 228, horizontal scroll parameters 229, vertical scroll parameters 230, zoom parameters 231, at-time-of-change final parameters 232, and complementary parameters 233.

The image data 210 is data of various objects and the like that are displayed as a game image.

The course data 211 is data about the virtual game space. Since each course is formed of a plurality of areas, the course data 211 includes a plurality of pieces of area information 212 about all the areas. Each piece of area information 212 includes vertical priority direction data 213 and horizontal priority direction data 214 that represent the priority directions in the corresponding area. Each piece of area information 212 also includes data of, for example, information representing the start position and the end position of the corresponding area and the arrangement of terrain objects and the like.

The operation data 215 is operation data transmitted from the controller 7 to the game apparatus 3. As described above, since operation data is transmitted from the controller 7 to the game apparatus 3 every 1/200 sec., the operation data 215 stored in the external main memory 12 is updated as often. In the present embodiment it is only necessary for the external main memory 12 to have stored therein only the most recent (the last obtained) operation data.

The operation data 215 includes acceleration data 216, marker coordinate data 217, and operation button data 218. The acceleration data 216 is data representing the accelerations (the acceleration vector) detected by the acceleration sensor 701. Here, the acceleration data 216 represents a three-dimensional acceleration vector whose components are accelerations in the three-axis (X-axis, Y-axis, and Z-axis) directions shown in FIG. 3. In the present embodiment the magnitude of the acceleration vector detected by the acceleration sensor 701 in the state where the controller 7 remains at rest is "1". That is, the magnitude of the gravitational acceleration detected by the acceleration sensor 701 is "1".

The marker coordinate data 217 is data representing the coordinates calculated by the image processing circuit 744 of the imaging information calculation section 74, that is, data representing marker coordinates. The marker coordinates are represented by a two-dimensional coordinate system for representing the position, on a plane, corresponding to a captured image. Note that when the two markers 8R and 8L are captured by the image pickup device 743, two sets of the marker coordinates are calculated. On the other hand, when either one of the markers 8R and 8L is placed outside the range that can be captured by the image pickup device 743, only the other one is captured by the image pickup device 743 and only the one set of the marker coordinates is calculated. Alternatively, when both markers 8R and 8L are placed outside the range that can be captured by the image pickup device 743, neither markers are captured by the image pickup device 743 and none of the marker coordinates is calculated. Therefore the marker coordinate data 217 may represent two sets of the marker coordinates, may represent one set of the marker coordinates, or may represent that none of the marker coordinates is present.

The operation button data 218 is data representing the input states of the operation buttons 72a, 72b, 72c, 72d, 72e, 72f, 72g, 72h, and 72i.

The number of displayed player objects 219 is data representing the number of the player objects displayed on the screen, and also is the number of the players that are participating in the gameplay.

The number-of-player-objects change flag 220 is a flag for representing whether or not the number of the player objects displayed on the screen has changed during the gameplay. The zoom flag 221 is a flag for representing whether or not a zoom process is being performed. The zoom flag 221 is set to "OFF" when a zoom process is not being performed. Note that while a zoom process is being performed, the value representing the type of the zoom, i.e., "ZOOM IN" or "ZOOM OUT", is set in the zoom flag 221.

The zoom-out threshold data 222 is data representing the threshold for determining whether or not to zoom out. When the distance between the player objects placed at farthest ends exceeds the threshold, zooming out is performed. The zoom-in threshold data 223 is data representing the threshold for determining whether or not to zoom in. When the distance between the player objects placed at farthest ends falls below the threshold, zooming in is performed.

The zoom-out target zoom magnification data 224 is the zoom magnification that is targeted for the zooming out performed when the distance has exceeded the zoom-out threshold. In the present embodiment the targeted zoom magnification is 0.5-fold. The zoom-in zoom magnification data 225 is the zoom magnification that is targeted for the zooming in performed when the distance has fallen below the zoom-in threshold. In the present embodiment the targeted zoom magnification is 2.0-fold.

The target zoom magnification 226 is data representing a zoom magnification to be targeted. In the present embodiment either one of the values of the zoom-out target zoom magnification data 224 and the zoom-in zoom magnification data 225 is set.

The scrolling-up starting threshold 227 is information corresponding to "6.25 units from the upper end of the screen" shown in FIG. 21 that is used in the multiplayer vertical scroll process. The scrolling-down starting threshold 228 is information corresponding to "3.75 units from the lower end of the screen" shown in FIG. 21.

The horizontal scroll parameters 229 are various parameters that are necessary for a horizontal scroll control on the screen. For example, the various parameters are parameters representing the direction of scrolling, the amount of scrolling, the speed of scrolling, and the like. The vertical scroll parameters 230 are various parameters that are necessary for a vertical scroll control on the screen.

The zoom parameters 231 are information representing the zoom magnification of a game image to be drawn in the current loop of the process. The at-time-of-change final parameters 232 have stored therein the final scroll parameters and zoom parameters when the number of the displayed player objects has changed. The complementary parameters 233 are data used for a process performed when the number of the displayed player objects has changed.

The game processing performed by the game apparatus 3 will be described with reference to FIGS. 29 through 42. When the power to the game apparatus 3 is turned on, the CPU 10 of the game apparatus 3 performs the starting program stored in the ROM/RTC 13, whereby each unit such as the external main memory 12 is initialized. The external main memory 12 reads the game program stored in the optical disk 4, and the CPU 10 starts executing the game program. The flow chart of FIG. 29 is a flow chart showing the game processing performed after the process described above is completed.

The CPU 10 performs an initialization process of the data to be used in the following process (step S1). Specifically, the CPU 10 detects the number of the players to participate in the gameplay, and sets the detected number in the number of displayed player objects 219. The CPU 10 reads the course data 211, constructs a three-dimensional game space, and appropriately arranges player objects 101 that correspond to the number of the participants, blocks 102, various terrain objects, enemy objects, and the like. The CPU 10 sets the zoom parameters 231 to "1.0-fold", and sets the number-of-player-objects change flag 220 and the zoom flag 221 to "OFF". In addition, the CPU 10 initializes various data that is necessary for starting the game, such as the scrolling-up starting threshold 227 and the scrolling-down starting threshold 228. The CPU 10 generates a game image representing the game space constructed as above, and displays the generated game image on the TV 2. The loop of the process of steps S2 through S12 is performed in each frame in a repeated manner, whereby the game progresses.

After the initialization process is completed, the CPU 10 acquires data transmitted from a controller 7, and stores the acquired data in the external main memory 12 as the operation data 215 (step S2).

Figure 30:
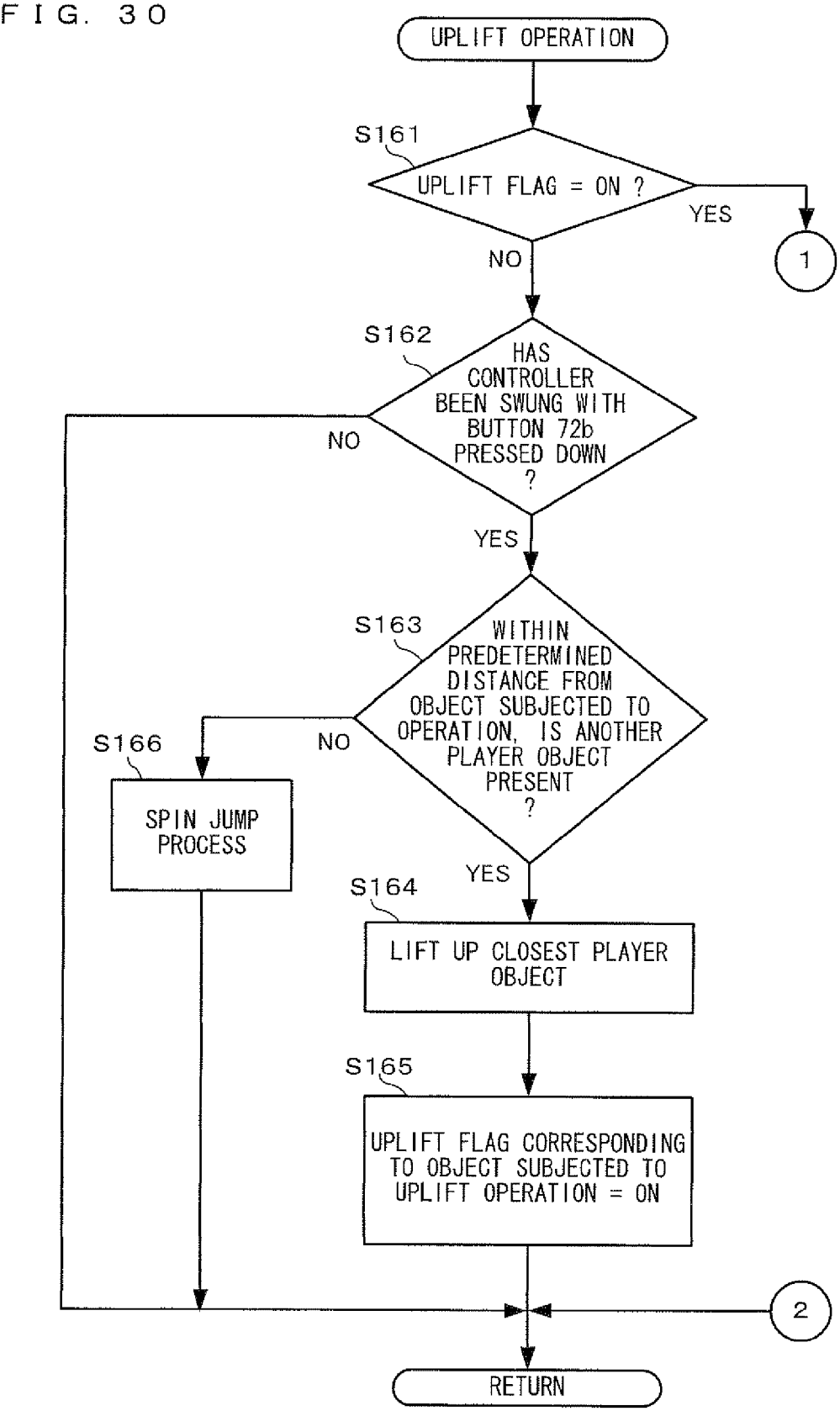
FIG. 30 is a flow chart showing details of an uplift process.
Figure 31:
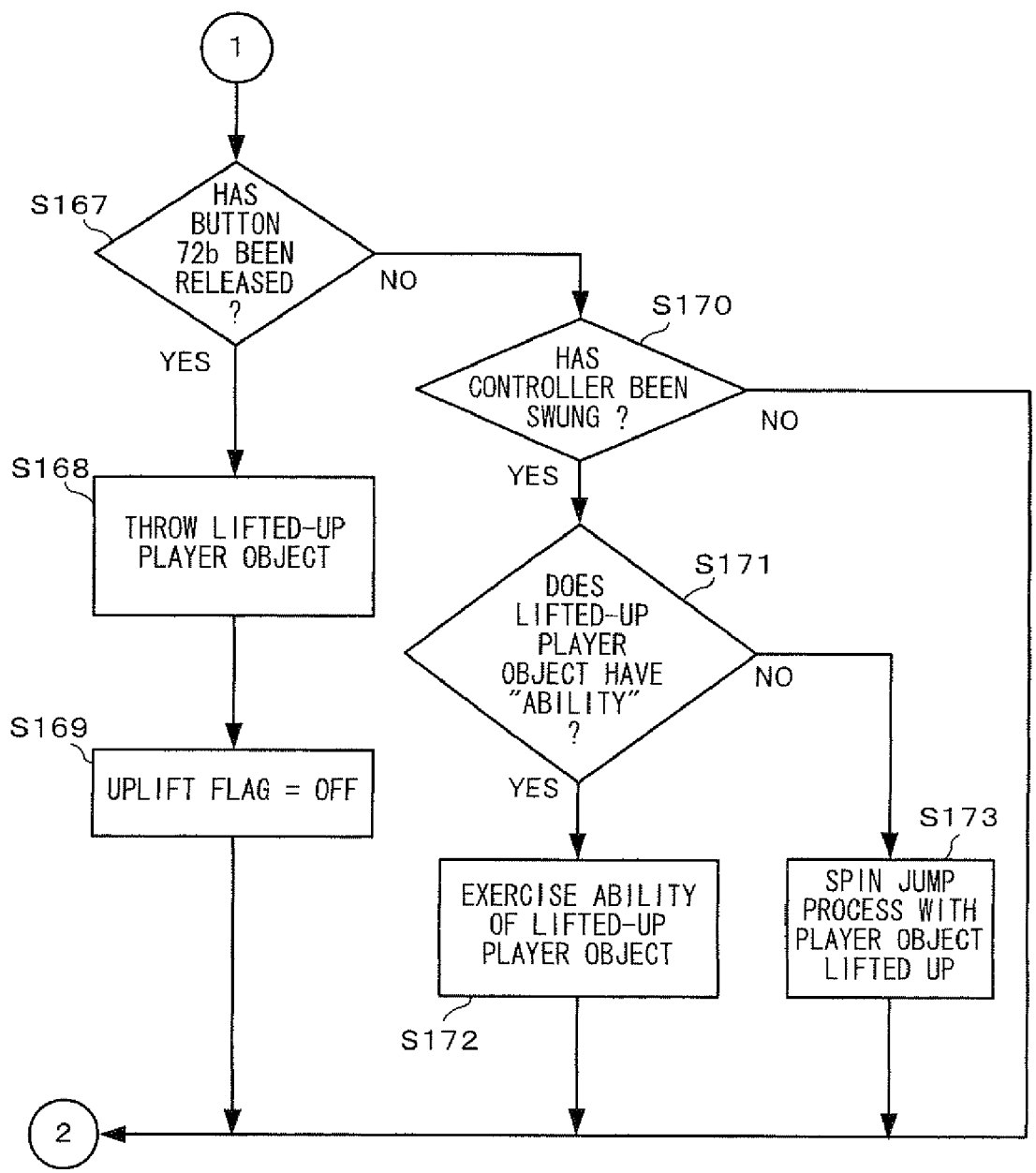
FIG. 31 is a flow chart showing details of the uplift process.

The CPU 10 performs the game processing based on the operation data 215 (step S3). That is, based on the operation data 215, the CPU 10 causes the player objects 101 to act. In the game processing a process of the uplift operation is also performed. FIGS. 30 and 31 are a flow chart showing details of an uplift process that is appropriately called and performed by the CPU 10 as part of the game processing in step S3. Note that the process of the flow chart of FIGS. 30 and 31 is performed on each player object 101. Referring to FIG. 30, the CPU 10 determines whether or not an uplift flag (not shown, but appropriately stored in the external main memory 12 and prepared for each player object) for representing whether or not the player object 101 is lifting up another player object 101 is set to "ON" (step S161). When it is determined that the uplift flag is not set to "ON" ("NO" in step S161), the CPU 10 determines, with reference to the operation data 215, whether or not the controller 7 has been swung with the button 72b pressed down (step S162). The determination of whether or not the controller 7 has been swung is made based on, for example, whether or not the acceleration represented by the acceleration data 216 is greater than a predetermined value. The number of the axes of the accelerations used for the determination may be two or three. Alternatively, the determination may be made with weights assigned to the axes. For example, the acceleration in the X-axis direction may be assigned a greater weight.

When it is determined that the controller 7 has not been swung with the button 72b pressed down ("NO" in step S162), the uplift process ends. When it is determined that the controller 7 has been swung with the button 72b pressed down ("YES" in step S162), the CPU 10 determines whether or not, in the virtual space, within a predetermined distance from the player object 101 subjected to the operation of swinging the controller 7 with the button 72b pressed down, at least one other player object 101 is present (step S163). When it is determined that no player object 101 is present within the predetermined distance ("NO" in step S163), the CPU 10 performs a process of the "spin jump" (step S166), and ends the uplift process. On the other hand, when it is determined that more than one other player object 101 is present within the predetermined distance ("YES" in step S163), the CPU 10 performs a process of causing the player object 101, subjected to the above swing operation, to lift up another player object 101 that is present at the closest position (step S164). The CPU 10 sets the uplift flag, which corresponds to the player object 101 subjected to the above swing operation, to "ON" (step S165), and ends the uplift process.

On the other hand, when it is determined that the uplift flag is set to "ON" ("YES" in step S161), it is considered that the player object 101 is already lifting up another player object 101. At this time, the CPU 10 determines whether or not the button 72b has been released (from the state of being pressed down) (step S167). When it is determined that the button 72b has been released ("YES" in step S167), the CPU 10 performs a process of causing the player object 101, subjected to the above release operation, to throw said another player object 101 that is being lifted up (step S168). The CPU 10 sets the uplift flag to "OFF" (step S169), and ends the uplift process.

When it is determined that the button 72b has not been released (i.e., is being pressed down) ("NO" in step S167), the CPU 10 determines, as described above, based on the acceleration data 216, whether or not the controller 7 has been swung (step S170). When it is determined that the controller 7 has not been swung ("NO" in step S170), the CPU 10 ends the uplift process. On the other hand, when it is determined that the controller 7 has been swung ("YES" in step S170), the CPU 10 determines whether or not said another player object 101 that is being lifted up has any "ability" (i.e., has been transformed into a character having an "ability") (step S171). When it is determined that said another player object 101 does not have any "ability" ("NO" in step S171), the CPU 10 performs the process of the "spin jump" on the player object 101 with said another player object 101 lifted up (step S173). On the other hand, when it is determined that said another player object 101 has an "ability" ("YES" in step S171), the CPU 10 performs a process of causing said another player object 101 that is being lifted up to exercise the ability of said another player object 101 (step S172). For example, when said another player object 101 that is being lifted up has been transformed into a "fire character", the CPU 10 performs a process of causing said another player object 101 that is being lifted up to project a fire bomb. When said another player object 101 that is being lifted up has been transformed into a "propeller character", the CPU 10 performs a process of causing the player object 101, subjected to the above swing operation, to jump without landing and remain floating in the air. Thus the uplift process ends.

Referring back to FIG. 29, the CPU 10 determines whether or not the number-of-player-objects change flag 220 is set to "ON" (step S4). When it is determined that the number-of-player-objects change flag 220 is set to "ON" ("YES" in step S4), the process proceeds to step S7 described below.

On the other hand, when it is determined that the number-of-player-objects change flag 220 is set to "OFF" ("NO" in step S4), the CPU 10 determines whether or not the number of the displayed player objects 101 has changed (step S5). It is determined, for example, whether or not, during a two-player simultaneous game, the game is over for one of the players. When it is determined that the number of the displayed player objects 101 has changed ("YES" in step 35), the CPU 10 appropriately updates the number of displayed player objects 219, proceeds to step S6 described below, and performs a process of switching screen controls when the number of the displayed player objects 101 has changed.

On the other hand, when it is determined that the number of the displayed player objects 101 has not changed ("NO" in step S5), the CPU 10 determines whether or not the number of displayed player objects 219 is "1", i.e., whether a single-player game is being played or a multiplayer game is being played (step S8). When it is determined that the number of displayed player objects 219 is "1" ("YES" in step S8), the CPU 10 proceeds to step S9 described below and performs a screen control process for a single-player game. On the other hand, when it is determined that the number of displayed player objects 219 is not "1" ("NO" in step S8), the CPU 10 proceeds to step S10 described below and performs a screen control process for a multiplayer game.

The CPU 10 performs a process of drawing a screen based on step S7, S9, or S10 (step S11). After step S11, the CPU 10 determines whether or not predetermined game ending conditions have been fulfilled (step S12). When it is "YES", the CPU 10 ends the game processing. When it is "NO", the CPU 10 returns to step S2 and repeats the game processing.

Figure 32:
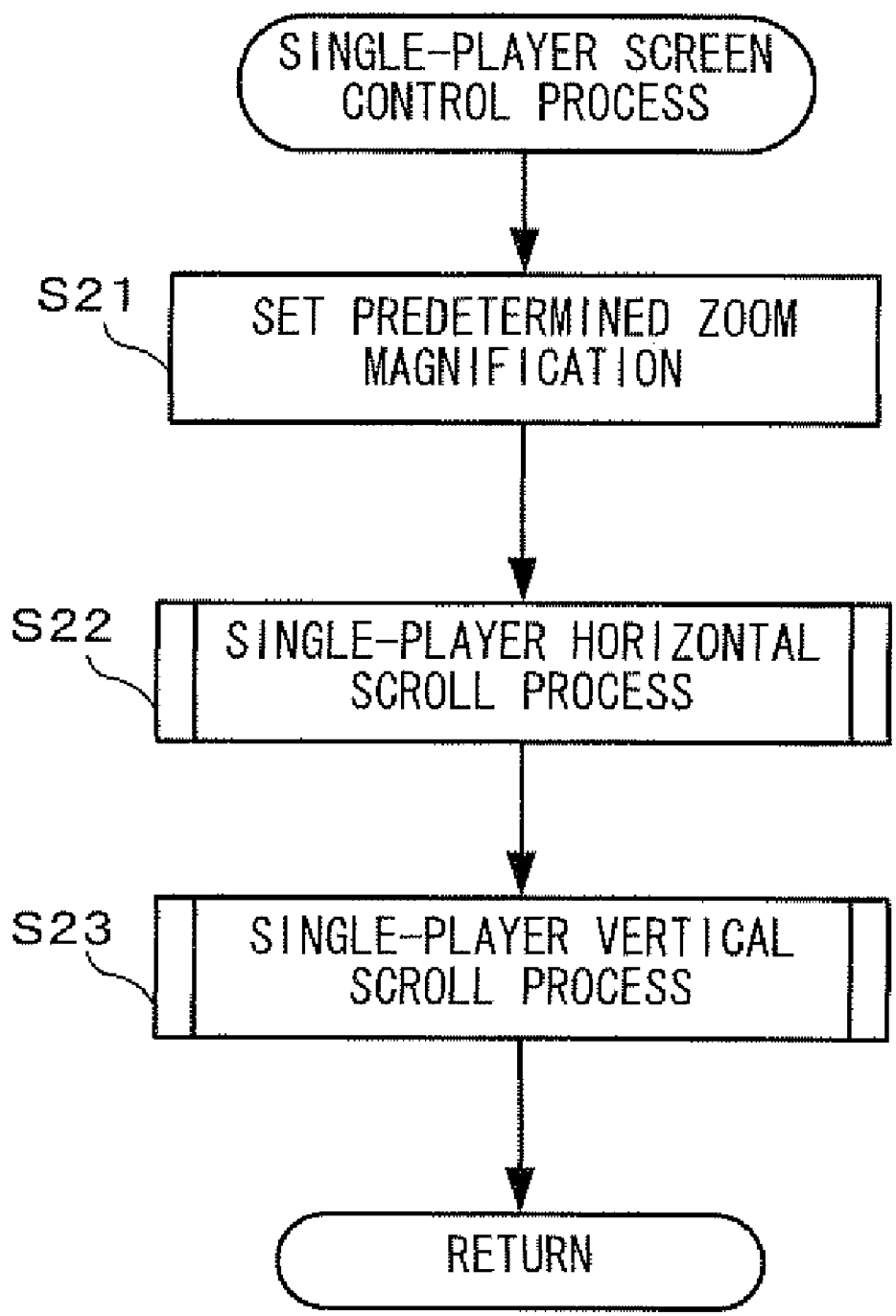
FIG. 32 is a flow chart showing details of a single-player screen control process of step S9 of FIG. 29.

A single-player screen control process of step S9 will be described. In this process, various screen control processes in a single-player game are performed. FIG. 32 is a flow chart showing details of the single-player screen control process of step S9. Referring to FIG. 32, the CPU 10 sets a predetermined zoom magnification in the zoom parameters 231 (step S21). In the present embodiment, basically, 1.0-fold is set in a single-player game. However, a zoom magnification set in advance may be appropriately set in accordance with the progression of the game even in a single-player game. For example, when the player object 101 enters a predetermined place on a course, zooming in may be forcibly performed.

Figure 33:
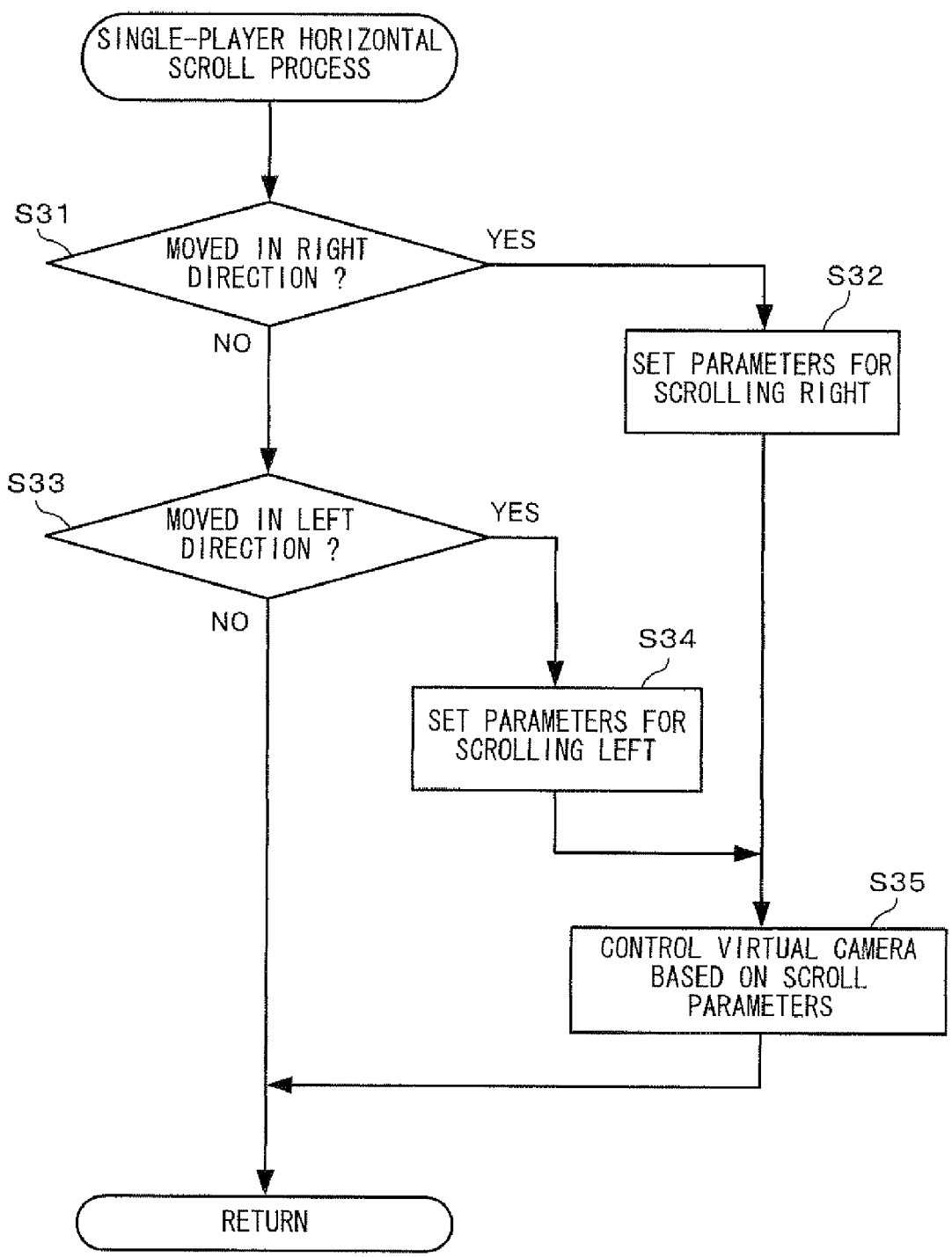
FIG. 33 is a flow chart showing details of a single-player horizontal scroll control process of step S22 of FIG. 32.

The CPU 10 performs the single-player horizontal scroll process (step S22). FIG. 33 is a flow chart showing details of the single-player horizontal scroll process of step S22. Referring to FIG. 33, the CPU 10 determines, with the result of the game processing (or with reference to the operation data 215) described above, whether or not the player object 101 has moved in the right direction (step S31). When it is determined that the player object 101 has moved in the right direction, the CPU 10 calculates parameters for a scrolling-right control on the screen, and sets the calculated parameters in the horizontal scroll parameters 229 (step S32). That is, the CPU 10 determines, in the virtual game space, the position of the display area (see FIG. 9) so that the position to which the player object 101 will have moved is the center of the screen with respect to the X-axis direction. The CPU 10 determines parameters, such as the direction of scrolling and the amount of scrolling, so that the display area is displayed on the screen.

The CPU 10 controls the virtual camera based on the horizontal scroll parameters 229 (step S35). The reason is that the virtual game space is constructed as a three-dimensional space in the present embodiment. When the virtual game space is constructed as a two-dimensional space, known two-dimensional image processing may be used.

On the other hand, when it is determined that the player object 101 has not moved in the right direction ("NO" in step S31), the CPU 10 determines whether or not the player object 101 has moved in the left direction (step S33). When it is determined that the player object 101 has moved in the left direction ("YES" in step S33), the CPU 10 calculates parameters for a scrolling-left control on the screen, and sets the calculated parameters in the horizontal scroll parameters 229 (step S34). The process proceeds to step S35 described above. On the other hand, when it is determined that the player object 101 has not moved in the left direction either ("NO" in step S33), the CPU 10 ends the single-player horizontal scroll process since it is not necessary to perform any horizontal scroll control.

Figure 34:
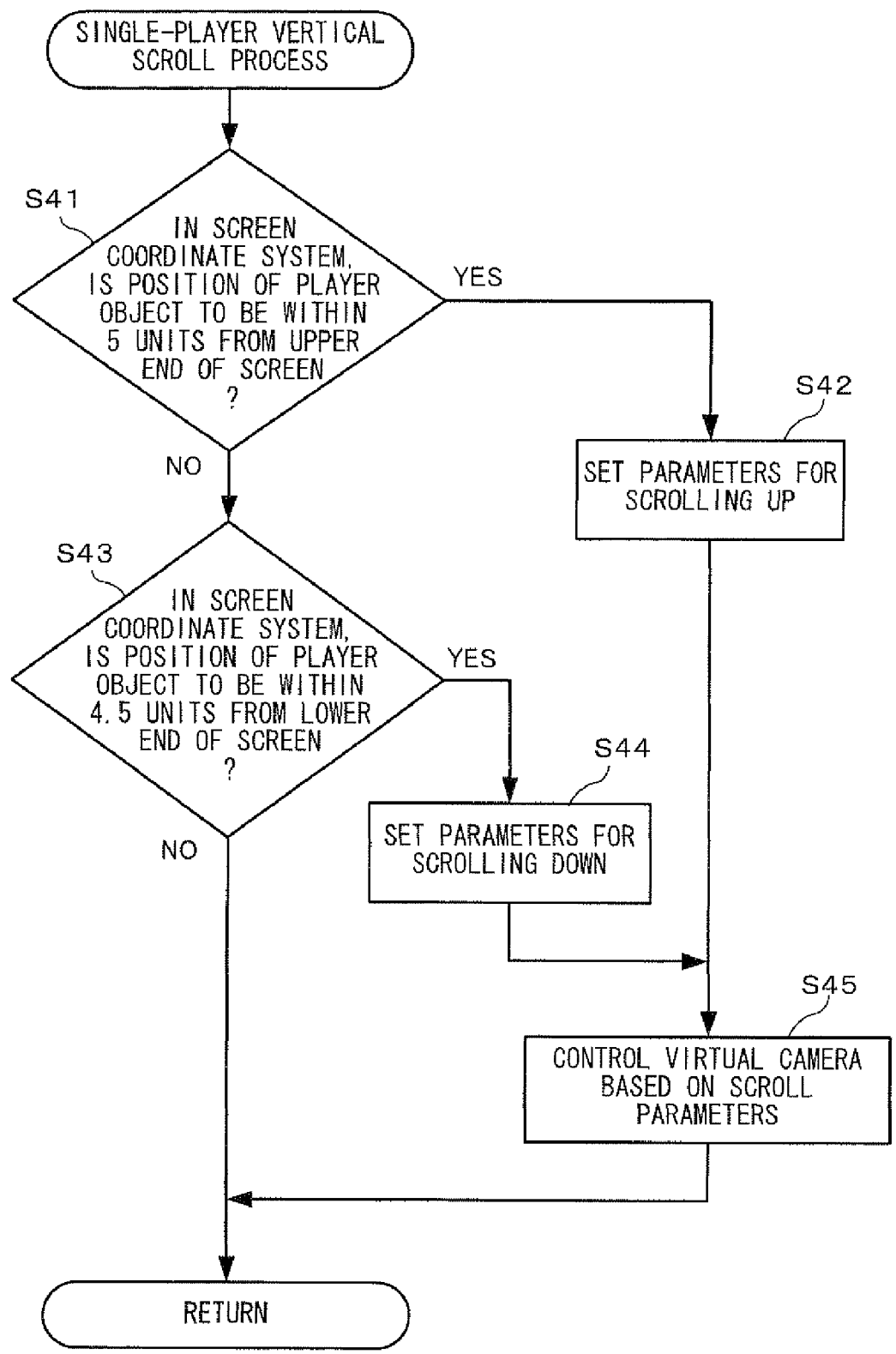
FIG. 34 is a flow chart showing details of a single-player vertical scroll control process of step S23 of FIG. 32.

Referring back to FIG. 32, after step S22, the CPU 10 performs the single-player vertical scroll process (step S23). FIG. 34 is a flow chart showing details of the single-player horizontal scroll process of step S23. Referring to FIG. 34, the CPU 10 determines whether or not, in the screen coordinate system (i.e., in the display area determined in the process performed in the most recent frame), the player object 101 is to be displayed at a higher position (a position within 5 units from the upper end of the screen) than the scrolling-up starting line 111 shown in FIG. 17, as a result of causing the player object 101 to move by reflecting the operation data 215 (step S41). When it is determined that the player object 101 is to be displayed at a higher position than the scrolling-up starting line 111 ("YES" in step S41), the CPU 10 calculates parameters for a scrolling-up control on the screen, and sets the calculated parameters in the vertical scroll parameters 230 (step S42). The CPU 10 controls the virtual camera based on the vertical scroll parameters 230 (step S45).

On the other hand, when it is determined that the player object 101 is not to be displayed at a higher position than the scrolling-up starting line 111 ("NO" in step S41), the CPU 10 determines whether or not the player object 101 is to be displayed at a lower position (a position within 4.5 units from the lower end of the screen) than the scrolling-down starting line 112 shown in FIG. 17, as a result of causing the player object 101 to move by reflecting the operation data 215 (step S43). When it is determined that the player object 101 is to be displayed at a lower position than the scrolling-down starting line 112 ("YES" in step S43), the CPU 10 sets, in the vertical scroll parameters 230, parameters for a scrolling-down control on the screen (step S49). The process proceeds to step S45 described above. On the other hand, when it is determined that the player object 101 is not to be displayed at a lower position than the scrolling-down starting line 112 either ("NO" in step S43), the CPU 10 ends the single-player vertical scroll process since it is not necessary to perform any vertical scroll control.

Figure 35:
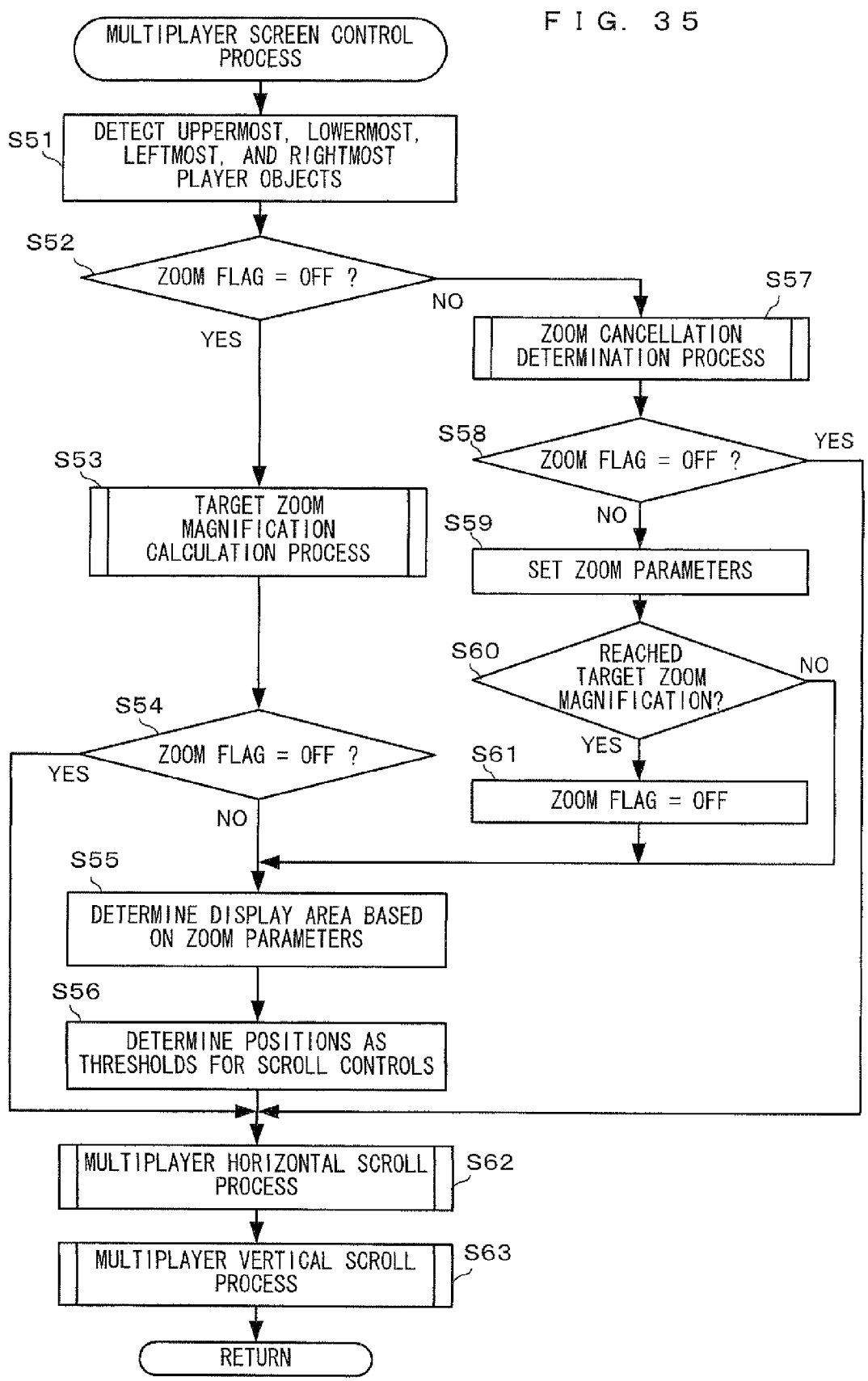
FIG. 35 is a flow chart showing details of a multiplayer screen control process of step S10 of FIG. 29.

A multiplayer game screen control process of step S10 in FIG. 29 will be described. FIG. 35 is a flow chart showing details of the multiplayer game screen control process of step S10. Referring to FIG. 35, the CPU 10 detects, among the player objects 101 as a result of causing the player objects 101 to move by reflecting the operation data 215, the player objects 101 to be placed at the farthest ends in the upper, lower, left, and right directions, respectively (step S51). That is, the CPU 10 detects the rightmost object, the leftmost object, the uppermost object, and the lowermost object.

The CPU 10 determines whether or not the zoom flag 221 is set to "OFF" (step S52). This is for determining whether or not zooming in, which in the present embodiment is slowly performed over some amount of time when the zoom magnification is changed from 1.0-fold to 2.0-fold, for example, is being performed. That is, it is determined whether or not a zoom process is being performed. When it is determined that the zoom flag 221 is set to "OFF" ("YES" in step S52), the CPU 10 performs a target zoom magnification calculation process (step S53). This process is a process of determining a zoom magnification to be targeted, based on the positional relations between the rightmost object, the leftmost object, and the like.

Figure 36:
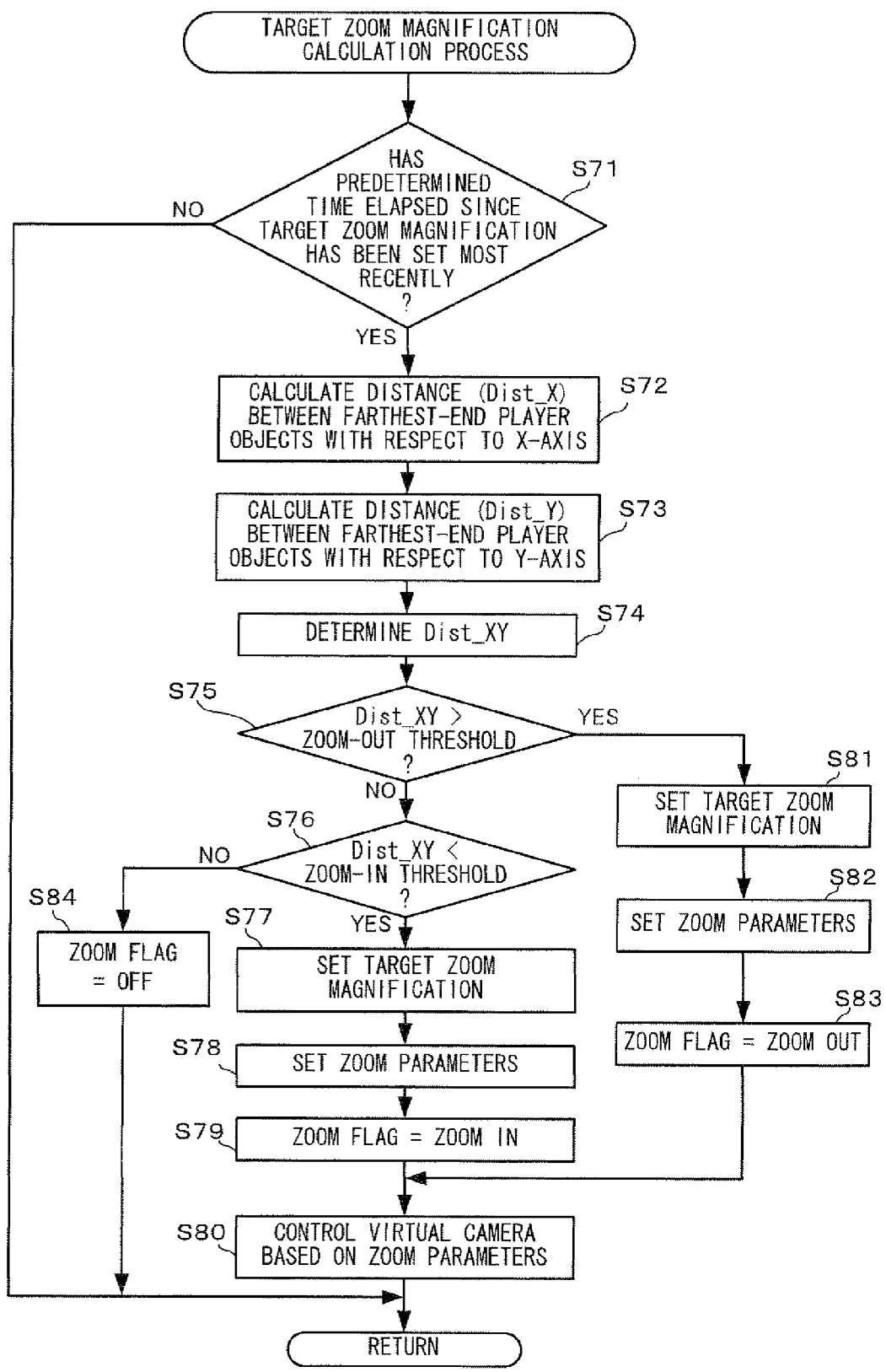
FIG. 36 is a flow chart showing details of a target zoom magnification calculation process of step S53 of FIG. 35.

FIG. 36 is a flow chart showing details of the target zoom magnification calculation process of step S53. Referring to FIG. 36, the CPU 10 determines whether or not a predetermined time has elapsed since a target zoom magnification has been set most recently (step S71). This is so that even when the conditions for zooming in are fulfilled after zooming out has been started, zooming in is not to be started for a given time. When it is determined that the predetermined time has not elapsed ("NO" in step S71), the CPU 10 ends the target zoom magnification calculation process. On the other hand, when it is determined that the predetermined time has elapsed ("YES" in step S71), the CPU 10 calculates the distance Dist_X between the farthest-end player objects with respect to the X-axis direction in the virtual game space (step S72).

That is, the CPU 10 calculates the distance between the rightmost object and the leftmost object with respect to the X-axis direction.

The CPU 10 calculates the distance Dist_Y between the farthest-end player objects with respect to the Y-axis direction (step S73). That is, the CPU 10 calculates the distance between the uppermost object and the lowermost object with respect to the Y-axis direction. Note that these distances may be calculated by being multiplied by predetermined factors.

The CPU 10 compares the distance Dist_X with the distance Dist_Y, and sets the greater value of these distances as the distance Dist_XY (step S74).

The CPU 10 determines whether or not the distance Dist_XY has exceeded the zoom-out threshold, which is a value represented by the zoom-out threshold data 222 (step S75). That is, the CPU 10 determines whether or not the distance between the farthest-end player objects with respect to the X-axis direction or the Y-axis direction has exceeded a predetermined distance. When it is determined that the distance Dist_XY has exceeded the zoom-out threshold ("YES" in step S75), the CPU 10 reads from the external main memory 12 the zoom-out target zoom magnification data 224, which is the zoom magnification set in accordance with the zoom-out threshold, and sets the read zoom-out target zoom magnification data 224 as the target zoom magnification 226 (step S81).

The CPU 10 sets the zoom parameters 231 (step S82). As described above, the zoom parameters 231 are parameters representing the zoom magnification of an image to be drawn in the current loop of the process. The zoom parameters 231 are parameters for performing a zoom process (hereinafter referred to as a "zoom process over time") of reaching the target zoom magnification 226 over time, instead of displaying the game image having applied thereto the target zoom magnification 226 as soon as it is determined that the distance Dist_XY has exceeded the zoom-out threshold. That is, the zoom parameters 231 are parameters for, when the zoom magnification at the time of the determination that the distance Dist_XY has exceeded the zoom-out threshold is a start magnification and the magnification represented by the target zoom magnification 226 is an end magnification, displaying the game screen in such a manner that the start magnification gradually approaches the end magnification. Accordingly, the CPU 10 updates the zoom parameters 231 each frame until the magnification reaches the end magnification. For example, when the start magnification is 1.0-fold and the end magnification is 2.0-fold, the CPU 10 updates the zoom parameters 231 each frame so that the magnification increases 0.01-fold per frame. More specifically, in the loop of the process at the time of the determination that the distance Dist_XY has exceeded the zoom-out threshold, the CPU 10 sets the value representing 1.01-fold in the zoom parameters 231. As a result, in the drawing process of step S11 described above, a game image is to be drawn at a zoom magnification of 1.01-fold. In the next loop of the process, the CPU 10 sets the value representing 1.02-fold in the zoom parameters 231, and therefore a game image is to be drawn at a zoom magnification of 1.02-fold. After step S82, the CPU 10 sets the zoom flag 221 to "ZOOM OUT" (step S83).

The CPU 10 controls the virtual camera based on the zoom parameters 231 (step S80). For example, the CPU 10 adjusts the parameters, such as the angle of view, for the virtual camera. The CPU 10 ends the target zoom magnification calculation process.

When it is determined that the distance Dist_XY has not exceeded the zoom-out threshold ("NO" in step S75), the CPU 10 determines whether or not the distance Dist_XY is smaller than the zoom-in threshold, which is a value represented by the zoom-in threshold data 223 (step S76). That is, the CPU 10 determines whether or not the distance between the farthest-end player objects with respect to the X-axis direction has fallen below a predetermined distance. When it is determined that the distance Dist_XY is smaller than the zoom-in threshold ("YES" in step S76), the CPU 10 reads the zoom-in target zoom magnification data 225 from the external main memory 12, and sets the read zoom-in target zoom magnification data 225 as the target zoom magnification 226 (step S77).

Similarly to step S82, the CPU 10 determines a zoom magnification to be actually applied in the current loop of the process so that the magnification gradually approaches the target zoom magnification, and sets the determined zoom magnification in the zoom parameters 231 (step S78). For example, when the start magnification is 1.0-fold and the end magnification is 0.5-fold, the CPU 10 determines that the magnification decreases 0.01-fold each time, and sets, in the loop of the process at the time of the determination that the distance Dist_XY has fallen below the zoom-in threshold, the value representing 0.99-fold in the zoom parameters 231.

The CPU 10 sets the zoom flag 221 to "ZOOM IN" (step S79). The process proceeds to step S80 described above.

When it is determined that the distance Dist_XY is not smaller than the zoom-in threshold ("NO" in step S76), the CPU 10 sets the zoom flag 221 to "OFF" (step S84), and ends the target zoom magnification calculation process.

Referring back to FIG. 35, after the target zoom magnification calculation process is completed, the CPU 10 determines whether or not the zoom flag 221 is set to "OFF" (step S54). When it is determined that the zoom flag 221 is set to "OFF" ("YES" in step S54), the process proceeds to step S62 described below. On the other hand, when it is determined that the zoom flag 221 is not set to "OFF" ("NO" in step S54), the CPU 10 determines, in the virtual space, the position of the display area (see FIG. 9) based on the zoom parameters 231 (step S55). As a result, it is determined that the greater the zoom magnification, the smaller the display area, and that the smaller the zoom magnification, the greater the display area.

The CPU 10 sets the values ("6.25 units from the upper end of the screen" and "3.75 units from the lower end of the screen") corresponding to the scrolling-up starting line 121 and the scrolling-down starting line 122 shown in FIG. 21 that are used in the multiplayer vertical scroll process (step S56). Specifically, the CPU 10 calculates these values using the following equations, and sets the calculated values as the scrolling-up starting threshold 227 and the scrolling-down starting threshold 228, respectively.

scrolling-up starting threshold=(100+(12.0*(ZOOM−1.0))*ZOOM/16) units scrolling-down starting threshold=(60+(12.0*(ZOOM−1.0))*ZOOM/16) units Note that the variable "ZOOM" represents the start magnification (the zoom parameters 231). The other values represent the numbers of pixels. Based on the above equations, the values corresponding to the scrolling-up starting line 121 and the scrolling-down starting line 122, that are based on the zoom magnification at the time, are set. Note that the above equations are merely illustrative, and, as well as these equations, any equation may be used so long as it is possible to calculate appropriate scrolling-up starting threshold and scrolling-down starting threshold with reference to the contents of the game. Alternatively, a plurality of types of equations may be prepared so that the equations are appropriately used depending on the course.

After step S56, the CPU 10 proceeds to the processes of scroll controls of steps S62 and S63 described below.

On the other hand, when it is determined that the zoom flag 221 is not set to "OFF" ("NO" in step S52), it is considered that the process of zooming in or zooming out is being performed, and therefore the following process is performed. The CPU 10 performs a zoom cancellation determination process (step S57). This process is a process of canceling the process of zooming out in the middle thereof, when the value of the Dist_XY has fallen below the zoom-out threshold during the zooming out (when the farthest-end player objects that have once separated from each other approach each other before the zooming out finishes).

Figure 37:
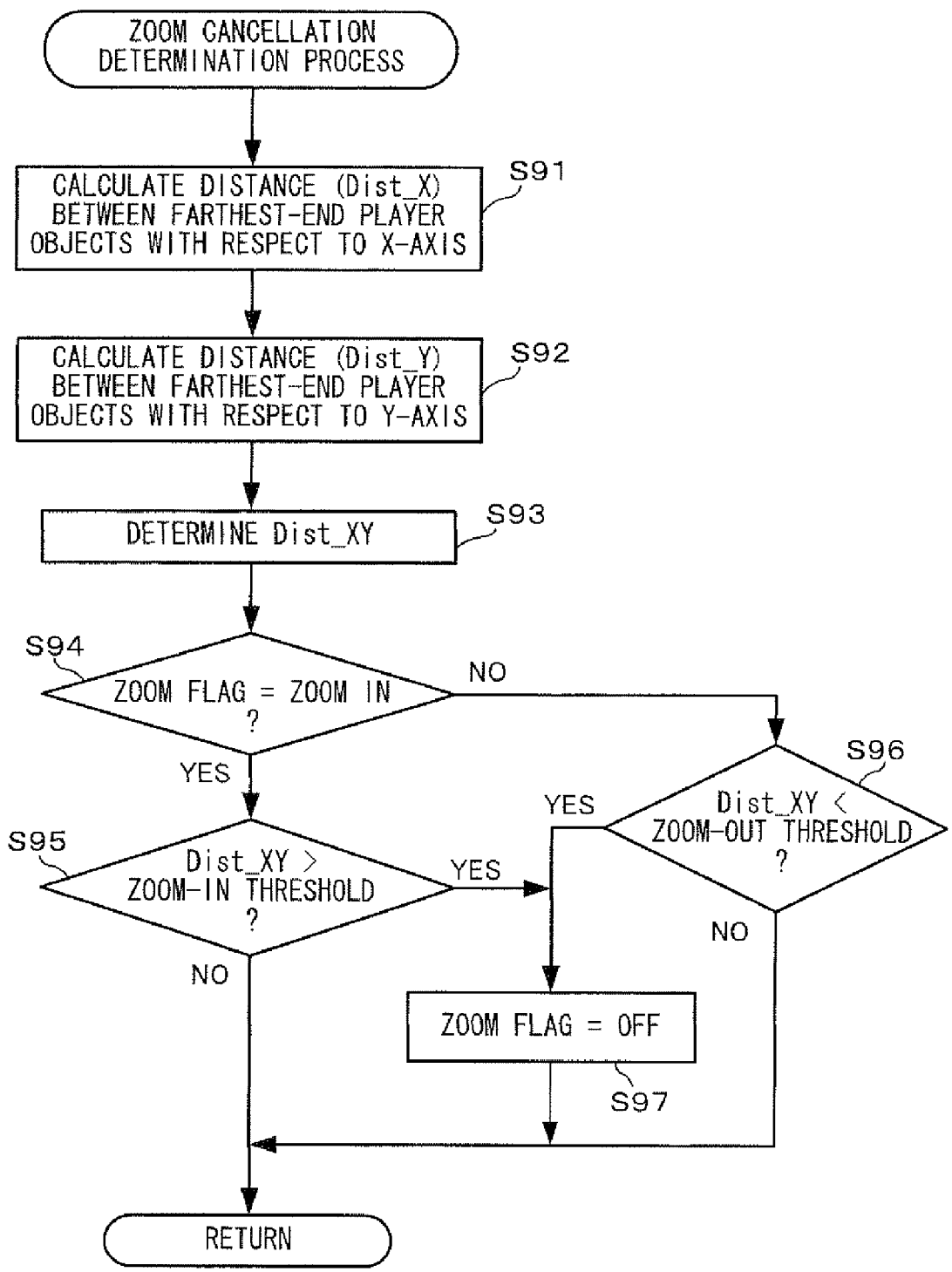
FIG. 37 is a flow chart showing details of a zoom cancellation determination process of step S57 of FIG. 35.

FIG. 37 is a flow chart showing details of the zoom cancellation determination process of step S57. Referring to FIG. 37, the CPU 10 calculates the distance Dist_XY by performing a process similar to that of steps S72 through S74 that is described above with reference to FIG. 36 (steps S91 through S93).

The CPU 10 determines whether or not the zoom flag 221 is set to "ZOOM IN" (step S94). When it is determined that the zoom flag 221 is set to "ZOOM IN" ("YES" in step S94), the CPU 10 determines whether or not the distance Dist_XY is greater than the zoom-in threshold (step S95). That is, the CPU 10 determines whether or not the distance between the farthest-end player objects has exceeded the distance set in the zoom-in threshold data 223 during the zooming in. When it is determined that the distance Dist_XY is not greater than the zoom-in threshold ("NO" in step S95), the CPU 10 ends the zoom cancellation determination process. On the other hand, when it is determined that the distance Dist_XY is greater than the zoom-in threshold ("YES" in step S95), the CPU 10 sets the zoom flag 221 to "OFF, so as to cancel the zooming in (step S97). The CPU 10 ends the zoom cancellation determination process.

On the other hand, when it is determined that the zoom flag 221 is not set to "ZOOM IN" ("NO" in step S94), it is considered that the zoom flag 221 is set to "ZOOM OUT". Therefore, in this case, the CPU 10 determines whether or not the distance Dist_XY is smaller than the zoom-out threshold (step S96). That is, the CPU 10 determines whether or not the distance between the farthest-end player objects has fallen below the distance set in the zoom-out threshold data 222 during the zooming out. When it is determined that the distance Dist_XY is not smaller than the zoom-out threshold ("NO" in step S96), the CPU 10 ends the zoom cancellation determination process. On the other hand, when it is determined that the distance Dist_XY is smaller than the zoom-out threshold ("YES" in step S96), the CPU 10 performs the process of step S97, so as to cancel the zooming out. The CPU 10 ends the zoom cancellation determination process.

Referring back to FIG. 35, after the zoom cancellation determination process of step S57 is completed, the CPU 10 determines whether or not the zoom flag 221 is set to "OFF" (step S58). When it is determined that the zoom flag 221 is set to "OFF", the zoom process is to be canceled at this point in time, and the CPU 10 proceeds to step S62 described below.

On the other hand, when it is determined that the zoom flag 221 is not set to "OFF" ("NO" in step S58), a process is performed of continuing the above zoom process over time using the zoom parameters 231. That is, with reference to the target zoom magnification 226 and the zoom parameters 231, the CPU 10 determines a zoom magnification to be applied in the current loop of the process, and updates the zoom parameters 231 (step S59). For example, when zooming in is performed from a zoom magnification of 1.0-fold to a target zoom magnification of 2.0-fold, it is set so that the zoom magnification increases 0.01-fold per frame.

The CPU 10 determines whether or not the value set in the zoom parameters 231 has reached the value of the target zoom magnification 226 (step S60). That is, the CPU 10 determines whether or not the above zoom process over time is to end. When it is determined that the value set in the zoom parameters 231 has not yet reached the value of the target zoom magnification 226 ("NO" in step S60), the CPU 10 proceeds to step S55 described above. On the other hand, the value set in the zoom parameters 231 has reached the value of the target zoom magnification 226 ("YES" in step S60), the CPU 10 sets the zoom flag 221 to "OFF" (step S61). The CPU 10 proceeds to step S55 described above.

Figure 38:
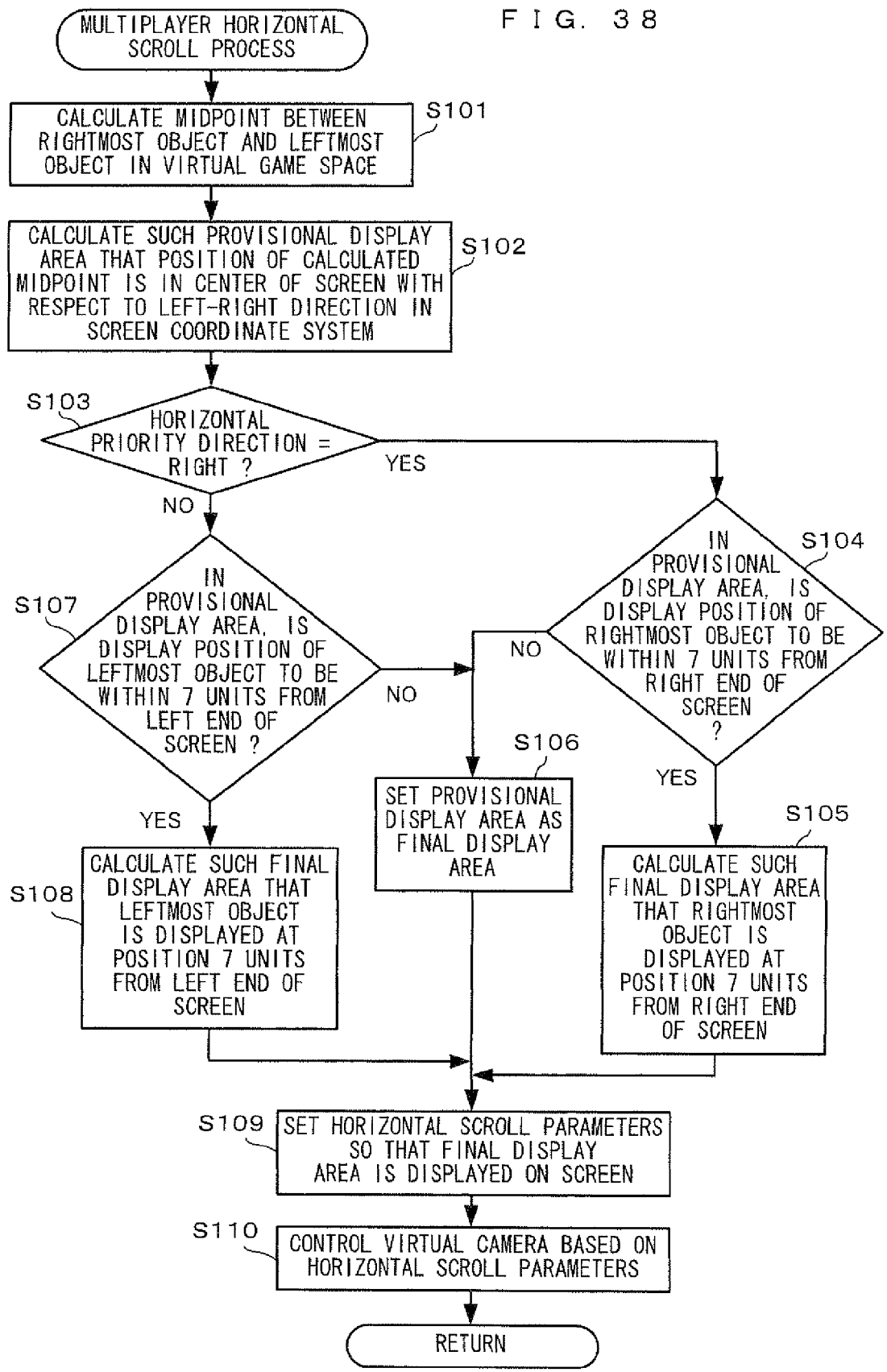
FIG. 38 is a flow chart showing details of a multiplayer horizontal scroll process of step S62 of FIG. 35.

Details of the processes of scroll controls of steps S62 and S63 will be described. After step S56, the CPU 10 performs the multiplayer horizontal scroll process (step S62). FIG. 38 is a flow chart showing details of the multiplayer horizontal scroll process of step S62. Referring to FIG. 38, the CPU 10 calculates the midpoint between the rightmost object and the leftmost object with respect to the X-axis direction in the virtual game space as a result of causing the play objects 101 to move by reflecting players' operations (step S101). The CPU 10 calculates, as a provisional display area, such a display area that the position of the calculated midpoint is in the center of the screen with respect to the X-axis direction in the screen coordinate system (step S102).

The CPU 10 determines, with reference to the area information 212 about the provisional display area, whether or not the horizontal priority direction represented by the horizontal priority direction data 214 is the right direction (step S103). When it is determined that the horizontal priority direction is the right direction ("YES" in step S103), the CPU 10 determines whether or not the display position of the rightmost object in the provisional display area is to be within 7 units from the right end of the screen (step S104). That is, the CPU 10 determines whether or not a player object is present that is approaching the right end of the screen. When it is determined that the display position of the rightmost object is to be within 7 units from the right end of the screen ("YES" in step S104), the rightmost object is too close to the right end of the screen. In response, the CPU 10 calculates, as a final display area, such a display area that the display position of the rightmost object is a position 7 units from the right end of the screen (step S105), and proceeds to step S109 described below. On the other hand, when it is determined that the display position of the rightmost object is not to be within 7 units from the right end of the screen ("NO" in step S104), the CPU 10 sets the provisional display area as a final display area (step S106), and proceeds to step S109 described below.

On the other hand, when it is determined that the horizontal priority direction is not the right direction ("NO" in step S103), it is considered that the horizontal priority direction is the left direction. In this case, the CPU 10 determines whether or not the display position of the leftmost object in the provisional display area is to be within 7 units from the left end of the screen (step S107). That is, the CPU 10 determines whether or not a player object is present that is approaching the left end of the screen. When it is determined that the display position of the leftmost object is to be within 7 units from the left end of the screen ("YES" in step S107), the CPU 10 calculates, as a final display area, such a display area that the display position of the leftmost object is a position 7 units from the left end of the screen (step S108), and proceeds to step S109 described below. On the other hand, when it is determined that the display position of the leftmost object is not to be within 7 units from the left end of the screen ("NO"

in step S107), the CPU 10 sets the provisional display area as a final display area in step S106, and proceeds to step S109.

The CPU 10 sets parameters for a horizontal scroll control based on the final display area, and stores the set parameters in the horizontal scroll parameters 229 (step S109). That is, the CPU 10 sets the horizontal scroll parameters 229 so that the final display area is displayed. The CPU 10 controls the virtual camera based on the horizontal scroll parameters 229 (step S110). Thus the multiplayer horizontal scroll process ends.

Figure 39:
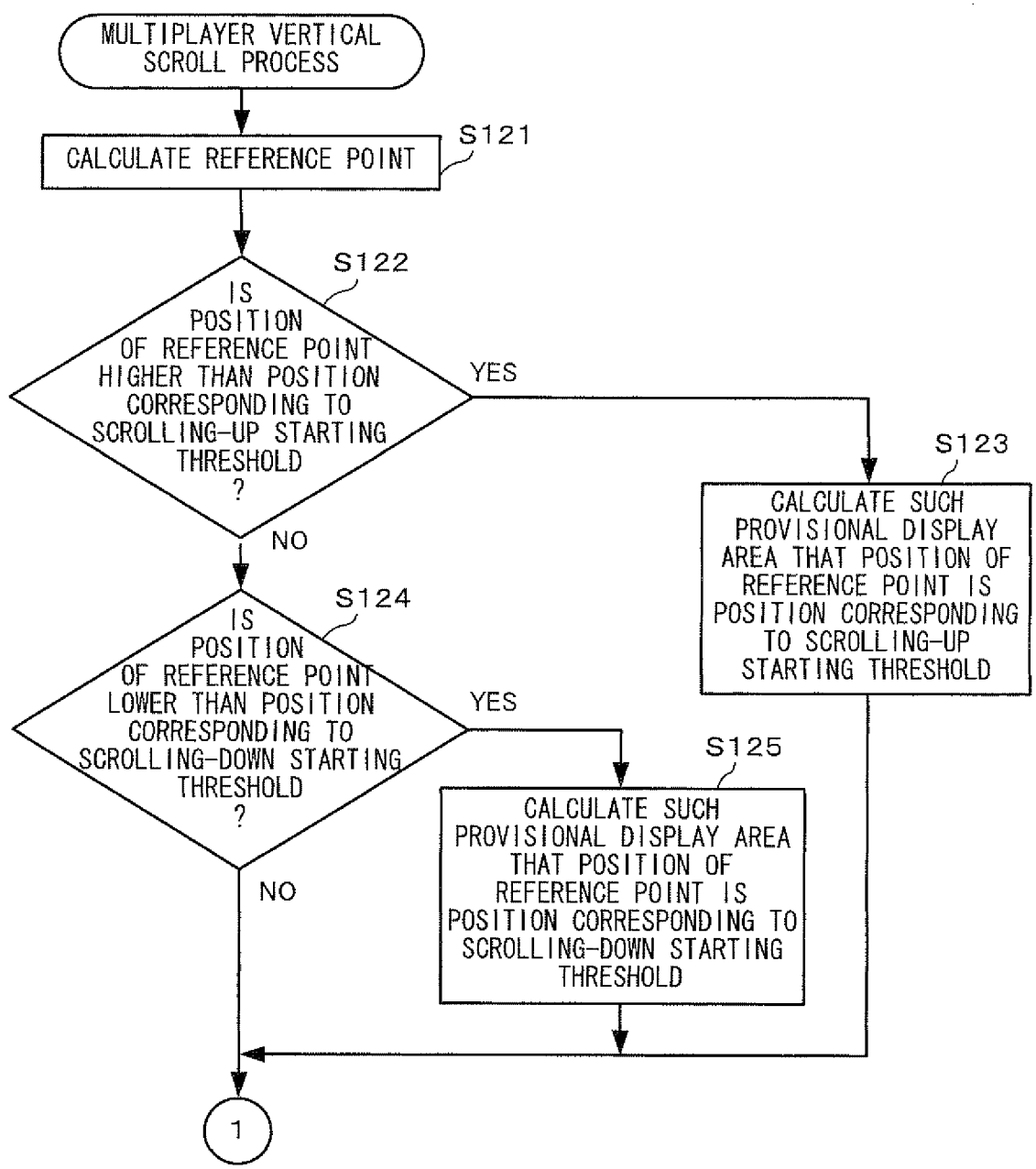
FIG. 39 is a flow chart showing details of a multiplayer vertical scroll process of step S63 of FIG. 35.
Figure 40:
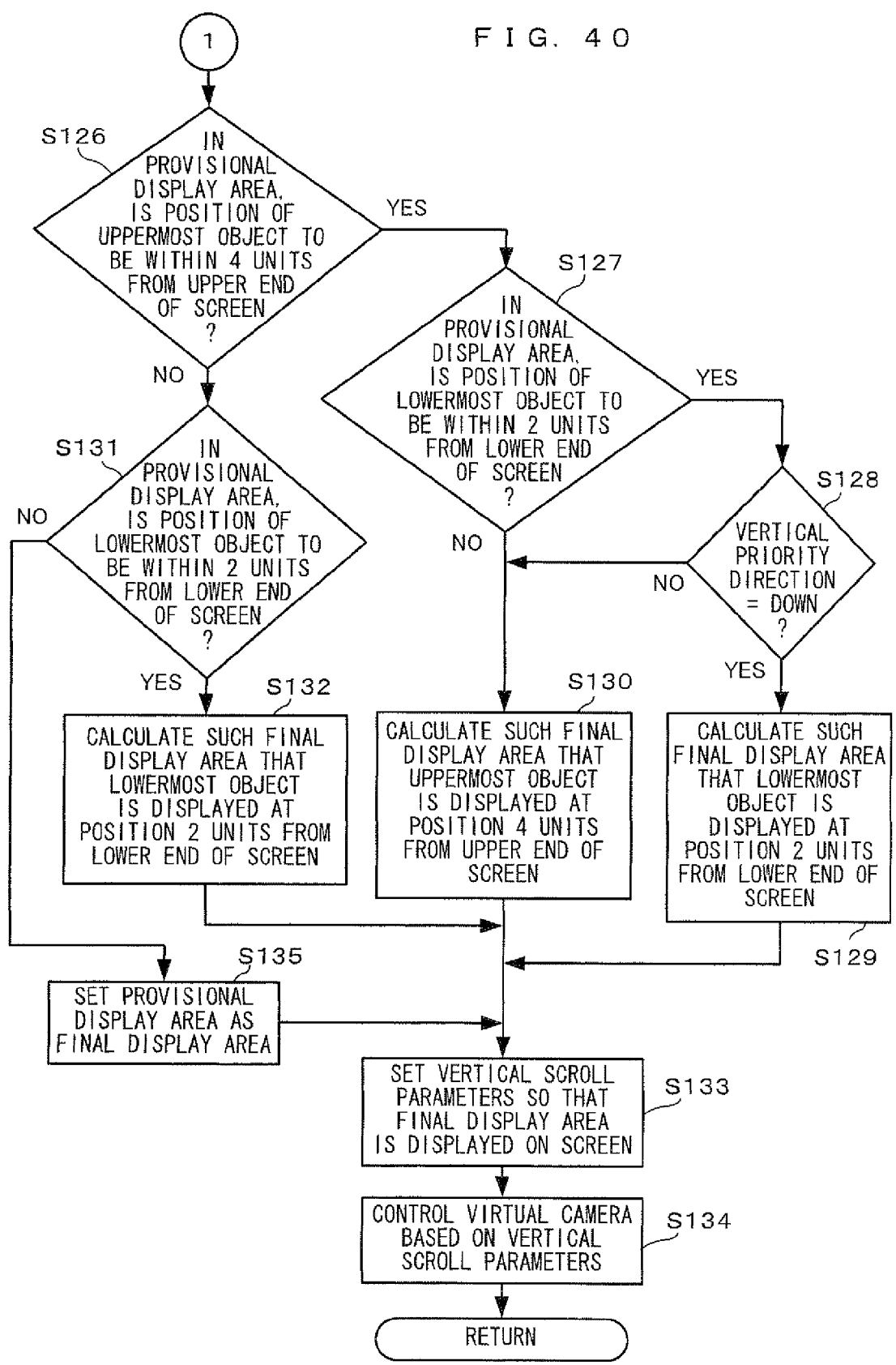
FIG. 40 is a flow chart showing details of the multiplayer vertical scroll process of step S63 of FIG. 35.

Referring back to FIG. 35, after the multiplayer horizontal scroll process of step S62 is completed, the CPU 10 performs the multiplayer vertical scroll process (step S63). FIGS. 39 and 40 are a flow chart showing details of the multiplayer vertical scroll process of step S63. Referring to FIG. 39, the CPU 10 calculates a "reference point" described above with reference to FIG. 20 and the like (step S121). That is, the CPU 10 calculates, as a reference point, the midpoint between the uppermost object and the lowermost object with respect to the Y-axis direction in the virtual game space.

The CPU 10 determines whether or not (in the display area calculated in the process of the most recent frame) the position of the reference point is to be within the number of units (hereinafter referred to simply as an "upper threshold value"; 6.25 units in FIG. 21) from the upper end of the screen that is represented by the scrolling-up starting threshold 227 (step S122). That is, the CPU 10 converts the reference point into a position in the screen coordinate system (two-dimensional coordinates), and determines whether or not the converted reference point in the screen coordinate system is to be within an upper threshold value from the upper end of the screen. When it is determined that the position of the reference point is to be within the upper threshold value from the upper end of the screen ("YES" in step S122), the CPU 10 calculates such a provisional display area that, as shown in FIG. 22, the position of the reference point is a position (a position 6.25 units from the upper end of the screen in FIG. 22) corresponding to the upper threshold value with respect to the Y-axis direction (step S123). The CRU 10 proceeds to step S126 described below.

On the other hand, when it is determined that the position of the reference point is not to be within the upper threshold value from the upper end of the screen ("NO" in step S122), the CPU 10 determines whether or not the position of the reference point is to be within the number of units (hereinafter referred to simply as a "lower threshold value"; 3.75 units in FIG. 21) from the lower end of the screen that is represented by the scrolling-down starting threshold 228 (step S124). When it is determined that the position of the reference point is to be within the lower threshold value from the lower end of the screen ("YES" in step S124), the CPU 10 calculates such a provisional display area that the position of the reference point is a position (a position 3.75 units from the lower end of the screen in FIG. 21) corresponding to the lower threshold value with respect to the Y-axis direction (step S125). The CPU 10 proceeds to step S126 described below.

On the other hand, when it is determined that the position of the reference point is not to be within the lower threshold value from the lower end of the screen ("NO" in step S124), the CPU 10 proceeds to step S126 described below.

Referring to FIG. 40, the CPU 10 determines whether or not, in the provisional display area, the position of the uppermost object is within 4 units from the upper end of the screen (step S126). When it is determined that the position of the uppermost object is within 4 units from the upper end of the screen ("YES" in step S126), the CPU 10 determines whether or not, in the provisional display area, the position of the lowermost object is within 2 units from the lower end of the screen (step S127). When it is determined that the position of the lowermost object is not within 2 units from the lower end of the screen ("NO" in step S127), only the uppermost object is too close to the upper end of the screen. In response, the CPU 10 calculates, as a final display area, such a display area that the uppermost object is displayed at a position 4 units from the upper end of the screen (step S130). On the other hand, when it is determined that the position of the lowermost object is within 2 units from the lower end of the screen ("YES" in step S127), it is considered that both the uppermost object and the lowermost object are too close to the upper and lower ends of the screen, respectively. In response, the CPU 10 determines, with reference to the area information 212, whether or not the vertical priority direction represented by the vertical priority direction data 213 is the down direction (step S128). When it is determined that the vertical priority direction is the down direction ("YES" in step S128), the CPU 10 calculates, as a final display area, such a display area that the lowermost object is displayed at a position 2 units from the lower end of the screen (step S129).

On the other hand, when it is determined that the vertical priority direction is not the down direction ("NO" in step S128), in step S130 the CPU 10 calculates, as a final display area, such a display area that the uppermost object is displayed at a position 4 units from the upper end of the screen. The process proceeds to step S133 described below.

On the other hand, when it is determined that the position of the uppermost object is not within 4 units from the upper end of the screen ("NO" in step S126), the CPU 10 determines whether or not, in the provisional display area, the position of the lowermost object is within 2 units from the lower end of the screen (step S131). When it is determined that the position of the lowermost object is within 2 units from the lower end of the screen ("YES" in step S131), the CPU 10 calculates, as a final display area, such a display area that the lowermost object is displayed at a position 2 units from the lower end of the screen (step S132). The CPU 10 sets the vertical scroll parameters 230 based on the final display area (step S133). That is, the CPU 10 sets the direction of the vertical scroll and the like so that the final display area is displayed. The CPU 10 controls the virtual camera based on the vertical scroll parameters 230 (step S134).

On the other hand, when it is determined that the position of the lowermost object is not within 2 units from the lower end of the screen ("NO" in step S131), the CPU 10 sets the provisional display area as a final display area (step S135). The process proceeds to step S133 described above. Thus the multiplayer vertical scroll process ends.

Referring back to FIG. 35, after the multiplayer vertical scroll process of step S63 is completed, the multiplayer screen control process ends.

Details of the processes of steps S6 and S7 of FIG. 29 will be described. In these processes, a process is performed of switching screen controls when the number of the displayed player objects 101 displayed on the screen has changed since, for example, during a two-player simultaneous game, the game is over for one of the players, or during a single-player game, another player has participated in the gameplay.

Figure 41:
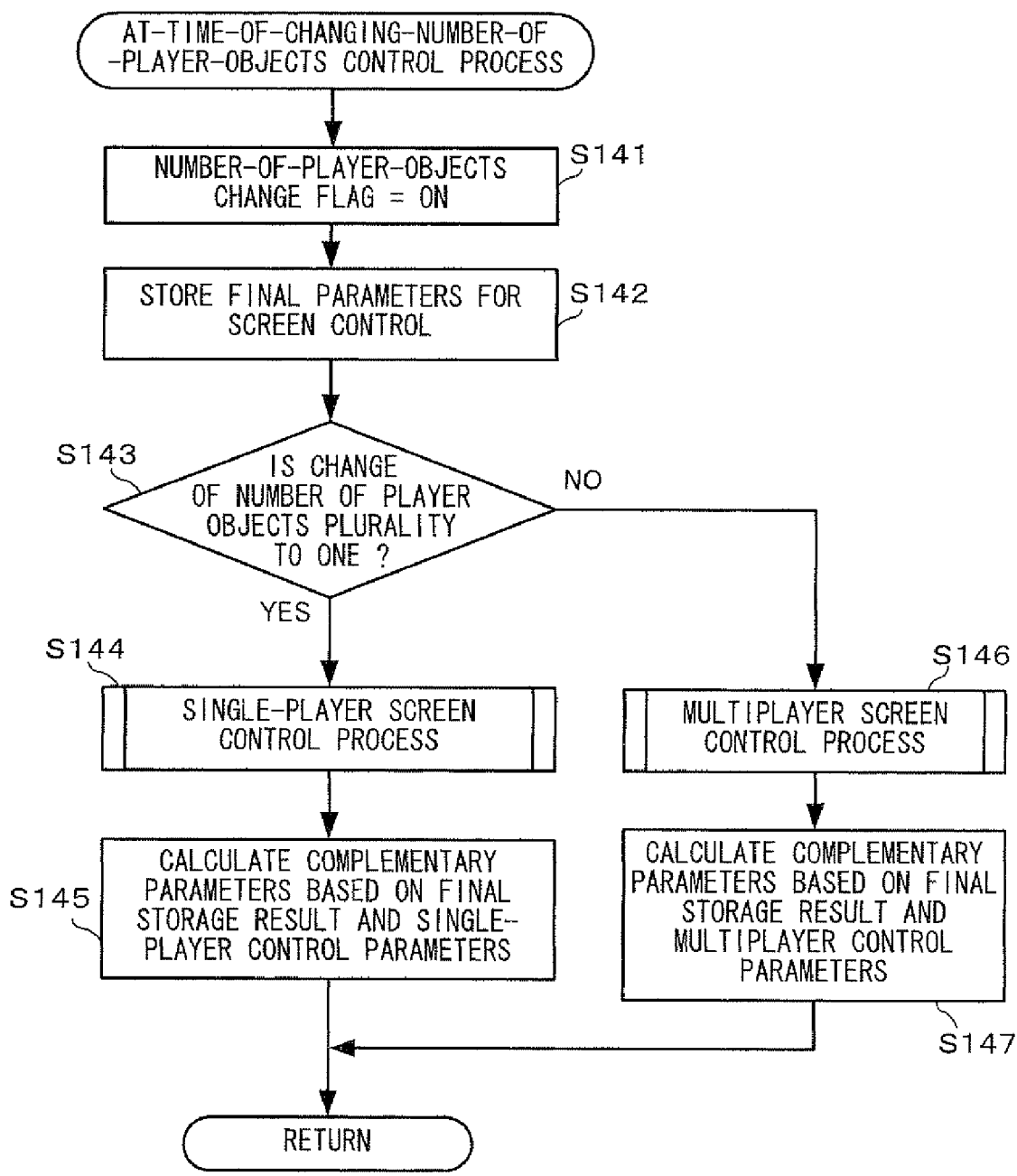
FIG. 41 is a flow chart showing details of an at-time-of-changing-number-of-player-objects control process of step S6 of FIG. 29.

FIG. 41 is a flow chart showing details of an at-time-of-changing-number-of-player-objects control process of step S6. Referring to FIG. 41, the CPU 10 sets the number-of-player-objects change flag 220 to "ON" (step S141).

The CPU 10 stores, as the at-time-of-change final parameters 232, the parameters for the scroll control and the zoom control that are calculated in the loop of the process of the most recent frame (step S142). That is, the CPU 10 stores in the at-time-of-change final parameters 232 the horizontal scroll parameters 229, the vertical scroll parameters 230, and the zoom parameters 231.

The CPU 10 determines whether or not the change of the number of the displayed player objects 101 is a change of "a plurality of objects to one object" (step S143). That is, the CPU 10 determines whether a multiplayer game has switched to a single-player game or a single-player game has switched to a multiplayer game. When it is determined that the change of the displayed player objects 101 is a change of "a plurality of objects to one object" ("YES" in step S143), it is considered that a multiplayer game has switched to a single-player game. In response, the CPU 10 performs the single-player screen control process described above with reference to FIG. 32 and the like, and calculates the horizontal scroll parameters 229, the vertical scroll parameters 230, the zoom parameters 231, the target zoom magnification 226, and the like, for the single-player game (step S144).

The CPU 10 calculates the complementary parameters 233 based on the at-time-of-change final parameters 232 (which have stored therein the final zoom parameters used in the multiplayer game and the like) and the various parameters calculated in step S144 (step S145). For example, the CPU 10 calculates, as the complementary parameters 233, such parameters that the zoom magnification approaches 1.0-fold, which is the target zoom magnification for the single-player game, by 12.5% each time from the target zoom magnification stored as the at-time-of-change final parameters 232. For example, when the target zoom magnification stored as the at-time-of-change final parameters 232 is 2.0-fold and the target zoom magnification for the single-player game is 1.0-fold, the value representing "zoom magnification=1.875-fold" is set as the complementary parameters 233.

On the other hand, when it is determined that the change of the number of the displayed player objects 101 is not a change of "a plurality of objects to one object" ("NO" in step S143), it is considered that a single-player game has switched to a multiplayer game (or the number of the players has changed in a multiplayer game, such as a three-player simultaneous game has switched to a two-player simultaneous game). In response, the CPU 10 performs the multiplayer screen control process described above with reference to FIG. 35 and the like, and calculates the horizontal scroll parameters 229, the vertical scroll parameters 230, the zoom parameters 231, the target zoom magnification 226, and the like, for the multiplayer game (step S146).

The CPU 10 calculates the complementary parameters 233 based on the at-time-of-change final parameters 232 (which have stored therein the final zoom parameters used in the single-player game and the like) and the various parameters calculated in step S146 (step S147). For example, the CPU 10 calculates, as the complementary parameters 233, such parameters that the zoom magnification for the single-player game approaches the target zoom magnification for the multiplayer game by 12.5% each time. Thus the at-time-of-changing-number-of-player-objects control process ends.

Figure 42:
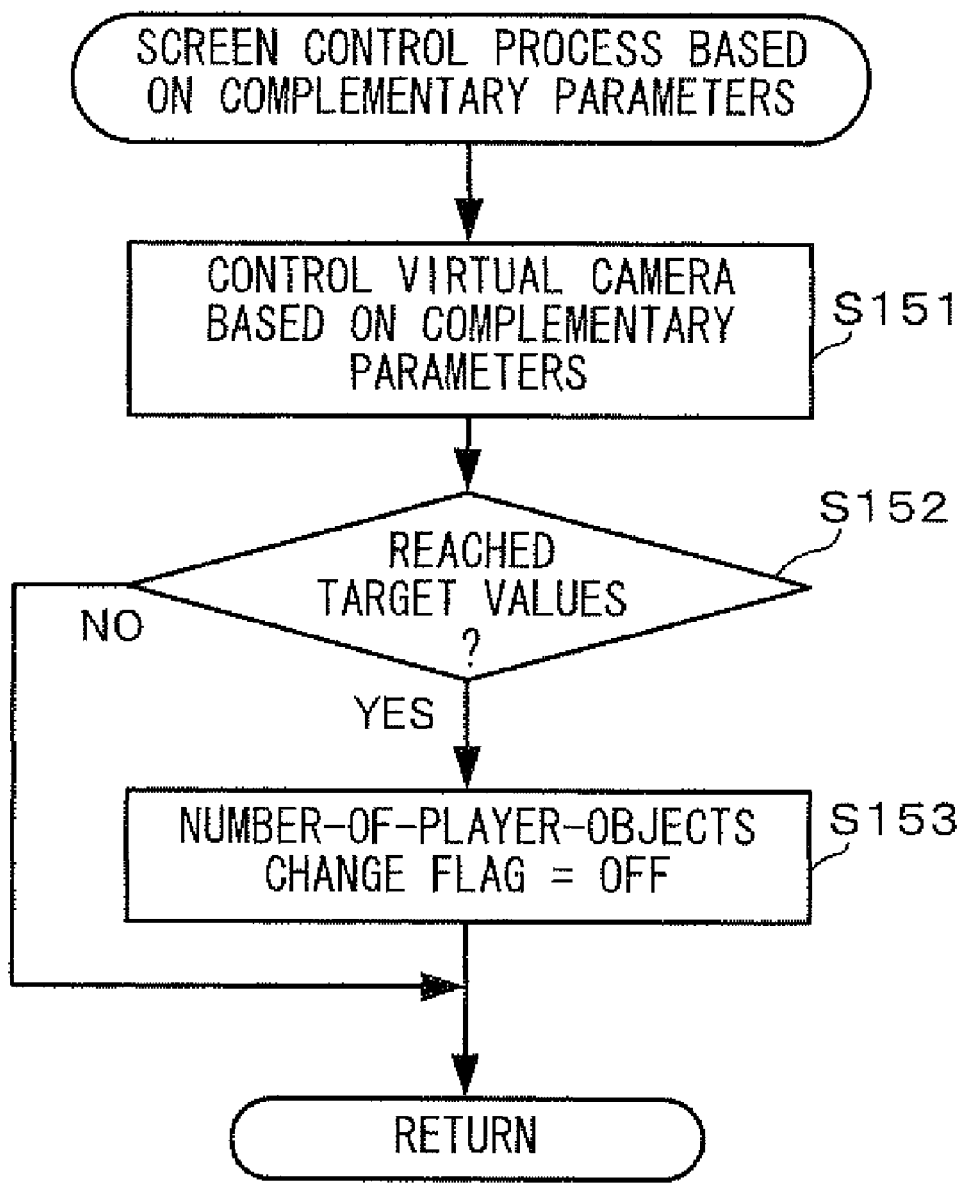
FIG. 42 is a flow chart showing details of a screen control process based on complementary parameters of step S7 of FIG. 29.

Referring back to FIG. 29, after step S6, the CPU 10 performs a screen control process based on the complementary parameters (step S7). FIG. 42 is a flow chart showing details of the screen control process based on the complementary parameters of step S7. Referring to FIG. 42, the CPU 10 controls the virtual camera based on the calculated complementary parameters (step S151).

The CPU 10 determines whether or not the zoom magnification and the scroll parameters that are represented by the complementary parameters 233 have reached the respective target values (the values of the target zoom magnification and the like that are calculated in steps S144 and S146) (step S152). When it is determined that the zoom magnification and the scroll parameters have reached the respective target values ("YES" in step S152), the CPU 10 sets the number-of-player-objects change flag 220 to "OFF" (step S153), and ends this process. On the other hand, when it is determined that the zoom magnification and the scroll parameters have not reached the respective target values ("NO" in step S152), the CPU 10 ends this process without changing the number-of-player-objects change flag 220.

Thus the descriptions of the game processing according to the present embodiment are completed.

As described above, in the present embodiment a screen scroll control is performed so that, in a multiplayer game, the screen is made easily viewable to the players, based on the distances between the player objects 101 and ends of the screen. In the multiplayer vertical scroll process a control is performed using the position of the reference point (see FIGS. 21 and 22, etc.) described above, whereby, when a player object 101 placed close to the center of the screen jumps, it is possible to prevent the screen from vertically scrolling, oversensitively in response to the vertical movement of the jumping player object 101. That is, the screen does not scroll frequently even when the player object 101 jumps when placed close to the center of the screen, and therefore it is possible to provide a screen that is easily viewable to the players. Further, even when a player object 101 has not reached an end of the screen, if the player object 101 approaches the end of the screen to some degree, the screen scrolls in the moving direction and is displayed. This makes it possible to enhance also the visibility.

In the scroll control using the reference point in the multiplayer vertical scroll process, the values of the thresholds (the scrolling-up starting line 121 and the scrolling-down starting line 122 in FIG. 21) for whether or not to scroll are appropriately set in accordance with the zoom magnification of the screen, and therefore it is possible to provide a screen that is more easily viewable to the players.

When the number of the displayed player objects 101 has changed, a single-player zoom control and a multiplayer zoom control smoothly switch and a single-player scroll control process and a multiplayer scroll control process smoothly switch, using complementary parameters. This makes it possible to perform a congruous screen display that is easily viewable and easily playable to the players.

In a multiplayer game, the "uplift operation" described above can be performed, whereby, when a player object 101 has been transformed into a character having such an "ability" as described above, another player object 101 lifts up the character into which the player object 101 has been transformed, whereby said another player object 101 becomes able to use the "ability". This makes it possible to enhance the interest of a cooperative game. Alternatively, when a player who is bad at the game and a player who is good at the game play a multiplayer game, for example, the good player's player object 101 lifts up the bad player's player object 101, whereby the bad player's player object 101 becomes able to be led forward without any particular operation. The "uplift operation" may be used, for example, in a scene including a large number of obstacles or in a scene including bad platforms with a large number of holes, whereby even the bad player's player object 101 becomes able to advance. This makes it possible to enhance the interest of a cooperative game. This also provides a motivation for willingly playing a multiplayer game. Alternatively, the "uplift operation" may be applied to a game where player objects compete against each other, whereby it is possible to enhance a game element based on gamesmanship in competition and, and it is also possible to enhance the interest of a versus game.

Alternatively, in order to decrease the difficulty level of the game so that the game is easily playable, the game may be designed to have a fewer number of buttons to be used in game operations so that player is operations are the simplest possible. In this case, for example, the above embodiment employs an operation system (a so-called one-lever/two-button system) based on the cross key 72a and two buttons including the button 72b (for a dash movement) and the button 72c (for a jump). However, even with such a few number of buttons, it is possible to perform a variety of operations with a reduced number of buttons by, as described above, combining the button operations with an operation of "swinging" the controller 7. This makes it possible to enhance the interest of a game.

Note that in the above embodiment, in a zoom process, zooming in and zooming out are performed using the zoom-in threshold and the zoom-out threshold, respectively. Zooming in and zooming out may be gradually performed with not only one zoom-in threshold and one zoom-out threshold but more zoom-in thresholds and more zoom-out thresholds, respectively. For example, a first zoom-out threshold is set to a distance of 200, and a first zoom-out target zoom magnification corresponding to the first zoom-out threshold is set to 0.8-fold. Further, a second zoom-out threshold is set to a distance of 600, and a second zoom-out target zoom magnification corresponding to the second zoom-out threshold is set to 0.5-fold. Thus, while the distance between the farthest-end player objects with respect to the X-axis direction is 200 through to 600 (the unit is arbitrary), the game screen is displayed at 0.8-fold zoom magnification. When the distance exceeds 600, the game screen is displayed at 0.5-fold zoom magnification. In addition, a zoom-in threshold and a zoom-out threshold may be set so as to vary from course to course or from area to area.

In the above embodiment, as an example of the game screen the state of the virtual game space is displayed on the whole screen of the TV 2 (so-called full display). That is, a case is taken as an example where the display area is displayed on the whole screen of the TV 2; however, as well as this, the present invention can also be applied to the case where the layout of the game screen is made so that the display area is displayed on a part of the screen. In this case, "within n units from an end of the screen" of a determination threshold may be applied as "within n units from an end of the display area".

In the above embodiment, a case is taken as an example where the game image is displayed on a screen having a general wider-than-high ratio (4:3 or 16:9); however, the present invention can also be applied to a screen having a higher-than-wide ratio.

While the invention has been described in detail, the foregoing description is in all aspects illustrative and not restrictive. It is understood that numerous other modifications and variations can be devised without departing from the scope of the invention.

What is claimed is:

1. A game apparatus for displaying, in a predetermined display area of a display device, a virtual space in which a plurality of objects are present, the game apparatus comprising:
a reference point calculation unit for calculating a reference point with respect to a reference axis direction, the reference point being a center position determined based on positions of two oppositely located objects of the plurality of objects and the reference axis direction being a predetermined axis direction of the display area;
a first determination unit for determining whether or not a position of the reference point is a position within a first distance from an end of the display area with respect to the reference axis direction; and
a screen control unit for, when the first determination unit determines that the position of the reference point is a position within the first distance from the end of the display area, scrolling, along the reference axis direction, a display content of the virtual space displayed in the display area.

2. A game system, comprising:
a display device configured to display image data; and
a game apparatus having one or more processors and for displaying, in a predetermined display area of the display device, a virtual space in which a plurality of objects are present, the game apparatus comprising:
a reference point calculation unit for calculating a reference point with respect to a reference axis direction, the reference point being a center position determined based on positions of two oppositely located objects of the plurality of objects and the reference axis direction being a predetermined axis direction of the display area,
a first determination unit for determining whether or not a position of the reference point is a position within a first distance from an end of the display area with respect to the reference axis direction, and
a screen control unit for, when the first determination unit determines that the position of the reference point is a position within the first distance from the end of the display area, scrolling, along the reference axis direction, a display content of the virtual space displayed in the display area.

3. A method implemented in an information processing device having one or more processors and for displaying, in a predetermined display area of a display device, a virtual space in which a plurality of objects are present, the method comprising:
calculating, via the one or more processors, a reference point with respect to a reference axis direction, the reference point being a center position determined based on positions of two oppositely located objects of the plurality of objects and the reference axis direction being a predetermined axis direction of the display area;
determining whether or not a position of the reference point is a position within a first distance from an end of the display area with respect to the reference axis direction; and
scrolling, along the reference axis direction, a display content of the virtual space displayed in the display area when the position of the reference point is a position within the first distance from the end of the display area.

4. A non-transitory computer-readable storage medium having stored therein a game program to be executed by a computer of a game apparatus for displaying, in a predetermined display area of a display device, a virtual space in which a plurality of objects are present,
the game program causing the computer to execute instructions comprising:
calculating a reference point with respect to a reference axis direction, the reference point being a center position determined based on positions of two oppositely located objects of the plurality of objects and the reference axis direction being a predetermined axis direction of the display area;

determining whether or not a position of the reference point is a position within a first distance from an end of the display area with respect to the reference axis direction; and scrolling, along the reference axis direction, a display content of the virtual space displayed in the display area when the position of the reference point is a position within the first distance from the end of the display area.

5. The non-transitory computer-readable storage medium having stored therein the game program according to claim 4, wherein a midpoint between two objects, among the plurality of objects, that are farthest from each other with respect to the reference axis direction is calculated as the reference point.

6. The non-transitory computer-readable storage medium having stored therein the game program according to claim 4, wherein, when the position of the reference point is a position within the first distance from an end of the display area, the display content of the virtual space is scrolled along the reference axis direction so that the position of the reference point is a position the first distance from the end of the display area.

7. The non-transitory computer-readable storage medium having stored therein the game program according to claim 4, wherein, when the position of the reference point is a position within the first distance from an end of the display area, the display content of the virtual space displayed in the display area is scrolled along the reference axis direction and toward a side about which the determination is made that the position of the reference point is a position within the first distance from an end of the display area.

8. The non-transitory computer-readable storage medium having stored therein the game program according to claim 4, wherein:

the game program further causes the computer to execute instructions comprising determining whether or not a position of an object, among the plurality of objects, that is closest to the end of the display area with respect to the reference axis direction is a position within a second distance from the end of the display area, the second distance being smaller than the first distance from the end of the display area; and, regardless of the position of the reference point, when the object closest to the end of the display area is within the second distance from the end of the display area, the display content of the virtual space is scrolled so that the object is displayed at a position the second distance from the end of the display area.

9. The non-transitory computer-readable storage medium having stored therein the game program according to claim 4, wherein whether or not the position of the reference point is a position within the first distance from one end of the display area with respect to the reference axis direction is determined and also whether or not the position of the reference point is a position within a third distance from the other end of the display area with respect to the reference axis direction is determined, and, when the position of the reference point is a position within the first distance from the one end of the display area, the display content of the virtual space displayed in the display area is scrolled along the reference axis direction and toward a side of the one end of the display area, and when the position of the reference point is a position within the third distance from the other end of the display area, the display content of the virtual space displayed in the display area is scrolled along the reference axis direction and toward a side of the other end of the display area.

10. The non-transitory computer-readable storage medium having stored therein the game program according to claim 9, wherein the first distance and the third distance are different in value.

11. The non-transitory computer-readable storage medium having stored therein the game program according to claim 10, wherein with respect to the reference axis direction, a direction toward the side of the one end of the display area is an antigravity direction in the virtual space, and a direction toward the side of the other end of the display area is a gravity direction in the virtual space, and the first distance is greater than the third distance.

12. The non-transitory computer-readable storage medium having stored therein the game program according to claim 9, wherein:

the game program further causes the computer to execute instructions comprising determining whether or not a position of an object, among the plurality of objects, that is closest to the one end of the display area with respect to the reference axis direction is a position within a second distance from the one end of the display area, the second distance being smaller than the first distance from the one end of the display area, and also determining whether or not a position of another object, among the plurality of objects, that is closest to the other end of the display area with respect to the reference axis direction is a position within a fourth distance from the other end of the display area, the fourth distance being smaller than the third distance from the other end of the display area; and regardless of the position of the reference point, when the object closest to the one end of the display area is within the second distance from the one end of the display area, the display content of the virtual space is scrolled so that the object is displayed at a position the second distance from the one end of the display area, and when said another object closest to the other end of the display area is within the fourth distance from the other end of the display area, the display content of the virtual space is scrolled so that said another object is displayed at a position the fourth distance from the other end of the display area.

13. The non-transitory computer-readable storage medium having stored therein the game program according to claim 12, wherein the second distance and the fourth distance are different in values.

14. The non-transitory computer-readable storage medium having stored therein the game program according to claim 12, wherein:

with respect to the reference axis direction, one of the sides of the one end and the other end of the display area is set as a priority side; and, when the object closest to the one end of display area is within the second distance from the one end of the display area and said another object closest to the other end of the display area is within the fourth distance from the other end of the display area, the display content of the virtual space is scrolled toward the side set as the priority side.

15. The non-transitory computer-readable storage medium having stored therein the game program according to claim 4, wherein
the game program further causes the computer to execute instructions comprising:
calculating, in the virtual space, a distance between two objects, among the plurality of objects, that are farthest from each other with respect to the reference axis direction;
determining whether or not the calculated distance is greater than a predetermined zoom-out threshold; and
zooming out from an image of the virtual space at a predetermined magnification when the calculated distance is greater than the zoom-out threshold.

16. The non-transitory computer-readable storage medium having stored therein the game program according to claim 15, wherein
with a passage of time, the image of the virtual space is zoomed out from until the image is displayed at the predetermined magnification.

17. The non-transitory computer-readable storage medium having stored therein the game program according to claim 16, wherein,
when it is determined that the calculated distance falls below the zoom-out threshold while the gradual zooming out from the image of the virtual space is controlled, the control of the zooming out is canceled.

18. The non-transitory computer-readable storage medium having stored therein the game program according to claim 4, wherein
the game program further causes the computer to execute instructions comprising:
calculating, in the virtual space, a distance between two objects, among the plurality of objects, that are farthest from each other with respect to the reference axis direction;
determining whether or not the calculated distance is smaller than a predetermined zoom-in threshold; and
zooming in on an image of the virtual space at a predetermined magnification when the calculated distance is smaller than the zoom-in threshold.

19. The non-transitory computer-readable storage medium having stored therein the game program according to claim 18, wherein
with a passage of time, the image of the virtual space is zoomed in on until the image is displayed at the predetermined magnification.

20. The non-transitory computer-readable storage medium having stored therein the game program according to claim 19, wherein,
when it is determined that the calculated distance exceeds the zoom-in threshold while the gradual zooming in on the image of the virtual space is controlled, the control of the zooming in is canceled.

21. The non-transitory computer-readable storage medium having stored therein the game program according to claim 4, wherein:
the game program further causes the computer to execute instructions comprising calculating an orthogonal axis direction midpoint with respect to an orthogonal axis direction, the orthogonal axis direction midpoint being a center position based on the positions of the plurality of objects in the virtual space and the orthogonal axis direction being orthogonal to the reference axis direction; and
scrolling, along the orthogonal axis direction, the display content of the virtual space so that a position of the orthogonal axis direction midpoint is a center position of the display area with respect to the orthogonal axis direction.

22. The non-transitory computer-readable storage medium having stored therein the game program according to claim 21, wherein:
with respect to the orthogonal axis direction, one of sides of one end and the other end of the display area is set as a priority side;
the game program further causes the computer to execute instructions comprising determining whether or not a position of one of the plurality of objects is a position within a fifth distance from the end corresponding to the priority side with respect to the orthogonal axis direction; and,
when it is determined that the position of one of the plurality of objects is a position within the fifth distance from the end corresponding to the priority side, the display content of the virtual space is scrolled so that the one object is displayed at a position the fifth distance from the end corresponding to the priority side.

23. The non-transitory computer-readable storage medium having stored therein the game program according to claim 21, wherein
the game program further causes the computer to execute instructions comprising:
calculating, in the virtual space, a distance between two objects, among the plurality of objects, that are farthest from each other with respect to the reference axis direction;
calculating, in the virtual space, a distance between two objects, among the plurality of objects, that are farthest from each other with respect to the orthogonal axis direction;
determining whether or not one of the calculated distances is greater than a predetermined zoom-out threshold; and
zooming out from an image of the virtual space at a predetermined magnification when one of the calculated distances is greater than the zoom-out threshold.

24. The non-transitory computer-readable storage medium having stored therein the game program according to claim 21, wherein
the game program further causes the computer to execute instructions comprising:
calculating, in the virtual space, a distance between two objects, among the plurality of objects, that are farthest from each other with respect to the reference axis direction;
calculating, in the virtual space, a distance between two objects, among the plurality of objects, that are farthest from each other with respect to the orthogonal axis direction;
determining whether or not one of the calculated distances is smaller than a predetermined zoom-in threshold; and
zooming in on an image of the virtual space at a predetermined magnification when one of the calculated distances is smaller than the zoom-in threshold.

25. The non-transitory computer-readable storage medium having stored therein the game program according to claim 4, wherein
the plurality of objects are player objects that are capable of operated by a plurality of players using predetermined operation devices, respectively.

26. The non-transitory computer-readable storage medium having stored therein the game program according to claim 4, wherein:
the game program further causes the computer to execute instructions comprising determining whether or not the number of the plurality of objects displayed on a game screen has changed; and
when the change has occurred, controlling the display content of the display area so that a display content of a display area controlled based on the objects before the change gradually approaches a display content of a display area controlled based on the objects after the change.

27. The non-transitory computer-readable storage medium having stored therein the game program according to claim 25, wherein:
the game program further causes the computer to execute instructions comprising determining whether or not the number of the plurality of objects displayed on a game screen has changed; and
when the change has occurred, controlling the display content of the display area so that a display content of a display area controlled based on the objects before the change gradually approaches a display content of a display area controlled by the objects after the change.

28. The non-transitory computer-readable storage medium having stored therein the game program according to claim 25, wherein
the game program further causes the computer to execute instructions comprising:
determining whether or not a predetermined operation has been input from one of the predetermined operation devices;
when the predetermined operation has been input, determining whether or not, among the player objects, within a predetermined range from a player object corresponding to the operation device subjected to the predetermined operation, another player object is present; and
when another player object is present within the predetermined range, allowing said another player object and the player object corresponding to the operation device subjected to the predetermined operation to be operated in a combined manner.

29. The non-transitory computer-readable storage medium having stored therein the game program according to claim 28, wherein:
the predetermined operation devices each include an acceleration sensor; and
whether or not an acceleration that is greater than a predetermined value has been detected with a predetermined button of the predetermined operation device pressed down is determined.

30. The non-transitory computer-readable storage medium having stored therein the game program according to claim 28, wherein,
while said another player object and the player object corresponding to the operation device subjected to the predetermined operation are capable of being operated in a combined manner, the player object corresponding to the operation device subjected to the predetermined operation is capable of using a predetermined action characteristic that is set in said another player object.

\* \* \* \* \*